(12) United States Patent
Miyachi et al.

(10) Patent No.: US 6,493,053 B1
(45) Date of Patent: Dec. 10, 2002

(54) LIQUID CRYSTAL DISPLAY APPARATUS

(75) Inventors: Koichi Miyachi, Kyoto; Motohiro Yamahara, Osaka; Makoto Shiomi, Nara; Morio Nakata, Mie, all of (JP)

(73) Assignee: Sharp Kabushiki Kaisha, Osaka (JP)

( * ) Notice: Subject to any disclaimer, the term of this patent is extended or adjusted under 35 U.S.C. 154(b) by 53 days.

(21) Appl. No.: 09/632,878

(22) Filed: Aug. 4, 2000

(30) Foreign Application Priority Data

Aug. 6, 1999 (JP) ............................................ 11-224683
Aug. 3, 2000 (JP) ........................................ 2000-236211

(51) Int. Cl.$^7$ .......................... G02F 1/1335; G02F 1/133
(52) U.S. Cl. ...................... 349/117; 349/118; 349/119
(58) Field of Search .................................. 349/117, 119

(56) References Cited

U.S. PATENT DOCUMENTS

| | | | |
|---|---|---|---|
| 5,506,706 A | * | 4/1996 | Yamahara et al. .......... 349/117 |
| 5,568,290 A | * | 10/1996 | Nakamura .................... 349/96 |
| 6,356,325 B1 | * | 3/2002 | Shimoshikiryo ............ 349/121 |

FOREIGN PATENT DOCUMENTS

| | | |
|---|---|---|
| JP | 1-78223 | 3/1989 |
| JP | 6-75116 | 3/1994 |
| JP | 2000-81618 | 3/2000 |
| KR | 94-902 | 4/1994 |

* cited by examiner

*Primary Examiner*—William L. Sikes
*Assistant Examiner*—Julie Ngo
(74) *Attorney, Agent, or Firm*—Dike, Bronstein, Roberts & Cushman; David G. Conlin

(57) ABSTRACT

A liquid crystal display apparatus of the present invention includes: a liquid crystal display device, the liquid crystal display device including: a pair of light transmissive substrates; a transparent electrode layer and an alignment film which are provided on one surface of each of the light transmissive substrates, the surface facing the other one of the light transmissive substrates; and a liquid crystal layer interposed between the pair of light transmissive substrates, wherein: the liquid crystal layer includes liquid crystal molecules; the liquid crystal molecules on a surface on each of the alignment films are pre-tilted in the same direction and by the same angle as those on a surface of the other one of the alignment films; and the liquid crystal layer has a homogeneous orientation; a pair of polarizers provided on respective sides of the liquid crystal display device; and at least one inclined phase plate including an index ellipsoid having three principal refractive indices na, nb and nc, wherein: the three principal refractive indices na, nb and nc of the index ellipsoid satisfy a relationship of na=nb>nc; each of the principal refractive indices na and nb is a principal refractive index along a direction in a surface of the inclined phase plate, and the principal refractive index nc is a principal refractive index along a direction normal to the surface of the inclined phase plate; the index ellipsoid is inclined by inclining the direction of the principal refractive index nc and the direction of one of the in-plane principal refractive indices na and nb with respect to each other about an axis extending along the direction of the other one of the in-plane principal refractive indices na and nb; the inclined phase plate is provided between the liquid crystal display device and at least one of the polarizers; and the inclined phase plate is arranged so that an inclination direction of the index ellipsoid as being projected onto the surface of one of the light transmissive substrates is generally parallel or antiparallel to an orientation direction of the liquid crystal molecules.

35 Claims, 36 Drawing Sheets

FIG.37
PRIOR ART
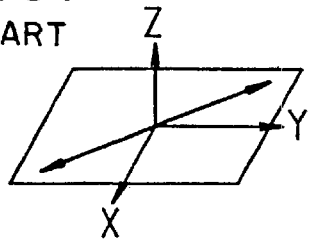
Polarizing plate
(absorption axis)
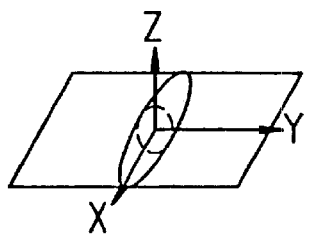
Positive phase plate
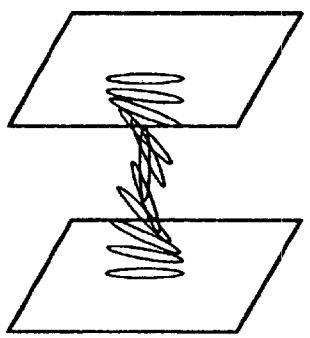
Rubbing direction
Liquid crystal molecules
(gray-level state)
Rubbing direction
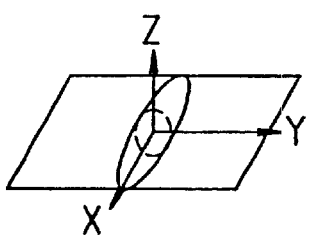
Positive phase plate
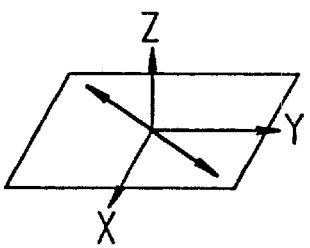
Polarizing plate
(absorption axis)

LIQUID CRYSTAL DISPLAY APPARATUS

BACKGROUND OF THE INVENTION

1. Field of the Invention

The present invention relates to a liquid crystal display apparatus and, more particularly, to a liquid crystal display apparatus which employs in combination a liquid crystal display device and a phase plate, thereby improving the response characteristics and the viewing angle characteristics of the display screen.

2. Description of the Related Art

A liquid crystal display device using a nematic liquid crystal display device has conventionally been used widely in number segment type display devices such as clocks and desktop calculators. In recent years, such liquid crystal display devices have also been used in word processors, notebook type personal computers, car liquid crystal TVs, and the like.

A liquid crystal display apparatus typically includes a light transmissive substrate on which electrode lines, and the like, are provided for turning pixels ON/OFF. For example, in an active matrix type liquid crystal display apparatus, active elements such as thin film transistors are provided on the substrate, along with the electrode lines, as switching means for selectively driving the pixel electrodes by which voltages are applied through the liquid crystal layer. In a color liquid crystal display apparatus, a color filter layer for providing colors, e.g., RGB, is provided on the substrate.

An appropriate liquid crystal display mode can be selected for use with each of such liquid crystal display devices according to the twist angle of the liquid crystal molecules. For example, an active drive type twisted nematic liquid crystal display mode (hereinafter, "TN mode") and a multiplex drive type super twisted nematic liquid crystal display mode (hereinafter, "STN mode") are well known in the art.

In the TN mode, nematic liquid crystal molecules are oriented in a 90° twist so as to guide light along the twist, thereby producing a display. The STN mode effectively utilizes the phenomenon that when the twist angle of the nematic liquid crystal molecules is increased to be greater than 90°, the transmission therethrough changes rapidly for voltages in the vicinity of the threshold voltage applied through the liquid crystal layer.

In the STN mode, the background of the display screen is colored in a unique color due to interference of colors because the STN mode utilizes the birefringence effect of a liquid crystal material. In order to solve such problems so as to produce a black and white display with the STN mode, it is believed to be effective to employ an optical compensator. Display modes employing an optical compensator can be generally classified into the double super twisted nematic phase compensation mode (hereinafter, "DSTN mode") and the film type phase compensation mode in which an optically anisotropic film is employed (hereinafter, "film added mode").

The DSTN mode employs a two-layer structure including a display liquid crystal cell in which the liquid crystal molecules are twisted in a certain direction and another liquid crystal cell in which the liquid crystal molecules are twisted in the opposite direction. The film added mode employs a structure in which an optically anisotropic film is provided. It is believed that the film added mode is advantageous in that it is light in weight and low in cost. Since the black and white display characteristics with the STN modes have been improved by the employment of such phase compensation methods, color STN liquid crystal display apparatuses have been realized in the art in which a color filter layer is provided in an STN mode display apparatus.

On the other hand, the TN modes can be generally classified into the normally black mode and the normally white mode. In the normally black mode, a pair of polarizers are arranged so that their polarization directions are parallel to each other, whereby a black display is produced in the absence of an ON voltage through the liquid crystal layer (i.e., in the OFF state). In the normally white mode, a pair of polarizers are arranged so that their polarization directions are orthogonal to each other, whereby a white display is produced in the OFF state. The normally white mode is advantageous in the terms of the display contrast, the color reproducibility, the viewing angle dependency of the display, etc.

However, a liquid crystal display apparatus of the above-described TN mode has a problem as follows. In a TN mode liquid crystal display apparatus, the liquid crystal molecules have a refractive index anisotropy $\Delta n$ and the liquid crystal molecules are in an inclined orientation with respect to the upper and lower substrates. As a result, the viewing angle dependency may be substantial such that the contrast of the displayed image substantially varies depending upon the direction and the angle from which the display is viewed by the observer.

FIG. 34 schematically illustrates in a cross-sectional view the structure of a TN liquid crystal display device. In the state as shown, a gray-level voltage is being applied through the liquid crystal layer, whereby the liquid crystal molecules are slightly raised. With the TN liquid crystal display device in this state, linearly-polarized light travelling in the direction normal to the surfaces of the pair of substrates (the "normal direction") passes through the liquid crystal molecules at an angle which is different from the angle at which linearly-polarized light travelling in a direction inclined with respect to the normal direction passes through the liquid crystal molecules. Since the liquid crystal molecules have the refractive index anisotropy $\Delta n$, passage of the linearly-polarized light from the different directions produces normal light and abnormal light with a phase difference therebetween. Due to such a phase difference, the incident light is converted into elliptically-polarized light, thereby causing the viewing angle dependency.

Within a liquid crystal layer in an actual liquid crystal display device, liquid crystal molecules in the vicinity of the midpoint between the substrates have a tilt angle which is different from that of other liquid crystal molecules on or near the substrate, and the liquid crystal molecules have a 90° twist between the substrates about the normal direction.

Thus, the linearly-polarized light passing through the liquid crystal layer is subject to various degrees of birefringent effect depending upon its direction and angle, thereby exhibiting a complicated viewing angle dependency.

This viewing angle dependency causes phenomena such as the following: the display screen is colored when the viewing angle is inclined from the direction normal to the screen toward the normal viewing direction, i.e., toward the lower side of the screen by a certain angle or more (hereinafter, the "coloring phenomenon"); and the black and the white are reversed (hereinafter, the "black and white reversal phenomenon"). When the viewing angle is inclined toward the counter-normal viewing direction, i.e., toward the upper side of the screen, the contrast is reduced rapidly.

The above-described liquid crystal display apparatus has another problem follows. The larger the display screen, the narrower is the viewing angle. When a large liquid crystal display screen is viewed by the observer from the normal direction within a short distance from the screen, the display color in an upper portion of the screen may be different from the display color in a lower portion of the screen due to an influence of the viewing angle dependency. This is because the observer being so close to the screen, although in the normal direction makes the situation substantially the same as that where a small display screen is viewed from an inclined direction.

In order to address the problems associated with the viewing angle dependency, it has been proposed in the art to insert a phase plate (a phase film) as an optionally anisotropic optical element between a liquid crystal display device and one of a pair of polarizers (see, for example, Japanese Laid-Open Publication No. 5-313159).

According to this method, a phase plate is provided on one side or on both sides of the liquid crystal layer having a refractive index anisotropy. Linearly-polarized light, which has passed through the liquid crystal layer having the refractive index anisotropy and thus have been converted into elliptically-polarized light, passes through the phase plate so as to compensate for the change in the phase difference between the normal light and the abnormal light occurring within the viewing angle, thereby re-converting the elliptically-polarized light into linearly-polarized light. Thus, the viewing angle dependency is improved.

However, even with the use of the phase plate, the reversal phenomenon in a normal viewing direction and the reduction in the contrast in a counter-normal viewing direction cannot sufficiently be improved at the same time.

In view of this, Japanese Laid-Open Publication No. 6-75116 proposes a method which employs a phase plate in which a principal refractive index direction of the index ellipsoid is inclined with respect to the direction normal to the surface of the phase plate. In this method, the following two types of phase plates are used.

One of the two types of phase plates is as follows. The direction of the minimum principal refractive index of the three principal refractive indices of the index ellipsoid is parallel to the surface of the phase plate. The direction of one of the remaining two principal refractive indices is inclined at angle θ with respect to the surface of the phase plate, with the direction of the other principal refractive index being inclined at angle θ with respect to the direction normal to the surface of the phase plate. The value of θ satisfies the relationship of $20° \leq \theta \leq 70°$.

The other one of the two types of phase plates is as follows. The three principal refractive indices na, nb, nc of the index ellipsoid satisfy the relationship of na=nc>nb. The direction of the principal refractive index nb, which is parallel to the direction normal to the surface of the phase plate and is orthogonal to one of the in-plane principal refractive index nc (or na), is inclined clockwise or counterclockwise from its original direction about an axis along the direction of one of the in-plane principal refractive indices na (or nc).

The former of the above-described two types of phase plates may be either uniaxial or biaxial. A phase plate of the second type may be either a single phase plate or a combination of two such phase plates in which the direction of the principal refractive index nb of one phase plate is at an angle of 90° with respect to the direction of the principal refractive index nb of the other phase plate.

In a liquid crystal display apparatus in which at least one phase plate is provided between the liquid crystal display device and the polarizer, as described above, the change in the contrast, the coloring phenomenon and the reversal phenomenon occurring in the displayed image depending upon the viewing angle can be improved to a certain degree.

However, both of the TN mode and the STN mode have a problem in that the response speed of the liquid crystal material is low. Typically, the response time is about 30 ms in the TN mode and about 100 ms in the STN mode. Normally, an image signal is updated with a frequency of 60 Hz, meaning that a new image is displayed for each frame period, i.e., for every 16.7 ms. Thus, with the liquid crystal mode with such a low response speed, the liquid crystal material cannot completely respond to an image signal within one frame period. In fact, existing liquid crystal display apparatuses have a ghost image problem in a motion picture display, which represents a significant reduction in the display quality.

A homogeneous orientation mode is well known in the art as a liquid crystal mode which has a shorter response time than those of the TN and STN modes. In this mode, the respective alignment films on two glass substrates have opposite and parallel (antiparallel) rubbing directions with respect to each other, and no chiral agent is added to the liquid crystal material. As a result, there is no twist of the liquid crystal molecules as those in the TN mode or the STN mode. It is believed that the response time of the homogeneous orientation mode is shorter than that of a twist mode because of the simple orientation. In fact, the homogeneous orientation mode gives a response speed which is about one half or less of that of the TN mode.

However, the homogeneous orientation mode also has some problem as follows.

First, with a structure as shown in FIG. 35, a voltage-transmission curve as shown in FIG. 36 is obtained, which indicates that a sufficient black display is not obtained for a voltage range over a few volts. In order to solve this problem, a phase plate of a uniaxially-drawn film has been employed in the art, as shown in FIG. 37. Thus, a voltage-transmission curve as shown in FIG. 38 is obtained, thereby realizing a black display over a greater voltage range.

However, as shown in FIG. 39, the viewing angle characteristics of such a display device are not desirable. While it is a well-known technique in the art to improve the viewing angle characteristics by adding a negative phase plate 301 having a negative refractive index anisotropy, as shown in FIG. 40, the improvement in the viewing angle characteristics may be insufficient as can be seen from FIG. 41.

It is known in the art that a negative inclined phase plate is widely employed in a TN panel for viewing angle compensation purposes (U.S. Pat. No. 5,506,706, Yamahara Patent of Sharp Co.). However, it has been believed in the art that it is not generally preferable to employ a negative inclined phase plate in combination with an ECB mode (e.g., the homogeneous orientation mode, the STN orientation mode, etc.) for the following reason.

Where an inclined phase plate is employed, the design optimization is limited by the following three parameters: the in-plane retardation; the retardation along the thickness direction; and the inclination angle of the symmetry axis of the index ellipsoid (the nz direction in the present invention) included in the phase plate with respect to the film surface. In principle, the inclined phase plate can be used with many liquid crystal modes by appropriately setting the three parameters.

In an actual production process, however, once two of the three parameters, e.g., the in-plane retardation and the inclination angle, are fixed, the retardation along the thickness direction is automatically determined. Thus, it is impossible to optimize all of the parameters. It may be possible to avoid this problem. However, it would be then necessary to change not only the thickness of the film but also the material of the phase plate itself each time the liquid crystal mode or the panel gap is changed. Thus, in view of the actual production process, it has been impractical to employ a phase plate in which the three parameters are optimized.

Recently, this technique has been more widely used in the TN liquid crystal mode for the following reason. Since the rubbing directions on the upper and lower substrates are orthogonal to each other, the in-plane remaining retardation of the liquid crystal layer becomes virtually zero (i.e., no need for compensation) when the voltage applied through the liquid crystal layer exceeds a certain level (which is in many cases set to 4 to 5 V). Therefore, the retardation along the thickness direction and the inclination angle can be utilized by employing an upper and lower film each having an arbitrary in-plane retardation so that their rubbing directions are orthogonal to each other.

SUMMARY OF THE INVENTION

According to one aspect of this invention, there is providing a liquid crystal display apparatus, including: a liquid crystal display device, the liquid crystal display device including: a pair of light transmissive substrates; a transparent electrode layer and an alignment film which are provided on one surface of each of the light transmissive substrates, the surface facing the other one of the light transmissive substrates; and a liquid crystal layer interposed between the pair of light transmissive substrates, wherein: the liquid crystal layer includes liquid crystal molecules; the liquid crystal molecules on a surface of each of the alignment films are pre-tilted in the same direction and by the same angle as those on a surface of the other one of the alignment films; and the liquid crystal layer has a homogeneous orientation; a pair of polarizers provided on respective sides of the liquid crystal display device; and at least one inclined phase plate including an index ellipsoid having three principal refractive indices na, nb and nc, wherein: the three principal refractive indices na, nb and nc of the index ellipsoid satisfy a relationship of na=nb>nc; each of the principal refractive indices na and nb is a principal refractive index along a direction in a surface of the inclined phase plate, and the principal refractive index nc is a principal refractive index along a direction normal to the surface of the inclined phase plate; the index ellipsoid is inclined by inclining the direction of the principal refractive index nc and the direction of one of the in-plane principal refractive indices na and nb with respect to each other about an axis extending along the direction of the other one of the in-plane principal refractive indices na and nb; the inclined phase plate is provided between the liquid crystal display device and at least one of the polarizers; and the inclined phase plate is arranged so that an inclination direction of the index ellipsoid as being projected onto the surface of one of the light transmissive substrates is generally parallel or antiparallel to an orientation direction of the liquid crystal molecules.

In one embodiment of the invention, the liquid crystal display apparatus further includes at least one negative phase plate including an index ellipsoid having three principal refractive indices nx, ny and nz along an x axis, a y axis and a z axis, respectively, the three principal refractive indices nx, ny and nz satisfy a relationship of nx=ny>nz; the x axis and the y axis extend in the surface of the negative phase plate and the z axis extends in a direction normal to the surface of the negative phase plate; and the negative phase plate is provided between the liquid crystal display device and at least one of the polarizers.

In one embodiment of the invention, the liquid crystal display apparatus further includes at least one positive phase plate including an index ellipsoid having three principal refractive indices nx, ny and nz, the principal refractive indices nx and ny being along an x axis and a y axis, respectively; the principal refractive indices nx and ny satisfy a relationship of nx>ny; the x axis and the y axis extend in the surface of the positive phase plate; the positive phase plate is provided between the liquid crystal display device and at least one of the polarizers; each of the polarizers has an absorption axis; and the positive phase plate is arranged so that the y axis substantially coincides with the absorption axis.

In one embodiment of the invention, the liquid crystal display apparatus further includes at least one negative phase plate including a negative index ellipsoid having three principal refractive indices nx1, ny1 and nz1 along an x1 axis, a y1 axis and a z1 axis, respectively; the three principal refractive indices nx1, ny1 and nz1 satisfy a relationship of nx1=ny1>nx1; the x1 axis and the y1 axis extend in the surface of the negative phase plate and the z1 axis extends in a direction normal to the surface of the negative phase plate; the negative phase plate is provided between the liquid crystal display device and at least one of the polarizers; the liquid crystal display apparatus further includes at least one positive phase plate including a positive index ellipsoid having three principal refractive indices nx2, ny2 and nz2 along an x2 axis, a y2 axis and a x2 axis, respectively; the principal refractive indices nx2 and ny2 satisfy a relationship of nx2>ny2; the x2 axis and the y2 axis extend in the surface of the positive phase plate; the positive phase plate is provided between the liquid crystal display device and at least one of the polarizers; each of the polarizers has an absorption axis; and the positive phase plate is arranged so that the y2 axis substantially coincides with the absorption axis.

In one embodiment of the invention, the inclined phase plate is arranged so that the inclination direction of the index ellipsoid and a pre-tilt direction of the liquid crystal molecules are substantially opposite to each other.

According to still another aspect of this invention, there is provided a liquid crystal display apparatus, including: a liquid crystal display device, the liquid crystal display device including: a pair of light transmissive substrates; a transparent electrode layer and an alignment film which are provided on one surface of each of the light transmissive substrates, the surface facing the other one of the light transmissive substrates; and a liquid crystal layer interposed between the pair of light transmissive substrates, wherein: the liquid crystal layer includes liquid crystal molecules; the liquid crystal molecules on a surface of each of the alignment films are pre-tilted in the same direction and by the same angle as those on a surface of the other one of the alignment films; the liquid crystal layer has a homogeneous orientation; a pair of polarizers provided on respective sides of the liquid crystal display device; and at least one inclined phase plate including an index ellipsoid having three principal refractive indices na, nb and nc, wherein: the three principal refractive indices na, nb and nc of the index ellipsoid satisfy a relationship of na=nb>nc; each of the principal refractive indices na and nb is a principal refractive index along a direction in a surface of the inclined phase plate, and the principal refractive index nc is a principal refractive index along a direction normal to the surface of the inclined phase plate; the index ellipsoid is inclined by inclining the direction of the principal refractive index nc and the direction of one of the in-plane principal refractive indices na and nb with respect to each other about an axis extending along the direction of the other one of the in-plane principal refractive indices na and nb; the inclined phase plate is provided between the liquid crystal display device and at least one of the polarizers; the liquid crystal display apparatus further includes at least one positive phase plate including an index ellipsoid having three principal refractive indices nx, ny and nz, the principal refractive indices nx and ny being along an x axis and a y axis, respectively; the principal refractive indices nx and ny satisfy a relationship of nx>ny; the x axis and the y axis extend in the surface of the positive phase plate; the positive phase plate is provided between the liquid crystal display device and at least one of the polarizers; each of the polarizers has an absorption axis; the positive phase plate is arranged so that the y axis substantially coincides with an orientation direction of the liquid crystal molecules; and the inclined phase plate is arranged so that an inclination direction of the index ellipsoid as being projected onto the surface of one of the light transmissive substrates is generally parallel or antiparallel to an orientation direction of the liquid crystal molecules.

In one embodiment of the invention, the liquid crystal display apparatus further includes at least one negative phase plate including a negative index ellipsoid having three principal refractive indices nx1, ny1 and nz1 along an x1 axis, a y1 axis and a z1 axis, respectively; the three principal refractive indices nx1, ny1 and nz1 satisfy a relationship of nx1=ny1>nz1; the x1 axis and the y1 axis extend in the surface of the negative phase plate and the z1 axis extends in a direction normal to the surface of the negative phase plate; and the negative phase plate is provided between the liquid crystal display device and at least one of the polarizers.

In one embodiment of the invention, an inclination angle of the index ellipsoid is equal to or greater than 10° and less than or equal to 80°.

In one embodiment of the invention, the inclination angle of the index ellipsoid is equal to or greater than 20° and less than or equal to 50°.

In one embodiment of the invention, where the inclined phase plate is provided on both sides of the liquid crystal display device, a product (na−nc)×d of a difference between the principal refractive index na and the principal refractive index nc and a thickness d of the inclined phase plate is set to be in a range from 15 nm to 700 nm; and where the inclined phase plate is provided only on one side of the liquid crystal display device, the product (na−nc)×d is set to be in a range from 30 nm to 1500 nm.

In one embodiment of the invention, where the inclined phase plate is provided on both sides of the liquid crystal display device, the product (na−nc)×d is set to be in a range from 33 nm to 159 nm; and where the inclined phase plate is provided only on one side of the liquid crystal display device, the product (na−nc)×d is set to be in a range from 66 nm to 318 nm.

In one embodiment of the invention, where the inclined phase plate is provided on both sides of the liquid crystal display device, a product (na−nc)×d of a difference between the principal refractive index na and the principal refractive index nc and a thickness d of the inclined phase plate is set to be in a range from 1 nm to 200 nm; and where the inclined phase plate is provided only on one side of the liquid crystal display device, the produce (na−nc)×d is set to be in a range from 2 nm to 400 nm.

In one embodiment of the invention, where the inclined phase plate is provided on both sides of the liquid crystal display device, the product (na−nc)×d is set to be in a range from 30 nm to 150 nm; and where the inclined phase plate is provided only on one side of the liquid crystal display device, the product (na−nc)×d is set to be in a range from 60 nm to 300 nm.

In one embodiment of the invention, each of the polarizers has an absorption axis; and an angle between a direction of the absorption axis and an inclination direction of the index ellipsoid in the inclined phase plate is greater than −5° and less than 50°.

In one embodiment of the invention, an angle between an orientation direction of the liquid crystal molecules and an inclination direction of the index ellipsoid in the inclined phase plate is greater than −5° and less than 5°.

In one embodiment of the invention, an angle between an orientation direction of the liquid crystal molecules and an inclination direction of the index ellipsoid in the inclined phase plate is 0°.

In one embodiment of the invention, an angle between an orientation direction of the liquid crystal molecules and an inclination direction of the index ellipsoid in the inclined phase plate is greater than 40° and less than 50°.

In one embodiment of the invention, an angle between an orientation direction of the liquid crystal molecules and an inclination direction of the index ellipsoid in the inclined phase plate is 45°.

In one embodiment of the invention, where the negative phase plate is provided on both sides of the liquid crystal display device, a product (nx−nz)×d of a difference between the principal refractive index nx and the principal refractive index nz and a thickness d of the negative inclined phase plate is set to be in a range from 5 nm to 200 nm; and where the negative inclined phase plate is provided only on one side of the liquid crystal display device, the product (nx−nz)×d is set to be in a range from 10 nm to 400 nm.

In one embodiment of the invention, where the negative phase plate is provided on both sides of the liquid crystal display device, the produce (nx−nz)×d is set to be in a range from 35 nm to 105 nm; and where the negative inclined phase plate is provided only on one side of the liquid crystal display device, the product (nx−nz)×d is set to be in a range from 70 nm to 210 nm.

In one embodiment of the invention, where the negative phase plate is provided on both sides of the liquid crystal display device, a product (nx−nz)×d of a difference between the principal refractive index nx and the principal refractive index nz and a thickness d of the negative inclined phase plate is set to be in a range from 1 nm to 100 nm; and where the negative inclined phase plate is provided only on one side of the liquid crystal display device, the product (nx−nz)×d is set to be in a range from 2 nm to 200 nm.

In one embodiment of the invention, where the negative phase plate is provided on both sides of the liquid crystal display device, the product (nx−nz)×d is set to be in a range from 1 nm to 30 nm; and where the negative inclined phase plate is provided only on one side of the liquid crystal display device, the product (nx−nz)×d is set to be in a range from 2 nm to 60 nm.

In one embodiment of the invention, where the positive phase plate is provided on both sides of the liquid crystal display device, a product (nx−ny)×d of a difference between the principal refractive index nx and the principal refractive index ny and a thickness d of the positive inclined phase plate is set to be in a range from 1 nm to 125 nm; and where the positive inclined phase plate is provided only on one side of the liquid crystal display device, the product (nx−ny)×d is set to be in a range from 2 nm to 250 nm.

In one embodiment of the invention, where the positive phase plate is provided on both sides of the liquid crystal display device, the product (nx−ny)×d is set to be in a range from 30 nm to 90 nm; and where the positive inclined phase plate is provided only on one side of the liquid crystal display device, the product (nx−ny)×d is set to be in a range from 60 nm to 180 nm.

In one embodiment of the invention, where the positive phase plate is provided on both sides of the liquid crystal display device, a product (nx−ny)×d of a difference between the principal refractive index nx and the principal refractive index ny and a thickness d of the positive inclined phase plate is set to be in a range from 1 nm to 100 nm; and where the positive inclined phase plate is provided only on one side of the liquid crystal display device, the product (nx−ny)×d is set to be in a range from 2 nm to 200 nm.

In one embodiment of the invention, where the positive phase plate is provided on both sides of the liquid crystal display device, the product (nx−ny)×d is set to be in a range from 5 nm to 40 nm; and where the positive inclined phase plate is provided only on one side of the liquid crystal display device, the product (nx−ny)×d is set to be in a range from 10 nm to 80 nm.

In one embodiment of the invention, the inclined phase plate includes a support made of a transparent organic polymer and a discotic liquid crystal material cured on the support in an inclined orientation.

In one embodiment of the invention, the inclined phase plate includes a support made of a transparent organic polymer and a discotic liquid crystal material cured on the support in a hybrid orientation.

In one embodiment of the invention, a product of a thickness of the liquid crystal layer and a refractive index anisotropy (Δn) of the liquid crystal layer is in a range from 180 nm to 500 nm.

In one embodiment of the invention, the product of the thickness of the liquid crystal layer and the refractive index anisotropy (Δa) of the liquid crystal layer is in a range from 220 nm to 350 nm.

In one embodiment of the invention, the liquid crystal display apparatus lumber includes an element for diffusing transmitted light in normal and near-normal viewing directions toward upper and loner directions.

In one embodiment of the invention, the liquid crystal display apparatus further comprises at least one positive phase plate including an index ellipsoid having three principal refractive indices nx, ny and nz, the principal refractive indices nx and ny being along an x axis and a y axis, respectively the principal refractive indices nx and ny satisfy a relationship of nx>ny; the x axis and the y axis exist is a surface of the positive phase plate; the positive phase plate is provided between the inclined phase plate and the liquid crystal display device; each of the polarizers has an absorption axis; the x axis, which is a slog axis of the positive phase plate, is substantially parallel or substantially orthogonal to an inclination direction of the index ellipsoid of the inclined phase plate as being projected onto the surface of one of the light transmissive substrates; and an angle between the absorption axle of each of the polarizers and the slow axle of the positive phase plate is substantially 45°.

In one embodiment of the invention, the liquid crystal display apparatus further comprises a positive phase plate including an index ellipsoid having three principal refractive indices nx, ny and nz the principal refractive indices nx and ny being along an x axis and a y axis, respectively; the principal refractive indices nx and ny satisfy a relationship of nx>ny; the x axis and the y axis exist in a surface of the positive phase plate; the positive phase plate is provided between the inclined phase plate and at least one of the polarizers; each of the polarizers has an absorption axis; the x axis, which is a slow axis of the positive phase plate, is substantially parallel or substantially orthogonal to an inclination direction of the index ellipsoid of the inclined phase plate as being projected onto the surface of one of the light transmissive substrates; and an angle between the absorption axis of each of the polarizers and the slow axis of the positive phase plate is substantially 45°.

In one embodiment of the invention, a difference between (1) a sum of an in-plane retardation of the negative inclined phase plate and an in-plane retardation of the positive inclined phase plate and (2) a retardation of the liquid crystal layer when a black display is produced by the liquid crystal display apparatus is within ±10 nm.

In one embodiment of the invention, the sum of the in-plane retardation of the negative inclined phase plate and the in-plane retardation of the positive inclined phase plate is less than or equal to 100 nm.

With the above-described structure, even when linearly-polarised light passes through the birefringent liquid crystal layer thus producing normal light and abnormal light and converting the linearly-polarised light into elliptically-polarised light due to the phase difference therebetween such elliptically-polarised light can be compensated for by the use of the optical phase plate in which the short axis of the index ellipsoid including the principal refractive index nc is inclined with respect to the direction normal to the surface of the optical phase plate.

Moreover, a liquid crystal display device having a homogeneous orientation may be provided with a negative phase plate where the direction along which the index ellipsoid of the phase plate is inclined is opposite to the pro-tilt angle of the liquid crystal molecules. In such a case, it is possible to compensate for the optical anisotropy of the liquid crystal molecules a gray-level display or a blank display even when the viewing angle is greatly inclined.

Moreover, a liquid crystal display device having a homogeneous orientation may be provided with a positive phase plate where the direction along which the index ellipsoid of the phase plate is inclined is opposite to the pre-tilt angle of the liquid crystal molecules. In such a case, it is possible to compensate for the optical anisotropy of the liquid crystal molecules in a gray-level display or a blank display oven when the viewing angle is greatly inclined.

Moreover, a liquid crystal display device having a homogeneous orientation may be provided with a positive phase plate and a negative phase plate where the direction along which the index ellipsoid of the phase plate is inclined is opposite to the pre-tilt angle of the liquid crystal molecules. In such a case, it is possible to compensate for the optical anisotropy of the liquid crystal molecules in a gray-level display or a black display even when the viewing angle is greatly inclined. The positive phase plate and the negative phase plate can be replaced with a single biaxial phase plate which has both the characteristics of the positive phase plate and those of the negative phase plate.

Moreover, a liquid crystal display device having a homogeneous orientation may be provided with a phase plate where the direction along which the index ellipsoid of the phase plots is inclined is opposite to the pre-tilt angle of the liquid crystal molecules. In such a case, it is possible to compensate for the optical anisotropy of the liquid crystal molecules in a gray-level display or a bleak display even when the viewing angle is inclined. While the optical phase plate is preferably provided on both sides of the liquid crystal display device, the optical phase plate may alternatively be provided only on one side of the liquid crystal display device, and the improvement of the viewing angle characteristics can still be obtained.

Moreover, the normal-viewing-direction display characteristics of the liquid crystal display devise having a homogeneous orientation can be optically compensated for by the use of a positive phase plate, while the inclined-viewing-direction display characteristics can be optically compensated for by the use of an inclined phase plate in which the index ellipsoid is inclined. Thus, it is possible to obtain a liquid crystal display apparatus having a wide viewing angle.

In a liquid crystal display apparatus of the present invention, the optical compensation for the liquid crystal molecules in the vicinity of the glass substrate is provided by the inclined phase plate in which the index ellipsoid is inclined. In another liquid crystal display apparatus of the present invention, the optical compensation for the liquid crystal molecules in the middle of the liquid crystal layer along the thickness direction thereof is further provided by the negative phase plate. Thus, it is possible to compensate for the optical anisotropy of the liquid crystal molecules in a gray-level display or a black display even when the viewing angle is greatly inclined.

The two plates, i.e., the inclined phase plate in which the index ellipsoid is inclined and the negative phase plate, can be replaced with a single biaxial or hybrid-orientation phase plate which is obtained by combining together the optical characteristics of such two plates.

The effect of combining a positive phase plate where nx<ny with a negative inclined phase plate will be described. As already discussed, an inclined phase plate has three parameters, and each of the three parameters is represented by a function of the other two parameters. Thus, except for the TNT mode, optimizing the three parameters at the same time has been practically difficult as it imposes undue burden on the material selection end the deposition process.

As discussed above, we have found the optimal parameters within the currently available materials and processes. However, the design of a liquid crystal panel greatly depends upon its application, and these optimal parameters may not always be realized. Our further study has revealed that if one stresses on the improvement in the viewing angle characteristics, it is important to adjust the retardation along the thickness direction in accordance with the inclination angle, and the in-plane retardation has only a small effect on the viewing angle characteristics.

It has also been discovered that the contribution of the in-plane retardation is mostly to the remaining in-plane retardation compensation in the liquid crystal layer in a black display, and the in-plane retardation has substantially no contribution to the viewing angle characteristics. When the in-plane retardation is the liquid crystal layer in a black display does not exceed 100 nm, a practically sufficient contrast can be obtained for inclined viewing angles.

Therefore, the difference between the in-plane retardation of the liquid crystal layer and that of the inclined phase plate can be compensated for by providing a positive phase plate so that the slow axis is parallel or orthogonal to the rubbing direction of the liquid crystal layer. In such a ease, the improved viewing angle characteristics are comparable to those which are obtained only with an optimal inclined phase plate, and it is possible to provide, by the use of an appropriate positive phase plate, a desirable normal-viewing-direction contrast irrespective of the in-plane retardation of the inclined phase plate. It the sum of the respective in-plane retardation values of the liquid crystal layer, the inclined phase plate and the positive phase plate can be set to be less than or equal to ±10 nm, it is possible to obtain a practically sufficient contrast of 200 or more.

According to the present invention the positive phase plate is designed such that nx<ny. In practice however, the positive phase plate may be designed such that nx>ny as the object is to compensate for the retardation of the liquid crystal layer. In an actual design of an inclined phase plots, the production of the phase plate becomes more difficult as the inclination angle is increased, and it is often the case that the in-plane retardation is insufficient for the liquid crystal layer used. In view of this, nx<ny is employed is the present invention so that the design can be generally employed for various applications.

The positive phase plate can be arranged in any of various ways. For example, positive phase plate may be provided on one or both aides of the liquid crystal layer, or between the inclined phase plate and the liquid crystal layer or between the inclined phase plate and the polarizer. In practice, the positive phase plate would effectively function wherever it is placed. In view of obtained viewing angle characteristics which are more symmetrical and with which images are more easily viewed sad in view of the productivity of the panel, it is preferable to arrange two positive phase plates having substantially the same retardation on the respective sides of the liquid crystal layer. In each of the above-described arrangements, the liquid crystal layer has a homogeneous orientation which is obtained by combining two substrates together so that their rubbing directions are anti-parallel to each other. The employment of such a homogeneous orientation, which has no twist in the liquid crystal orientation, results in an improvement, typically about a 2-fold increase, in the response speed to an applied voltage over those obtained by the TN mode which is widely employed in conventional liquid crystal display apparatuses. As a rebuilt the display quality in a high-speed motion picture display is improved over those of conventional liquid crystal display apparatuses.

The present invention described above provides an effect of sufficiently improving the viewing angle over those of the liquid crystal display apparatuses.

However, while the wide viewing angle characteristics obtained by the present invention are substantially symmetrical for left and right viewing angles, the viewing angle characteristics are not symmetrical for lower and upper viewing angles. In view of this, the above-described lens element is provided so as to obtain viewing angle characteristics with a high degree of cylindrical symmetry. Thus, the present invention provides a liquid crystal display apparatus which has substantially no drawbacks as compared to a CRT, i.e., the mainstream display apparatus currently need is television displays.

Thus, the invention described herein makes possible the advantage of providing a liquid crystal display apparatus having a wide viewing angle, a high display quality and a high response speed by employing a homogeneous orientation liquid crystal display device with a high response speed in combination with a phase plate of a special type and structure different from the conventional phase plates go as to improve the viewing angle dependency.

This and other advantages of the present invention will become apparent to those skilled in the art upon reading and understanding the following detailed description with reference to the accompanying figures.

BRIEF DESCRIPTION OF THE DRAWINGS

FIG. 37 illustrates another conventional liquid crystal display apparatus;

DESCRIPTION OF THE PREFERRED EMBODIMENTS

Various embodiments of the present invention will now be described. The present invention is in no way limited by those embodiments described below.

Embodiment 1

Figure 1:
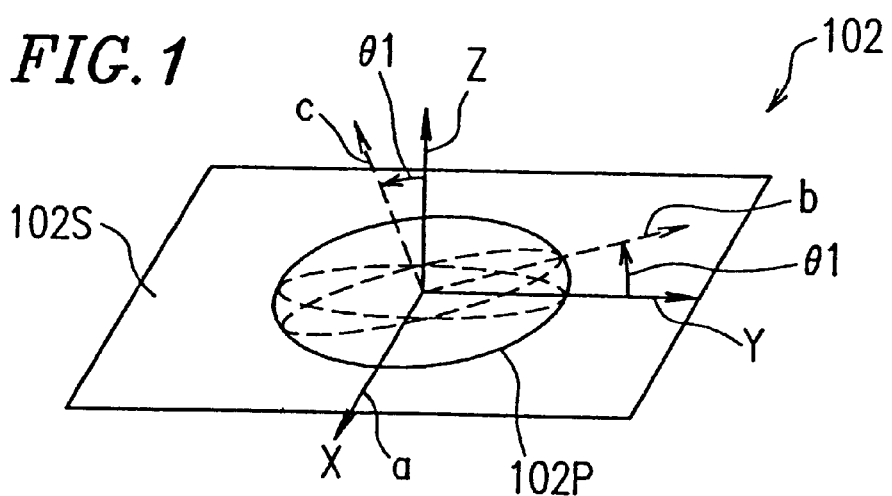
FIG. 1 is a perspective view illustrating an inclined phase plate according to Embodiment 1 of the present invention.

FIG. 1 is a perspective view illustrating an inclined phase plate 104 according to this embodiment of the present invention. The inclined phase plate 104 include a support made of a polymeric compound, such as a polycarbonate or a polyester, and a discotic liquid crystal material cured on the support in an inclined orientation or in a hybrid orientation. The "hybrid orientation" as used herein refers to a liquid crystal orientation in which the liquid crystal molecules agar the upper substrate have an orientation (pre-tilt angle) that is different from that of the liquid crystal molecules near the lower substrate, with the other liquid crystal molecules, therebetween having continuously varied orientation.

The optical characteristics of the inclined phase plate 102 can be described by an index ellipsoid 102P as follows. The index ellipsoid 102P has three principal refractive indices na, nb and nc which satisfy the relationship of na=nb>nc. The index ellipsoid 102P is inclined by rotating an axis "c" of the principal refractive index na which originally extends parallel to the direction Z normal to a surface 102S of the inclined phase plate 102, and an axis "b" of the principal refractive index nb which originally extends in the surface 102S, by an inclination angle θ1clockwise or counterclockwise about an axis "a" along the direction of the principal refractive index na in the surface 102S. As a result, the axis "a" is still in the surface 102S, the axis "b" is at the inclination angle θ1 with respect to the surface 102S of the inclined phase plate 102, and the axis "c" la at the inclination angle θ3 with respect to the direction Z normal to the surface 102S of the inclined phase plate 102. Herein, the direction of the exit "c" inclined from the normal direction z is referred to as an "inclination direction 102D" of the inclined phase plate 102. It is apparent that a phase plate having substantially the same characteristics can be obtained even when the axis "a" and the axis "b" are switched with each other.

Figure 2:
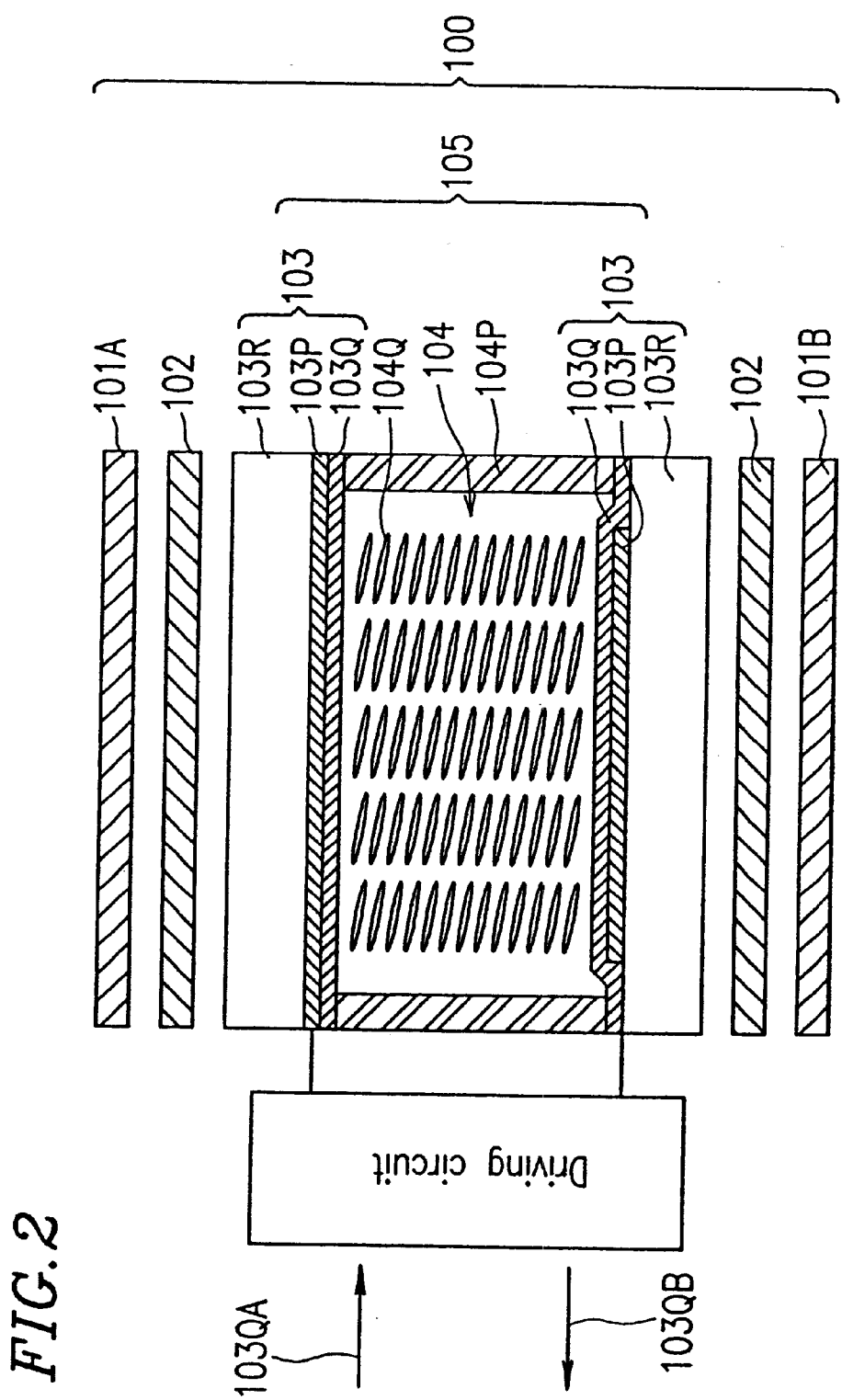
FIG. 2 is a cross-sectional view illustrating a liquid crystal display apparatus according to Embodiment 1 of the present invention.

FIG. 2 is a cross-sectional view illustrating a liquid crystal display apparatus 100 of the present invention. The liquid crystal display apparatus 100 includes a liquid crystal display devise 108. The liquid crystal display device 105 includes a pair of light transmissive substrates 103. Each substrate 103 includes a glass substrate 103R, a transparent electrode layer 103P which is made of ITO (indium tin oxide), or the like, and an alignment film 103Q which is made of polyimide, a polyvinyl alcohol, or the like. The liquid crystal display device 108 further includes a liquid crystal layer 104, containing liquid crystal molecules 104Q sash as a nematic liquid crystal material, which is interposed between the pair of substrates 103. The liquid crystal layer 104 is sealed by a sealant 104P made of a resin, or the like. A pair of polarizers 101A and 101B are provided on the respective sides of the liquid crystal display devise 105. The above-described inclined phase plate 102 shown in FIG. 1 is interposed between the liquid crystal display device 105 and each of the polarizers 101A and 101B.

The liquid crystal layer 104 used in the liquid crystal display device 106 is adjusted so that the refractive index anisotropy (Δn) thereof is 0.06 and the thickness thereof is 4.5 μm. The alignment films 103Q provided for the glass substrates 103R and interposing the liquid crystal molecules 104Q therebetween are rubbed with a soft cloth respectively in directions denoted by arrows 103QA and 103QB. The rubbing directions 103QA and 103QB are antiparallel to each other. The pair of polarizers 101A and 101B have respective absorption axes 101AX and 101BX (FIG. 5) which are orthogonal to each other, and the absorption axes 101AX and 101BX are at an angle of 45° with respect to the rubbing directions 103QA and 103QB, respectively.

Figure 3:
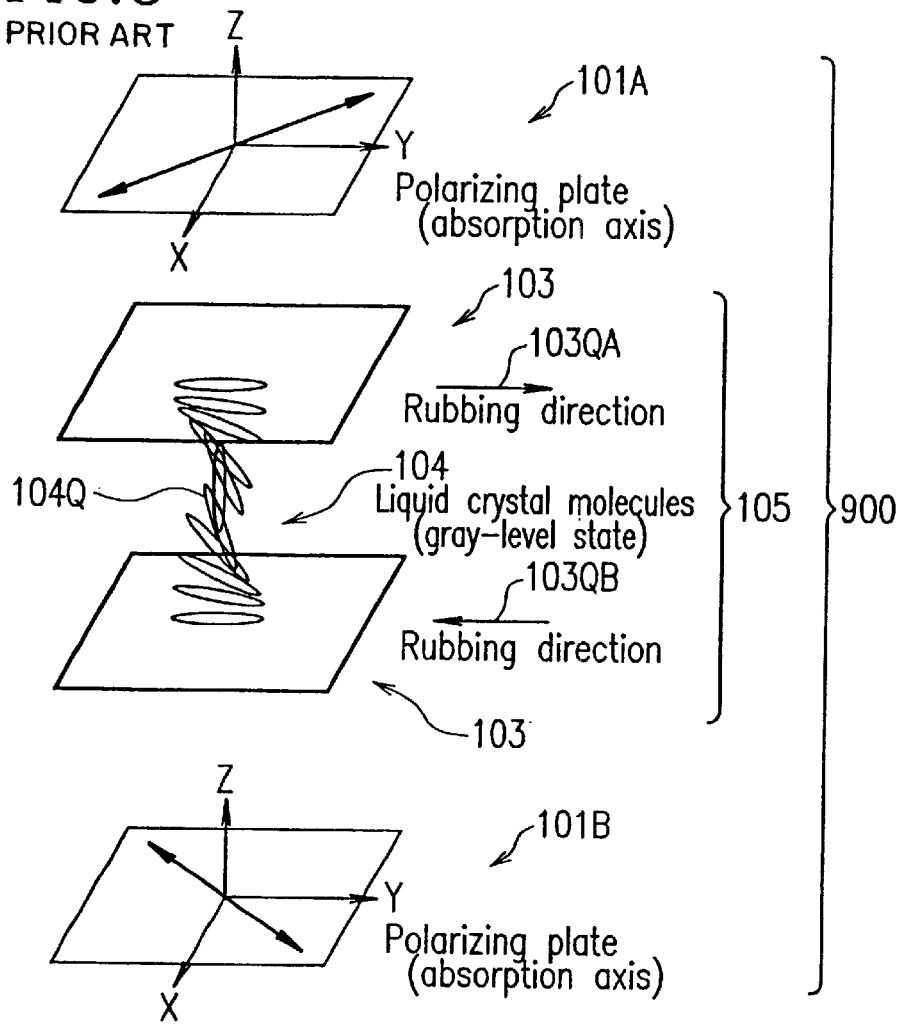
FIG. 3 illustrates a conventional liquid crystal display apparatus.
Figure 4:
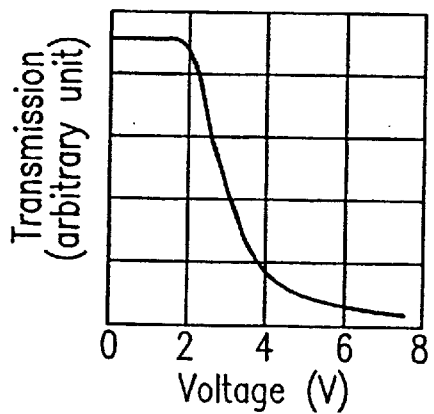
FIG. 4 is a graph illustrating the relationship between the voltage and the transmission of a conventional liquid crystal display apparatus.

First, shown in FIG. 4 is the normal-viewing-direction voltage-transmission curve of a liquid crystal display apparatus 900 as illustrated in FIG. 3 (showing only the liquid crystal molecules 104Q, the light transmissive substrates 103, the polarizers 101A and 101B) which does not include the inclined phase plate 102 of the present invention.

The transmission is at maximum when the applied voltage is zero or near zero (i.e., in a range of 0 V to 2 V), cad the transmission decreases as the applied voltage increases. This indicates that the display mode is a normally white mode. However, the transmission does not reach zero even with an applied voltage of 7 V or more, indicating that a sufficient black display is not obtained. Thus, a sufficient contrast is not obtained.

Figure 5:
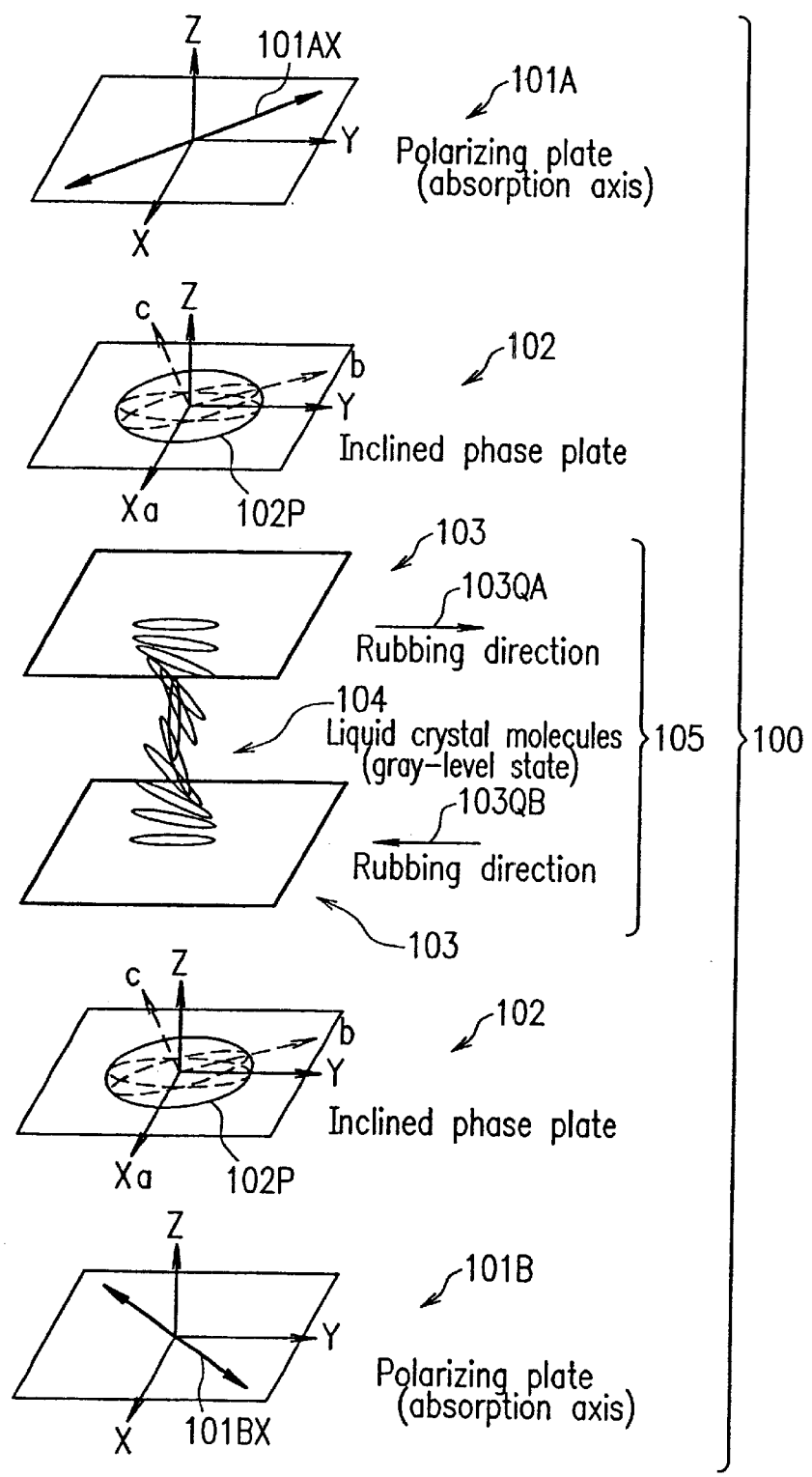
FIG. 5 illustrates a liquid crystal display apparatus according to Embodiment 1 of the present inventions.
Figure 6:
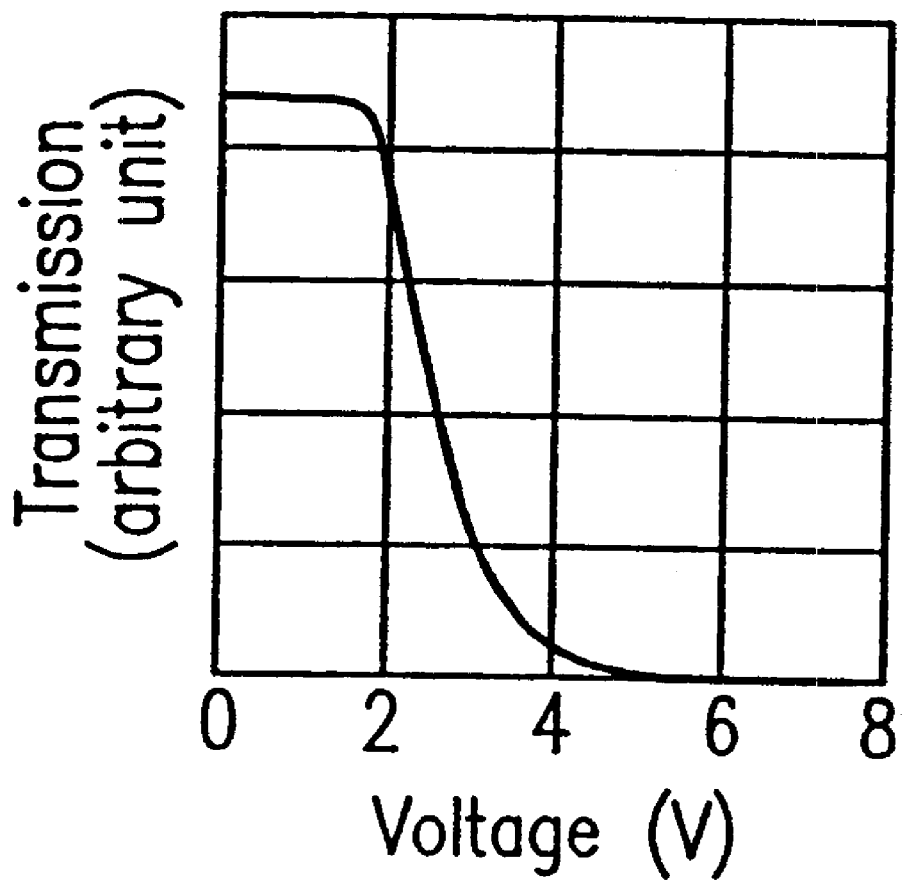
FIG. 6 is a graph illustrating the relationship between the voltage and the transmission of the liquid crystal display apparatus according Embodiment 1 of the present invention.

FIG. 6 shows the normal-viewing-direction voltage-transmission curve of the liquid crystal display apparatus 100 as illustrated in FIG. 5 which includes the inclined phase plate 102 of the present invention.

The inclined phase plate 102 has the following properties; the principal refractive index na=nb=1.500 and nc=1.497; the inclination angle θ1=40°; and the thickness=15 μm.

The inclined phase plate 102 is attached to each side of the above-described liquid crystal display device 105 so that the inclination direction 102D thereof as being projected onto the surface of one of the light transmissive substrates; 103 is generally parallel or antiparallel to the rubbing directions (orientation direction) 103QA, 103QB. The differences between FIG. 4 and FIG. 6 is apparent. The liquid crystal display apparatus 100 employing the inclined phase plate 102 of the present invention achieves a sufficient bleak display with an applied voltage of 7 V and a contrast of 100 or more.

Figure 7:
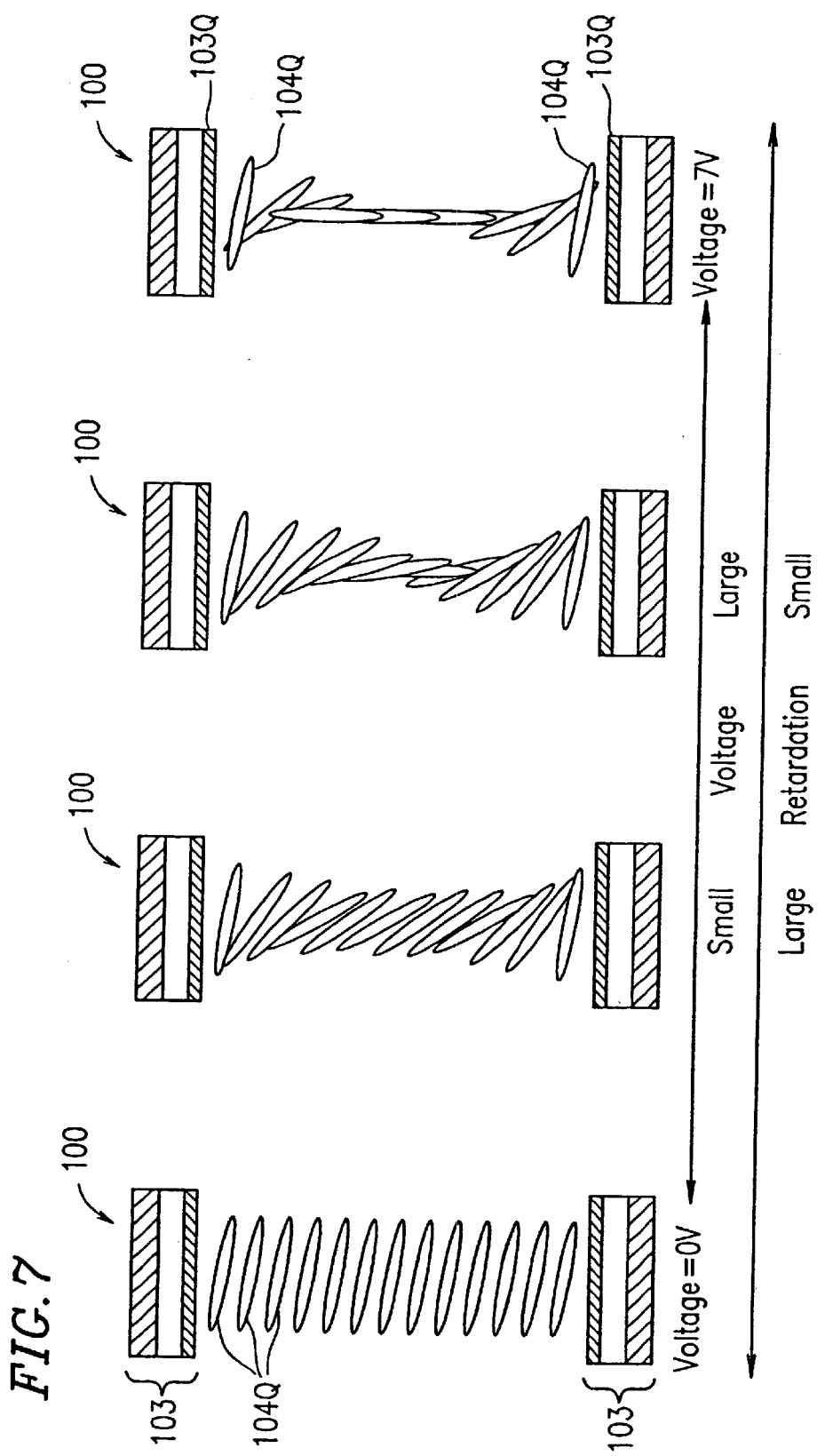
FIG. 7 illustrator the principle of operation of the inclined phase plate according to Embodiment 1 of the present inventions.

The principle of operation of the liquid crystal display apparatus 100 will be described pith reference to FIG. 7. In the liquid crystal display apparatus 100, the orientation direction of the liquid crystal molecules 104Q is substantially parallel to the light transmissive substrates 103 in the absence of an applied voltage, thereby giving the greatest retardation. As the applied voltage is increased, the liquid crystal molecules 104Q era gradually raised from the respective surface of the light transmissive substrates 103, thereby decreasing the retardation.

Thus, the transmission due to the birefringence of the liquid crystal molecules 104Q decreases. However, some of the liquid crystal molecules 104Q in the vicinity of one of the alignment films 103Q cannot rise in response to an applied voltage due to the anchoring force from the alignment film 103Q. Therefore, the retardation due to those liquid crystal molecules 104Q in the vicinity of the alignment film 103Q does not completely reach 0 even in the presence of an applied voltage of 7 V, as described above, thus failing to produce a sufficient black display.

The normal-viewing-direction retardation of the inclined phase plate 102 shown in FIG. 1 is 0 if the inclination angle 81 of the index ellipsoid 102P is 0°. However, the retardation increases as the index ellipsoid 102P is inclined.

Figure 8:
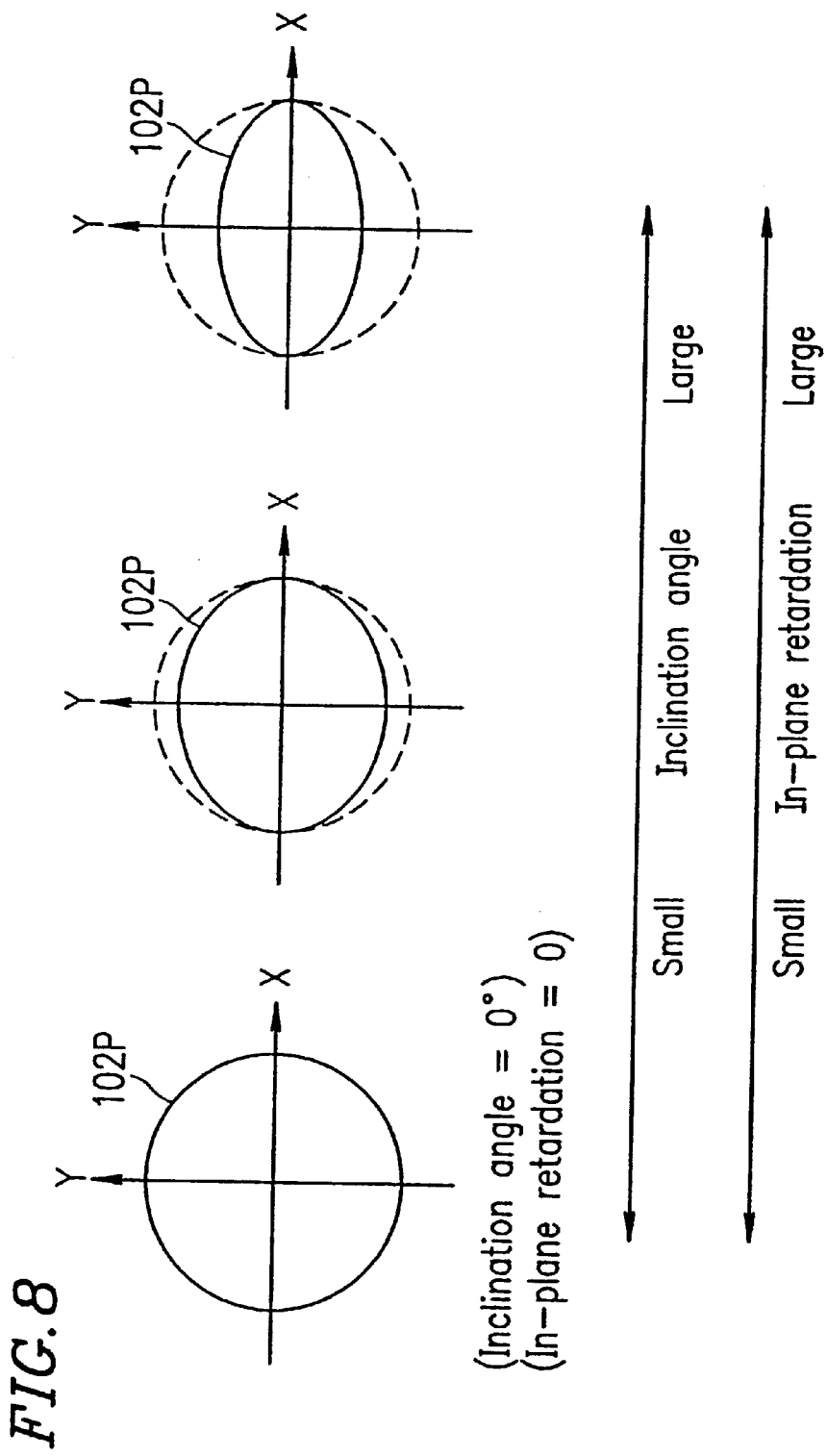
FIG. 8 illustrates an index ellipsoid according to Embodiment 1 of the present invention.

This can be understood by referring to FIG. 8, where the index ellipsoid 102P exhibits a completely circular shape when the inclination angle is 0°, but the circular shape is gradually changed to a more elliptical shape as the inclination angle is increased. Therefore, if the inclination direction 102D as being projected onto the surface of one of the light transmissive substrates 103 and the rubbing direction (orientation direction) 103QA 103QB, are generally parallel or antiparallel to each other, the retardation due to those liquid crystal molecules 104Q in the vicinity of one of the alignment films 103Q in the presence of an applied voltage of 7 V and the normal-viewing-direction retardation of the inclined phase plate 102 cancel each other, thereby reducing the overall transmission of the liquid crystal display apparatus 100 to zero, or producing a black display.

The normal viewing-direction retardation of the inclined phase plate 101 can be controlled based on the principal refractive indices, the inclination angle and the thickness of the index ellipsoid 102P. A change in the normal-viewing-direction retardation changes the applied voltage required for the retardation of the liquid crystal display device 105 to cancel the normal-viewing-direction retardation. Thus, it is possible to control the driving voltage to any value or any value range.

Figure 9:
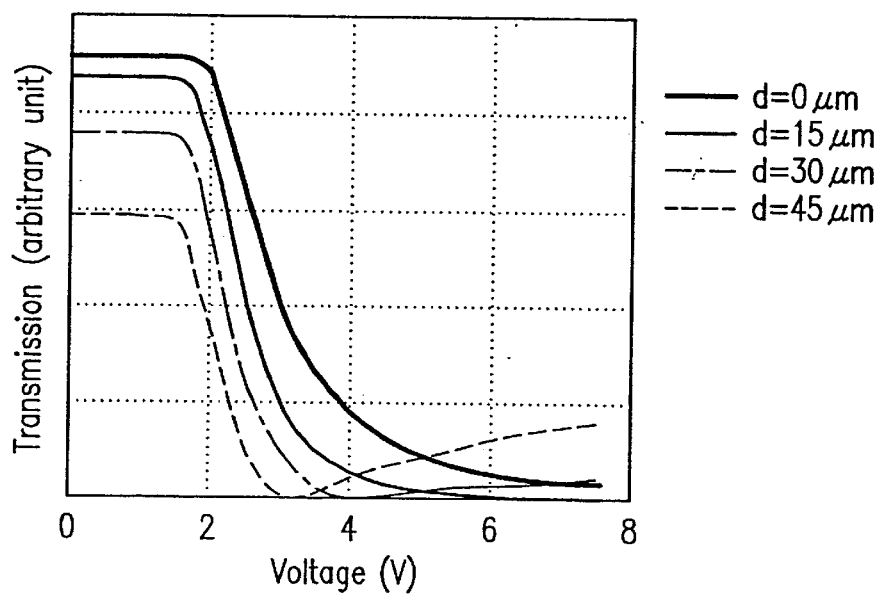
FIG. 9 is a graph illustrating the relationship between the voltage and the transmission of the index ellipsoid according Embodiment 1 of the present invention.

FIG. 9 shows various normal-viewing-direction voltage-transmission curves obtained when the thickness of the index ellipsoid 102P is varied while the principal refractive indices and the inclination angle thereof are kept constant. It can be seen that the voltage-transmission curve can be controlled by controlling a property of the inclined phase plate 102. It should be apparent from the above discussion that similar effects can be obtained whoa the inclination angle and/or the principal refractive indices are controlled instead of controlling the thickness of the inclined phase plate 102.

In this way, it is possible to obtain the liquid crystal display apparatus 100 having a practically sufficient normal-viewing-direction contrast. While the inclined phase plate 102 is attached to each side of the liquid crystal display device 105 in the present embodiment, similar effects can be obtained even when the inclined phase plate 102 is attached only to one side of the liquid crystal display device 105.

Embodiment 2 in this embodiment, the liquid crystal display device 106 and the liquid crystal display apparatus 100 are used. However, the inclined phase plate 102 attached to the liquid crystal display apparatus in the present embodiment is designed as follows.

Figure 10:
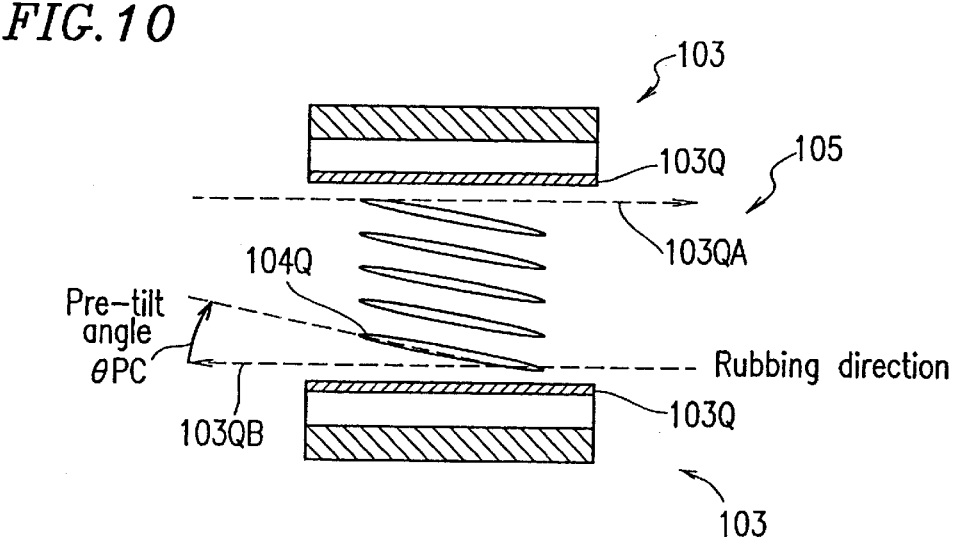
FIG. 10 illustrates a pre-tile angle according to Embodiment 2 of the present invention.

Referring to FIG. 10, the alignment films 103Q of the liquid crystal display, device 105 can be rubbed in advance in the respective rubbing directions 103QA and 103QB. Thus, it is possible to control the orientation direction of the liquid crystal molecules 104Q according to the rubbing directions 103QA and 103QB. Moreover, in many cases, those liquid crystal molecules 104Q on one of the alignment films 103Q have a pre-tilt angle of θPC.

The pre-tilt angle θPC can be illustrated as in FIG. 10. Thus, the liquid crystal molecules 104Q are slightly raised from the surface of each light transmissive substrate 103 even in the absence of an applied voltage. In the present embodiment, the pre-tilt angle θPC was about 2°. Herein, the direction in which the liquid crystal molecules 104Q ties from the glass substrate 103 by the pre-tilt angle θPC in the absence of an applied voltage is referred to as the pre-tilt direction PCD The pre-tilt direction PCD corresponds to the long axis direction of the liquid crystal molecules 104Q in the absence of an applied voltage, i.e., the direction of the maximum principal refractive index of the index ellipsoid which represents the liquid crystal molecules 104Q.

The inclined phase plate 102 was arranged so that the inclination direction 102D of the index ellipsoid 102P id the inclined phase plate 102 was opposite to a direction PCD which represents the pre-tilt angle θPC of the liquid crystal molecules 104Q.

Figure 11:
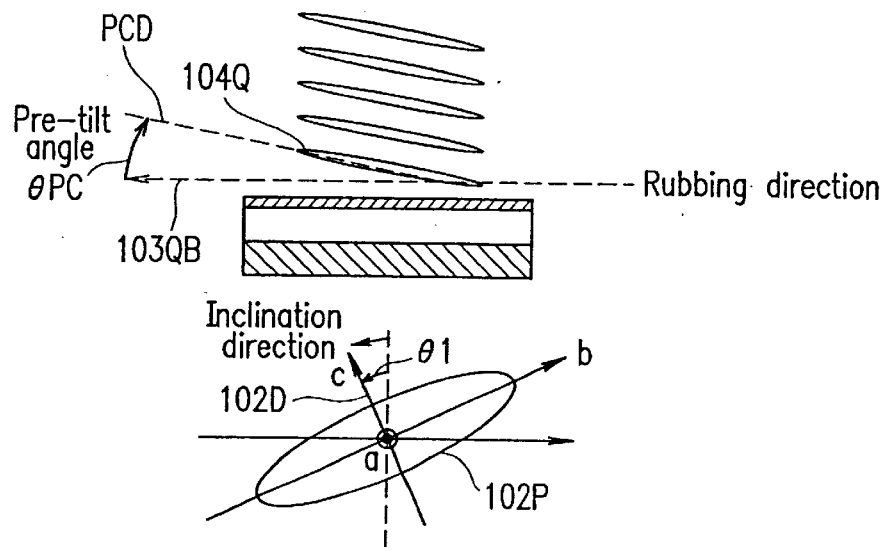
FIG. 11 is a diagram illustrating the relationship between the pre-tile angle and the inclined phase plate according to Embodiment 2 of the present invention.

As illustrated in FIG. 11, the liquid crystal molecules 104Q rise from the surface of the glass substrata 103 counterclockwise in the pre-tilt direction PCD by the pre-tilt angle θPC in the absence of an applied voltage. In the inclined phase plate 102, he axis "c", which is the direction of the minimum principal refractive index nc of the index ellipsoid 102P of the inclined phase plate 102, inclined counterclockwise from the normal direction z by the inclination angle θ1 in a plane which z perpendicular to the plans of the glass substrate 103 including the rubbing directions 103QA and 103QB Thus, the inclined phase plate 102 is arranged so that the direction inclined counterclockwise from the normal direction z by the inclination angle θ1 corresponds to the inclination direction 102D.

Thus, the arrangement of the inclined phase plate 102 such that the pre-tilt direction PCD of the liquid crystal molecules 104Q and the inclination direction 102D of the inclined phase plate 102 are opposite to each other refers to an arrangement of the inclined phase plate 102 such that, in a plane perpendicular to the plane of the glass substrate 103 including the rubbing directions 103QA and 103QB, the direction in which the liquid crystal molecules 104Q rise from the plane of the glass substrate 103 in the absence of an applied voltage is opposite to the direction in which the inclination direction 307D of the index ellipsoid 102P of the inclined phase plate 102 is inclined from the normal direction.

As discussed in Embodiment 1 above, the normal-viewing-direction retardation of the inclined phase plate 102 can be controlled by controlling the principal refractive indices, the inclination angle and the thickness of the index ellipsoid 102P thereof. In the present embodiment, the inclination angle θ1 and the thickness d were varied while fixing the principal refractive indices so that a black display could always be realized with an applied voltage of 7 V.

Specifically, the inclination angle θ1 and the thickness d were varied with the principal refractive indices of na=nb= 1.500 and nc=1.497 so that the normal-viewing-direction retardation is 18.6 nm.

Figure 12:
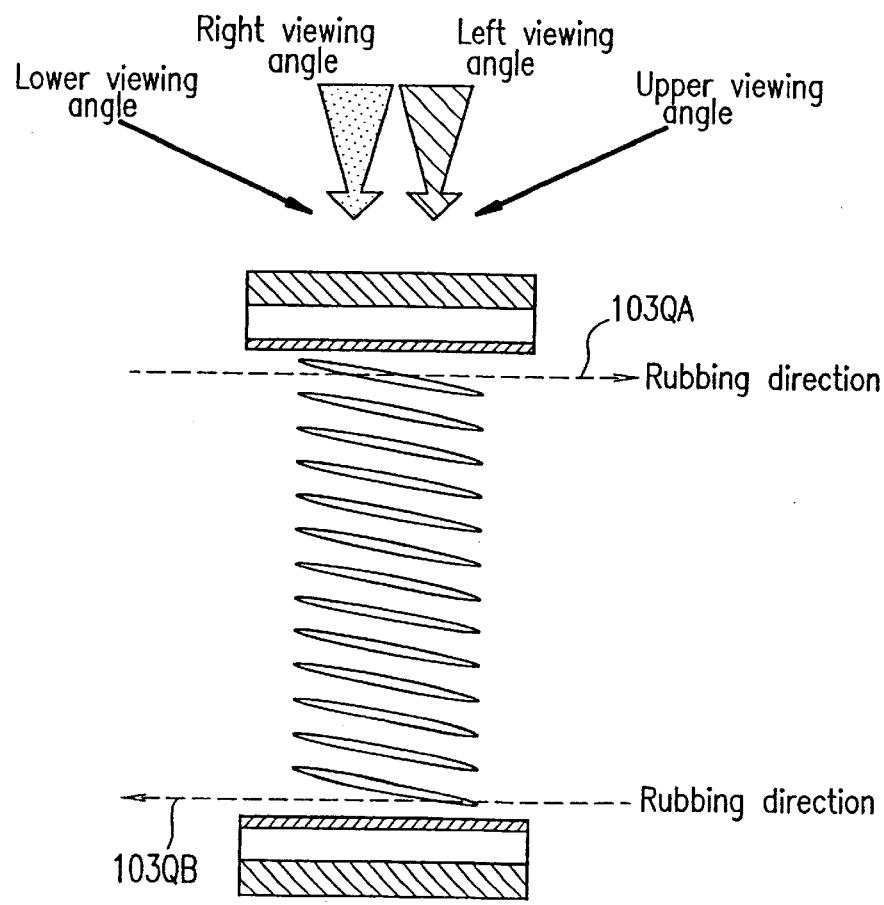
FIG. 12 it a diagram illustrating the upper, lower left and right viewing angles according to Embodiment 2 of the present invention.

Table 1 below shows various thicknesses and inclination angles θ1 of various inclined phase plates 102 and their upper, left-right and lower viewing angles at which a contrast of 10 is obtained. Herein, the upper, left, right and lower viewing angles are defined as shown in FIG. 12.

In Table 1, each retardation value refers to (na−nc)×d (nm).

TABLE 1

Relationship between various phase plates and their viewing angle characteristics

| Inclination angle | 10 | 20 | 30 | 40 | 50 | 60 | 70 | 80 |
|---|---|---|---|---|---|---|---|---|
| Thickness | 205 | 53 | 25 | 15 | 11 | 8.3 | 7.0 | 6.4 |
| Retardation | 615 | 159 | 75 | 45 | 33 | 25 | 21 | 19 |
| Upper viewing angle | 15 | 29 | 59 | 44 | 39 | 34 | 32 | 30 |
| Left-right viewing angle | 20 | 67 | 53 | 46 | 42 | 42 | 42 | 42 |
| Lower viewing angle | 40 | 37 | 37 | 39 | 42 | 43 | 44 | 45 |

Units:
Inclination angle (°),
Thickness (μm),
Retardation (nm),
viewing angle (°)

Figure 13:
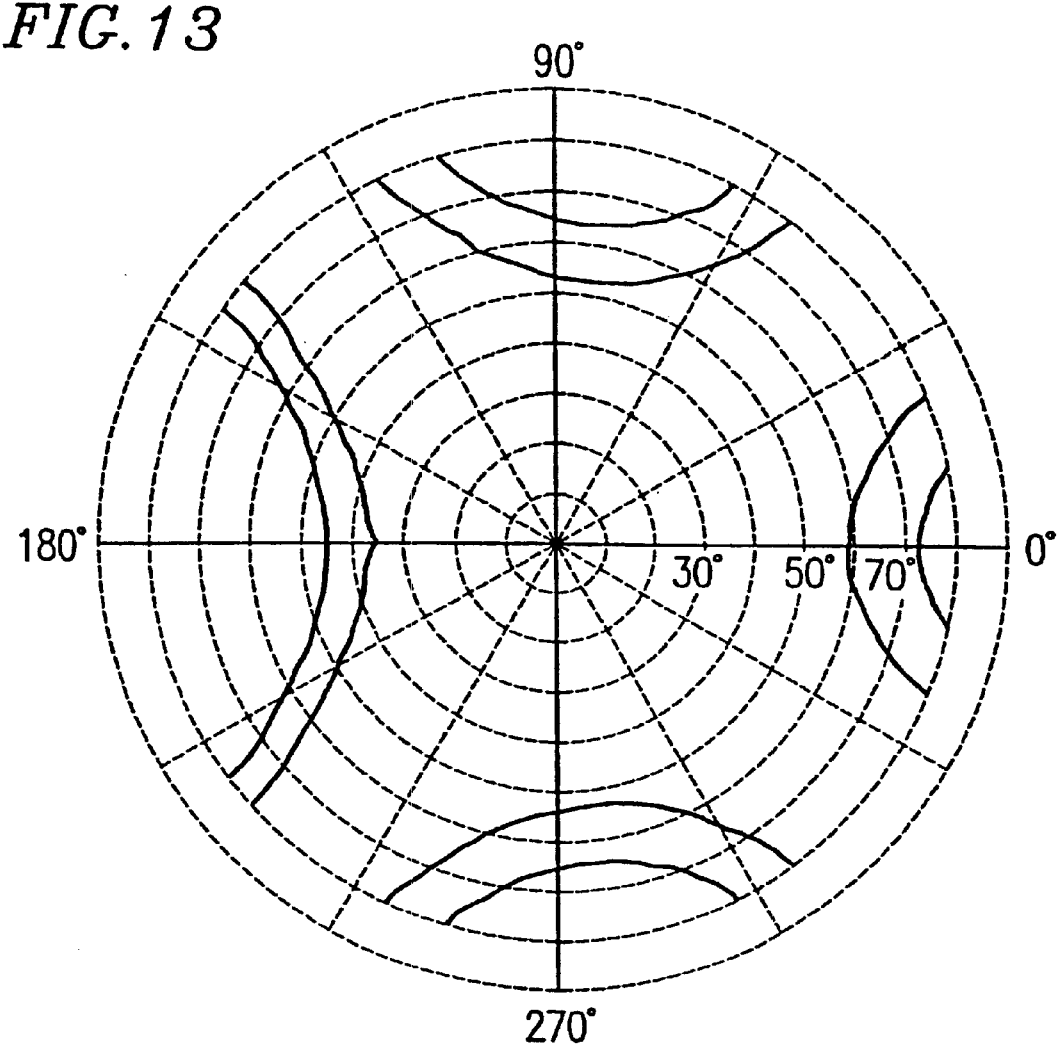
FIG. 13 is an isocontrast diagram of the liquid crystal display apparatus according to Embodiment 2 of the present invention.

As can be seen from Table 1, it has been found that the widest viewing angle characteristics are obtained when the inclination angle θ1 of the inclined phase plate 102 is in the vicinity of 30°. FIG. 13 is an isocontrast diagram for inclination angle θ1=30°, in which 0°, 90°, 180° and 270° represent the upper, left, lower and right viewing angles, respectively. The inner contour line represents a contrast of 10, and the outer contour line represents a contrast of 5. This applies to all the isocontrast diagrams discussed herein.

From the data shown above and the actual image evaluation, it was confirmed that there is provided an effect of increasing the viewing angle when the inclination angle θ1 is 10° to 80°, preferably 20° to 50°. In terms of the retardation, a substantial improvement in the display quality was confirmed when the retardation was 15 to 700 nm, preferably 33 to 159 nm. It was also confirmed that the retardation should preferably be doubled when the inclined phase plate 102 is provided only on one side of the liquid crystal display device 105.

The principle of how the viewing angle can be increased will be described. The liquid crystal display apparatus is substantially the same as that of Embodiment 1, and therefore those liquid crystal molecules 104Q in the vicinity of one of the alignment films 103Q cannot be raised sufficiently in response to an applied voltage of 7 V due to the anchoring force from the alignment film 103Q. Therefore, it can be considered that the index ellipsoid representing the liquid crystal molecules 104Q in the vicinity of one of the alignment films 103Q is approximately a positive index ellipsoid whose maximum principal refractive index direction is slightly raised from the plane of the light transmissive substrate 103. In order to increase the viewing angle, the retardation due to those liquid crystal molecules 104Q in the vicinity of the alignment film 103Q should be canceled not only in the normal viewing direction but across a wide viewing angle.

The inclined phase plate 102 of the present invention has the index ellipsoid 102P whose principal refractive indices have the relationship of na=nb>nc. Therefore, basically, the inclined phase plate 102 of the present invention can be considered to be a negative phase plate. In the present invention, the index ellipsoid 102P is inclined. Thus, the retardation due to those liquid crystal molecules 104Q in the vicinity of one of the alignment films 103Q and the retardation of the inclined phase plate 102 can be canceled by each other if the inclined phase plate 102 is arranged so that the pre-tilt direction PCD of the liquid crystal molecules 104Q is opposite to the inclination direction 102D of the inclined phase plate 102.

As a result, it is possible to produce a black display not only in the normal viewing direction but across a wide viewing angle.

Thus, it is possible to obtain a liquid crystal display apparatus having practically sufficient viewing angle characteristics.

In the present embodiment, the phase plate is provided on each side of the liquid crystal display device. However, even when the phase plate is provided only on one side of the liquid crystal display device, it is possible to provide an effect of increasing the viewing angle for a practically sufficient display quality, though it may be slightly asymmetric in the left-right direction.

Embodiment 3

Figure 14:
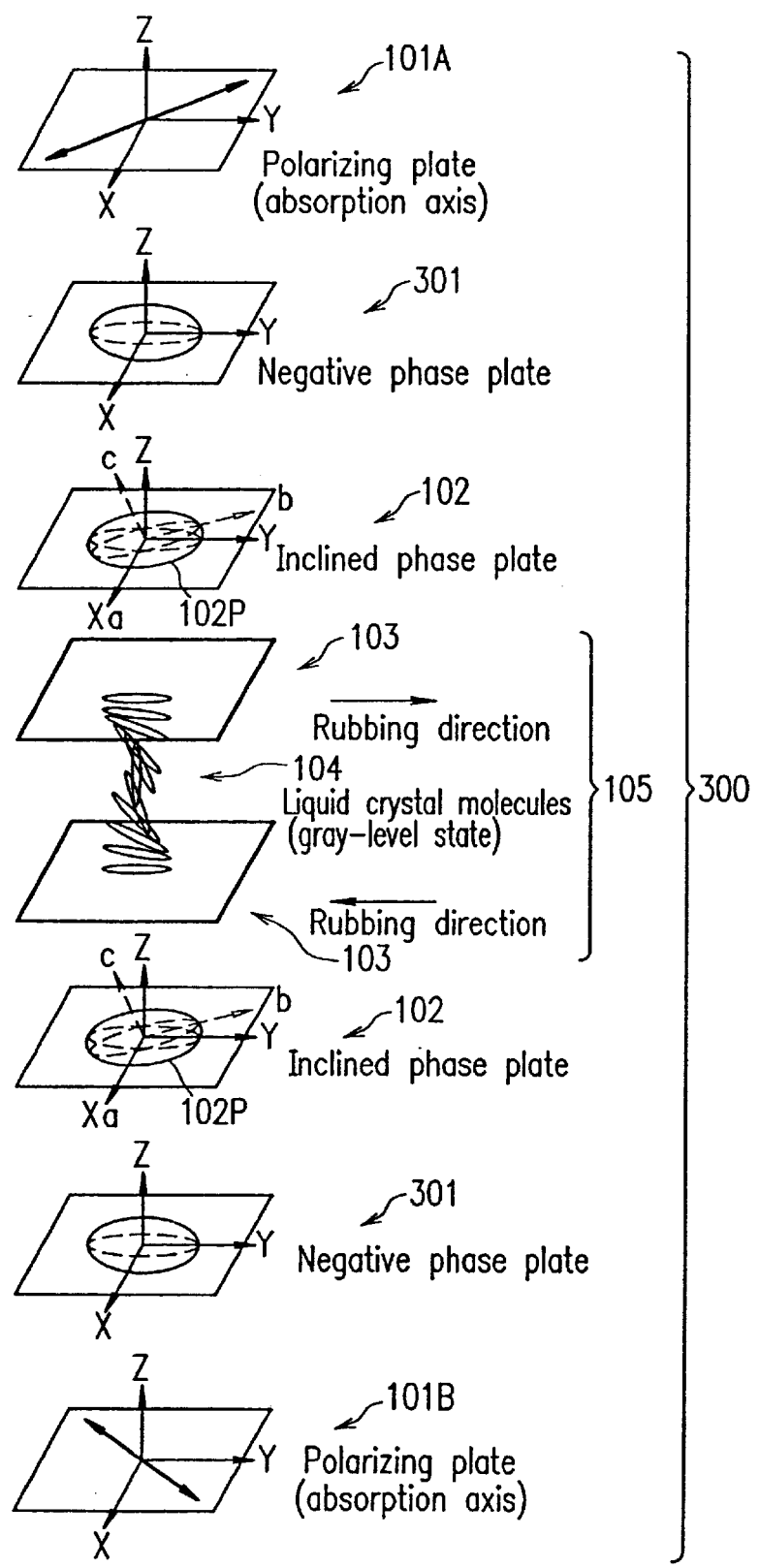
FIG. 14 illustrates a liquid crystal display apparatus according to Embodiment 3 of the present invention.

FIG. 14 illustrates a liquid crystal display apparatus 300 according to this embodiment. In the present embodiment, a negative phase plate 301 having a negative refractive index anisotropy was produced from a polycarbonate and was inserted between the inclined phase plate 102 and each of the polarizers 101A and 101B of the liquid crystal display apparatus of Embodiment 2.

The inclined phase plate 102 of Embodiment 2 which had an inclination angle of 40° and a thickness of 15 μm was used in the present embodiment.

Table 2 below shows various retardations of the negative phase plate 301 having a negative refractive index anisotropy and the upper, left-right and lower viewing angles at which a contrast of 10 is obtained. Herein, the retardation is given by the following expression: Retardation=(nx−nz)×d, where nx (=ny) denotes the in-plane refractive index, nz denotes the refractive index along the normal direction, and d denotes the thickness.

As in Embodiment 2, the upper, left, right and lower viewing angles are defined as shown in FIG. 12.

TABLE 2

Relationship between various phase plates and their viewing angle characteristics

| Retardation | 0 | 35 | 70 | 105 |
|---|---|---|---|---|
| Upper viewing angle | 44 | 53 | 62 | 58 |
| Left-right viewing angle | 46 | 56 | 68 | 65 |
| Lower viewing angle | 39 | 43 | 47 | 44 |

Units:
Retardation (nm),
viewing angle (°)

Figure 15:
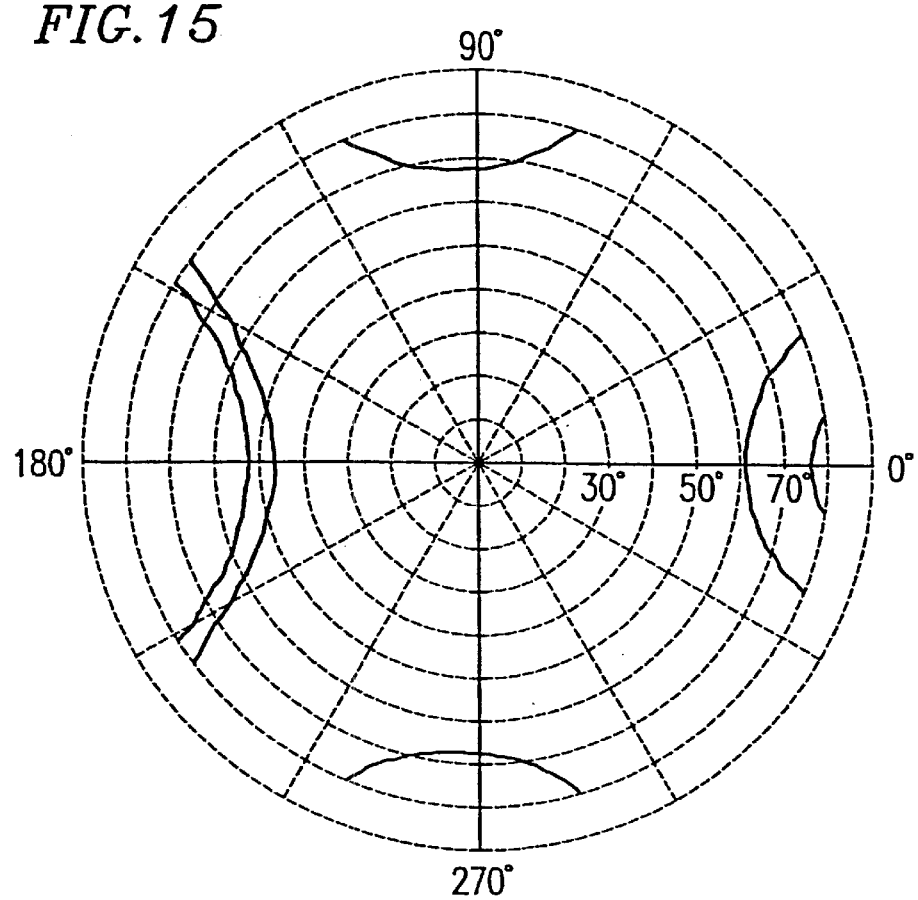
FIG. 15 is an isocontrast diagram of the liquid crystal display apparatus according to Embodiment 3 of the present invention.

As can be seen from Table 2, it has been found that the widest viewing angle characteristics are obtained when the retardation of the negative phase plate 301 is in the vicinity of 70 nm. FIG. 15 is an isocontrast diagram for a retardation of 70 nm.

From the data shown above and the actual image evaluation, it was confirmed that there is provided an effect of increasing the viewing angle when the retardation is 5 to 200 nm, preferably 35 to 105 nm. It was also confirmed that the retardation should preferably be doubled when the negative phase plate 301 is provided only on one side of the liquid crystal display device.

The principle of how the viewing angle can be increased will be described. In the liquid crystal display apparatus 300 of the present embodiment, the liquid crystal molecules 104Q are raised from the surface of the glass substrate in response to an application of a voltage therethrough, and the transmission is changed as the normal-viewing-direction retardation is decreased. While those liquid crystal molecules 104Q in the vicinity of one of the alignment films 103Q cannot be raised sufficiently, the retardation thereof is compensated for by the inclined phase plate 102 in which the index ellipsoid 102P is inclined, thereby producing a black display, as described in Embodiments 1 and 2 above.

Those liquid crystal molecules 104Q in the middle of the liquid crystal layer 104 along the thickness direction thereof are substantially completely raised in response to an applied voltage. Therefore, this portion of the liquid crystal layer 104 has substantially no normal-viewing-direction retardation, and thus does not contribute to the normal-viewing-direction transmission. Thus, the index ellipsoid in the middle of the liquid crystal layer 104 along the thickness direction thereof has a positive refractive index anisotropy, with the axis which gives the largest principal refractive index is substantially perpendicular to the light transmissive substrates 103. As described above, the index ellipsoid in the middle of the liquid crystal layer 104 along the thickness direction thereof does not exhibit an anisotropy when viewed from the direction normal to the light transmissive substrates 103, but exhibits an anisotropy when viewed from an inclined direction. Thus, while the retardation is zero for the normal viewing direction, it is not zero for an inclined direction. While the display is viewed as black from the normal viewing direction, there is some light leakage occurring in an inclined direction.

In order to prevent this light leakage, a positive index ellipsoid which gives its maximum principal refractive index along the direction normal to the light transmissive substrates 103 can be provided to optically compensate for the light leakage. This can be achieved by providing a negative index ellipsoid which gives its minimum principal refractive index along the direction normal to the light transmissive substrates 103.

By additionally providing the negative phase plate 301 having a negative refractive index anisotropy as described above, it is possible to increase the viewing angle.

In the present embodiment, the negative phase plate 301 is provided on each side of the liquid crystal display device 105. However, even when the phase plate is provided only on one side of the liquid crystal display device, it is possible to provide an effect of increasing the viewing angle for a practically sufficient display quality, though it may be slightly asymmetric in the left-right direction. Similar effects are obtained even when the positions of the inclined phase plate 102 and the negative phase plate 301 may be switched with each other.

An alternative single phase plate or set of phase plates that is optically equivalent to the combination of the inclined phase plate 102 and the negative phase plate 301 can be used in place of the inclined phase plate 102 and the negative phase plate 301. Similar effects were obtained even with a hybrid orientation whose optical characteristics are not uniform along the thickness direction.

Embodiment 4

Figure 16:
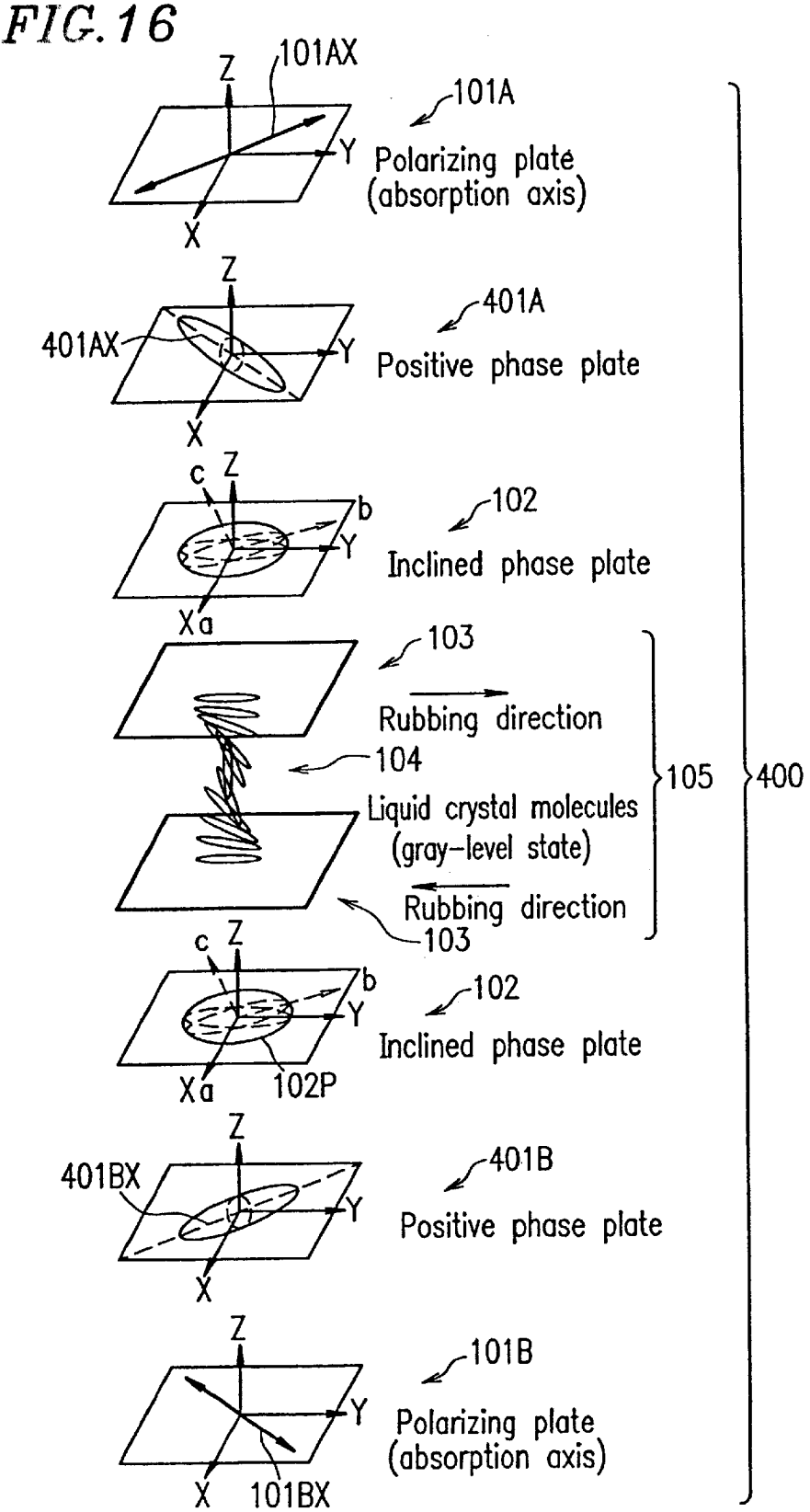
FIG. 16 illustrates a liquid crystal display apparatus according to Embodiment 4 of the present invention.

FIG. 16 illustrates a liquid crystal display apparatus 400 according to this embodiment. In the present embodiment, positive phase plates 401A and 401B having a positive refractive index anisotropy were produced from a polyester and was inserted between the inclined phase plate 102 and each of the polarizers 101A and 101B of the liquid crystal display apparatus of Embodiment 2.

The inclined phase plate 102 of Embodiment 2 which has an inclination angle of 40° and a thickness of 15 μm was used in the present embodiment.

Table 3 below shows the upper, lower and left-right viewing angles at which a contrast of 10 is obtained according to the present embodiment.

Herein, the retardation is given by the following expression: Retardation=(nx−ny)×d=70 nm, where each of nx and ny denotes an in-plane refractive index, and d denotes the thickness.

As in Embodiment 2, the upper, left, right and lower viewing angles are defined as shown in FIG. 12.

TABLE 3

Viewing angle characteristics

| | |
|---|---|
| Upper viewing angle | 68 |
| Left-right viewing angle | 67 |
| Lower viewing angle | 50 |

Units:
viewing angle (°)

Figure 17:
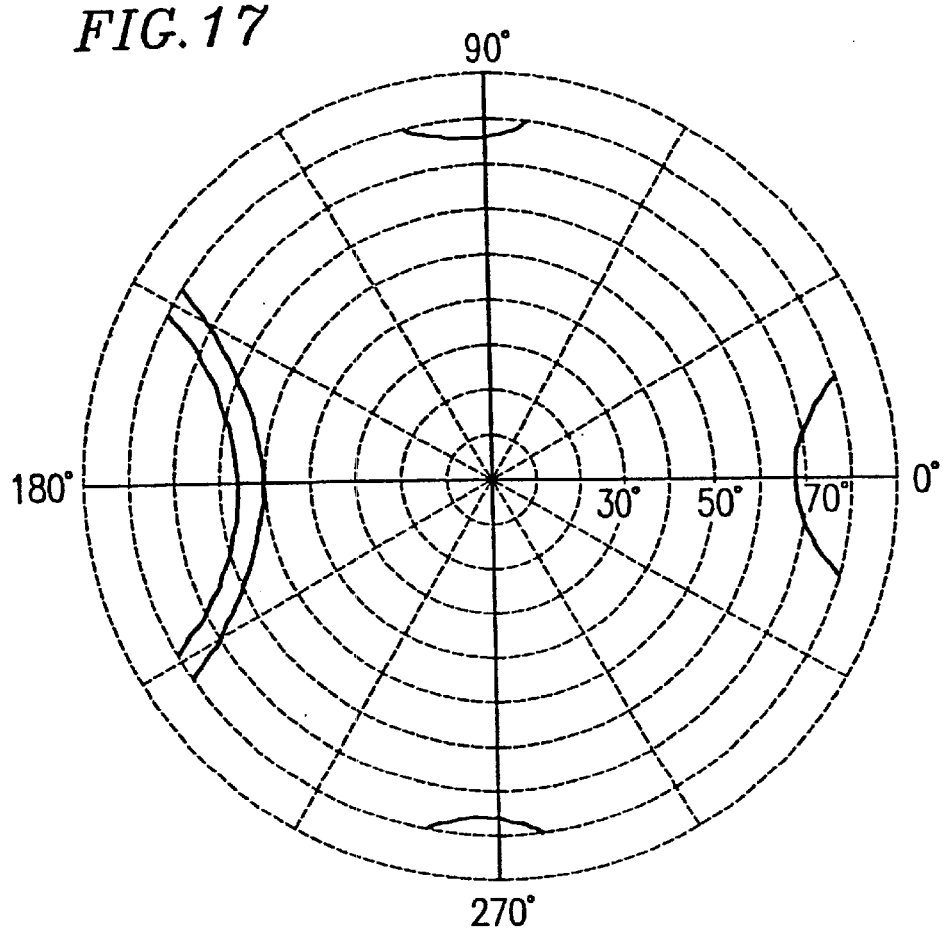
FIG. 17 is an isocontrast diagram of the liquid crystal display apparatus according to Embodiment 4 of the present invention.
Figure 18:
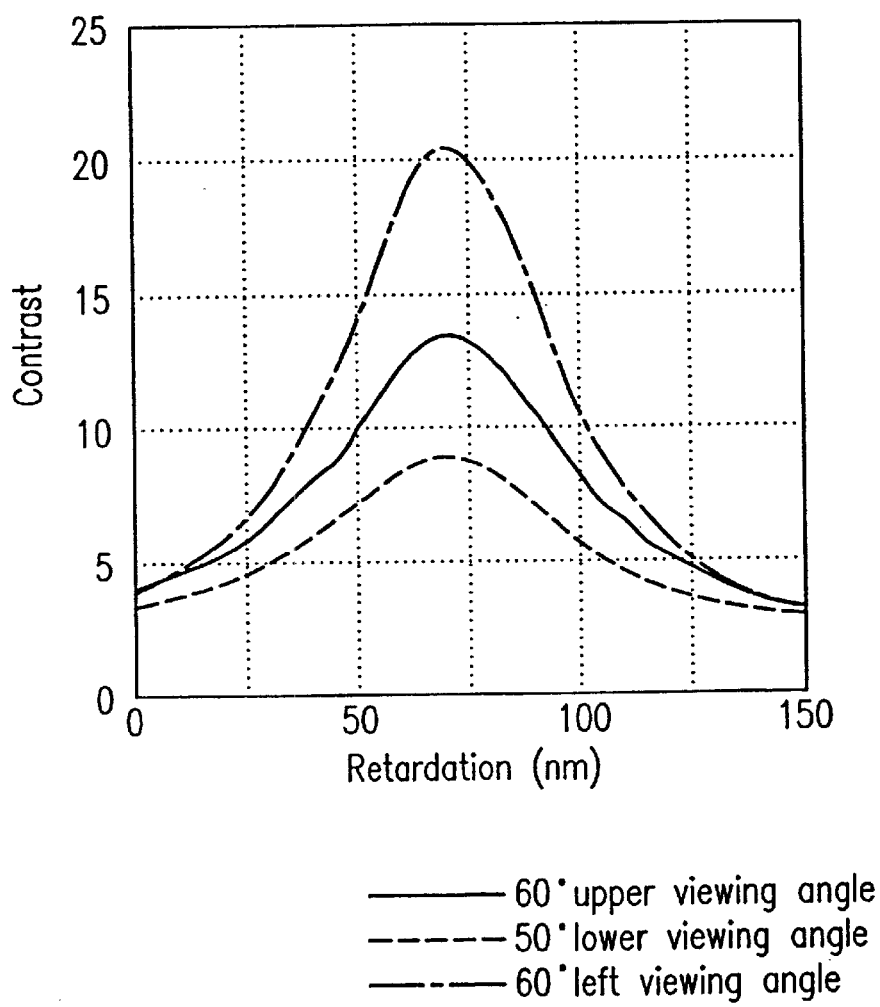
FIG. 18 is a graph illustrating the relationship between the retardation and the contrast according to Embodiment 4 of the present invention.

FIG. 17 shows an isocontrast diagram of the present embodiment. FIG. 18 illustrates the relationship between the retardation and the contrast at each of different viewing angles (i.e., 60° upper viewing angle, 50° lower viewing angle, and 60° left viewing angle). From the data shown above and the actual image evaluation, it was confirmed that there is provided an effect of increasing the viewing angle when the retardation is 1 to 125 nm, preferably 10 to 90 nm. It was also confirmed that the retardation should preferably be doubled when either the positive phase plate 401A or 401B is provided only on one side of the liquid crystal display device.

The principle of how the viewing angle can be increased will be described. The positive phase plates 401A and 401B used in the present embodiment are each represented by an index ellipsoid having a positive refractive index anisotropy. The positive phase plates 401A and 401B are arranged so that their axes 401AX and 401BX, along which the maximum refractive index is provided, are respectively orthogonal to the absorption axes 101AX and 101BX of the adjacent polarizers 101A and 101B. Therefore, the positive phase plates 401A and 401B have no contribution to the normal-viewing-direction birefringence, i.e., the transmission. However, as in Embodiment 3, the positive phase plates 401A and 401B have the effect of compensating for the retardation of the liquid crystal layer 104 in a black display which occurs when viewed from an inclined direction.

By additionally providing the positive phase plates 401A and 401B having a positive refractive index anisotropy as described above, it is possible to increase the viewing angle.

In the present embodiment, the positive phase plates 401A and 401B having a positive refractive index anisotropy are provided on each side of the liquid crystal display device 105. However, even when a positive phase plate is provided only on one side of the liquid crystal display device, it is possible to provide an effect of increasing the view angle for a practically sufficient display quality, though it may be slightly asymmetric in the left-right direction.

Where the positive phase plates 401A and 401B are provided on each side of the liquid crystal display device 105, the maximum refractive index axes 401AX and 401BX do not have to be orthogonal to the absorption axes 101AX and 101BX of the adjacent polarizers 101A and 101B, respectively. As long as the axes 401AX and 401BX are orthogonal to each other, there is provided the effect of increasing the viewing angle. Where the positive phase plates 401A and 401B are provided only on one side of the liquid crystal display device 105, however, the normal-viewing-direction contrast may be significantly reduced unless the axes 401AX and 401BX are orthogonal to the absorption axes 101AX and 101BX of the adjacent polarizers 101A and 101B, respectively.

Embodiment 5

Figure 19:
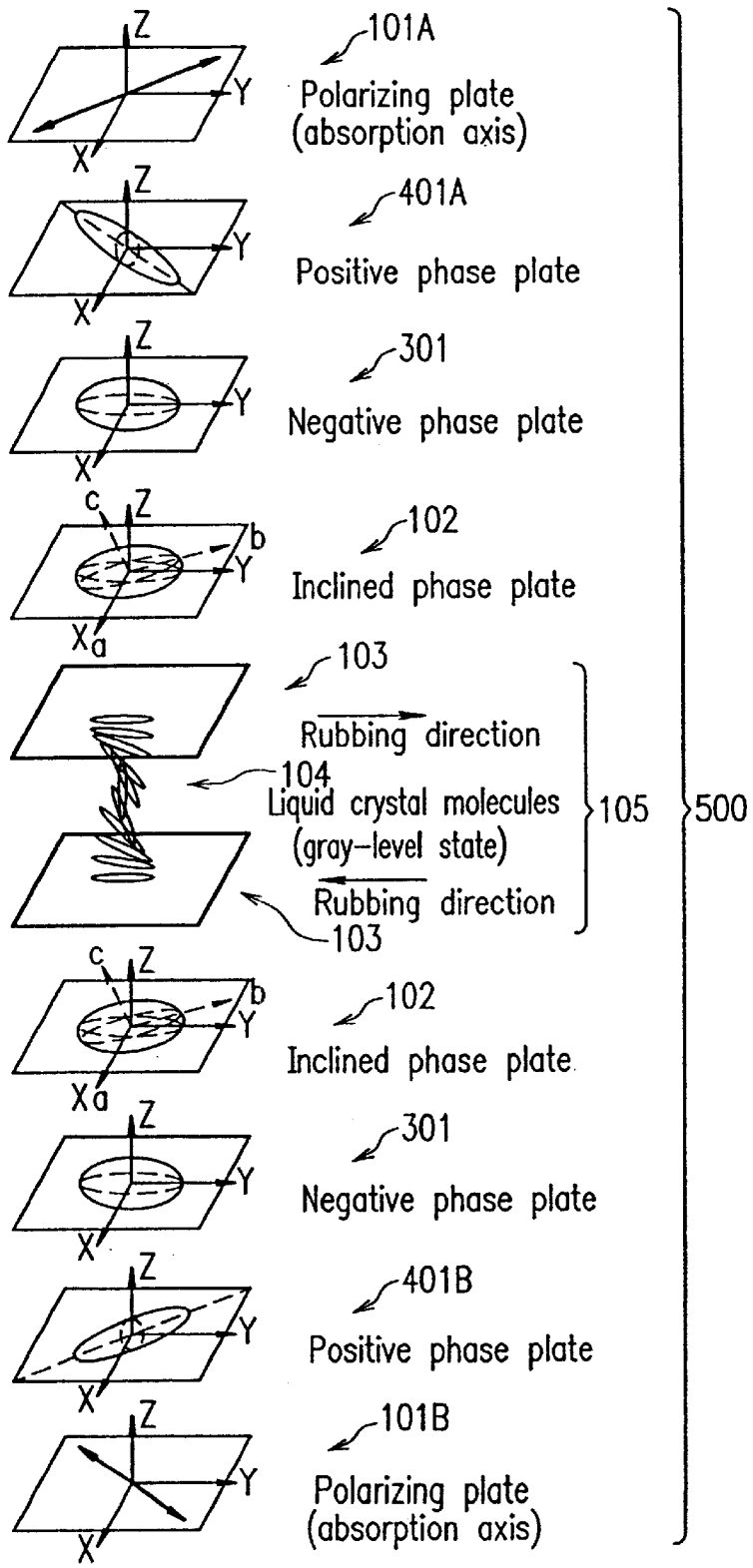
FIG. 19 illustrates a liquid crystal display apparatus according to Embodiment 5 of the present invention.

FIG. 19 illustrates a liquid crystal display apparatus 500 according to this embodiment. In the present embodiment, the positive phase plates 401A and 401B were added to the liquid crystal display apparatus 300 of Embodiment 3 shown in FIG. 14 (the retardation of a phase plate having a negative refractive index anisotropy is 70 nm). The positive phase plates 401A and 401B were inserted between the negative phase plates 301 and the polarizers 101A and 101B, respectively.

Table 4 below shows various retardations of the positive phase plates 401A and 401B having a positive refractive index anisotropy and the upper, left, right and lower viewing angles at which a contrast of 10 is obtained. Herein, the retardation of the positive phase plates 401A and 401B having a positive refractive index anisotropy is given by the following expression: Retardation=(nx−ny)×d, where each of nx and ny denotes an in-plane refractive index. As in Embodiment 2, the upper, left, right and lower viewing angles are defined as shown in FIG. 12.

TABLE 4

Relationship between various phase plates and their viewing angle characteristics

| | | | | |
|---|---|---|---|---|
| Retardation | 0 | 40 | 80 | 120 |
| Upper viewing angle | 44 | 65 | 69 | 72 |

TABLE 4-continued

Relationship between various phase plates and
their viewing angle characteristics

| | | | | |
|---|---|---|---|---|
| Left viewing angle | 46 | 72 | 77 | 77 |
| Right viewing angle | 46 | 73 | >80 | >80 |
| Lower viewing angle | 39 | 47 | 48 | 49 |

Units:
Retardation (nm),
viewing angle (°)

Figure 20:
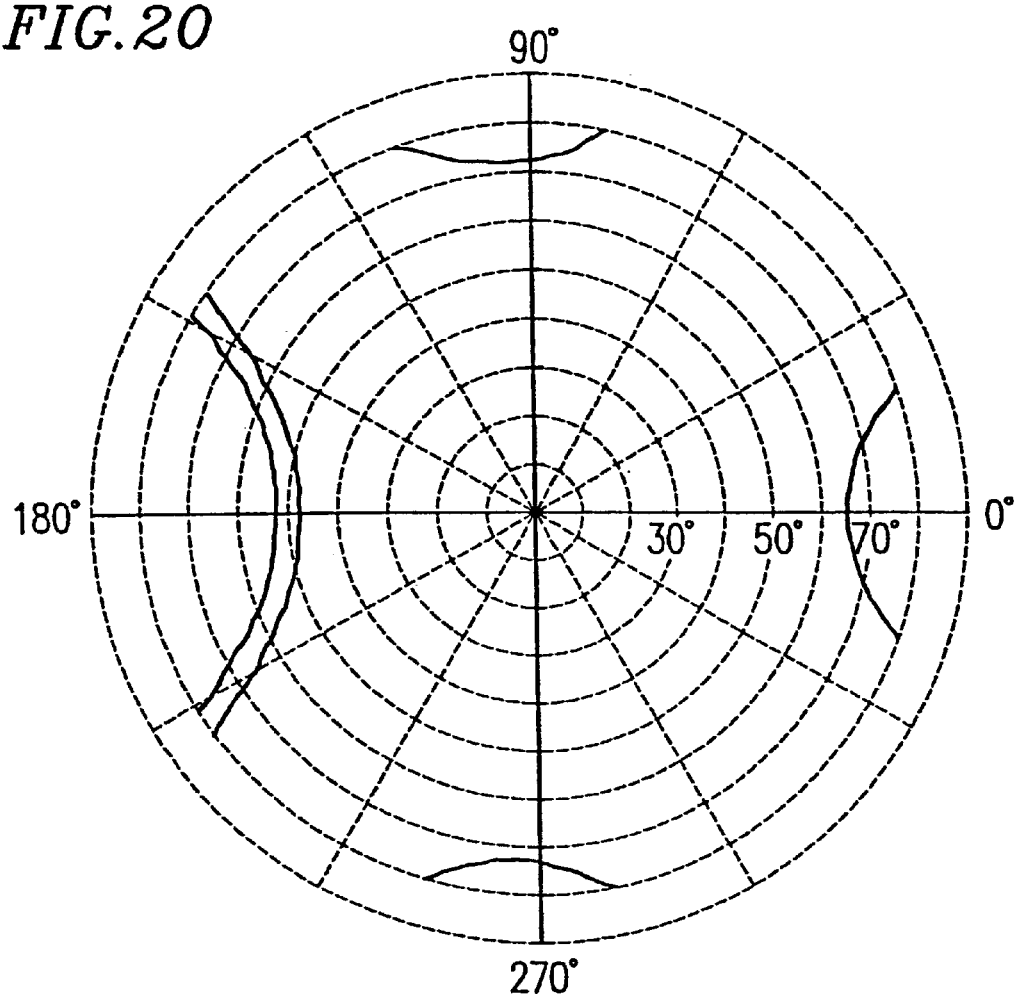
FIG. 20 is an isocontrast diagram of the liquid crystal display apparatus according to Embodiment 5 of the present invention.

As can be seen from Table 4, it has been found that the widest viewing angle characteristics are obtained when the retardation of the positive phase plates 401A and 401B is in the vicinity of 120 nm. When the retardation was 80 nm or more, a reversal phenomenon (where a near-black gray level is reversed) was significant in the lower viewing angle. As a result, it appeared that the display quality was most desirable at a retardation of 40 nm, where the apparatus had a wide viewing angle across which a good contrast was obtained while substantially no reversal phenomenon was observed. FIG. 20 shows an isocontrast diagram for a retardation of 40 nm.

Figure 21:
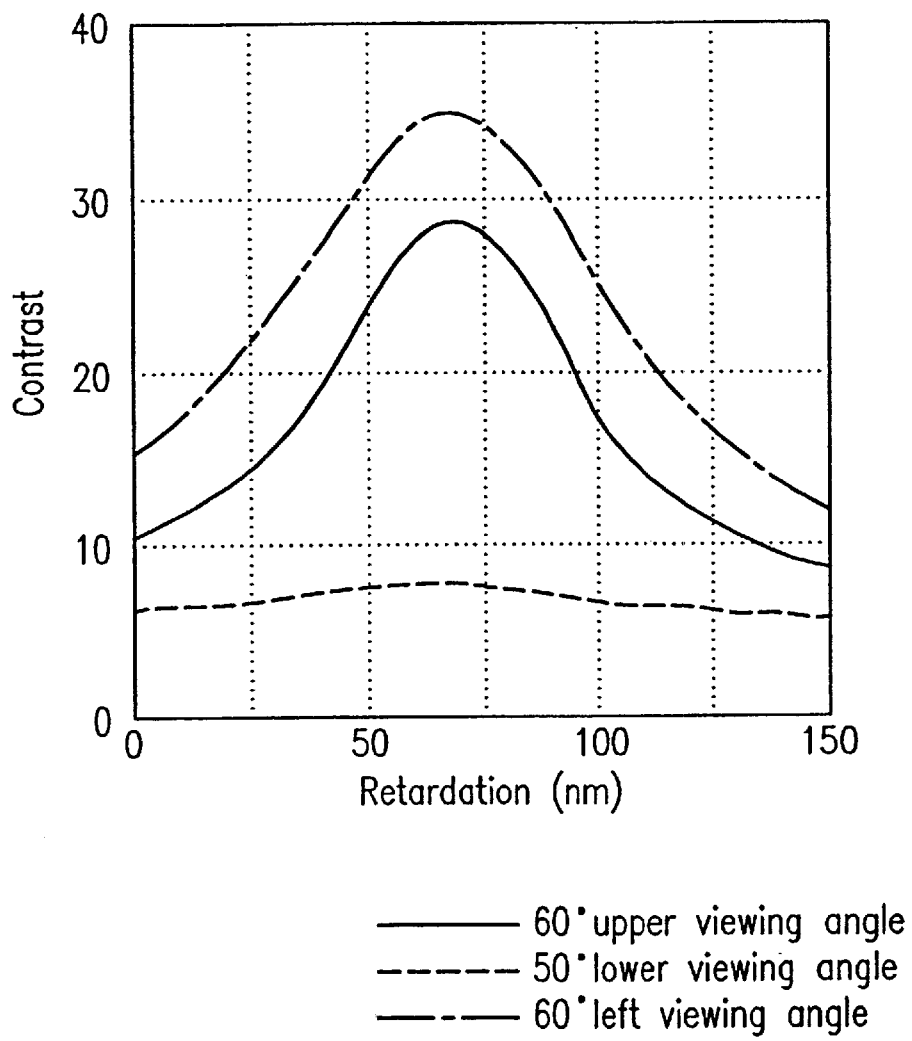
FIG. 21 is a graph illustrating the relationship between the retardation and the contrast according to Embodiment 5 of the present invention.

FIG. 21 illustrates the relationship between the retardation and the contrast at each of different viewing angles (i.e., 60° upper viewing angle, 60° left viewing angle, and 50° lower viewing angle for this embodiment). It can be seen from this data that the optimal retardation is 60 to 70 nm (should be doubled to 120 to 140 nm when the phase plate is provided only on one side of the liquid crystal display device) if the contrast is considered most significantly while ignoring the gray-level reversal phenomenon.

The principle of how the viewing angle can be increased will not be described below as it is believed to be the same as described above in Embodiments 3 and 4.

In the present embodiment, the positive phase plates 401A and 401B having a positive refractive index anisotropy are provided on each side of the liquid crystal display device 105. However, even when a positive phase plate is provided only on one side of the liquid crystal display device, it is possible to provide an effect of increasing the viewing angle for a practically sufficient display quality, though it may be slightly asymmetric in the left-right direction.

From the data shown above and the actual image evaluation, it was confirmed that there is provided an effect of increasing the viewing angle when the retardation is 1 to 125 nm, preferably 10 to 90 nm. Where the positive phase plates 401A and 401B were provided only on one side of the liquid crystal display device (as in the present embodiment), similar effects were confirmed when the retardation was doubled.

It should be apparent from an optical analysis that the positive phase plates 401A and 401B and the negative phase plate 301 can be replaced with a single phase plate having a biaxial index ellipsoid.

Embodiment 6

Figure 22:
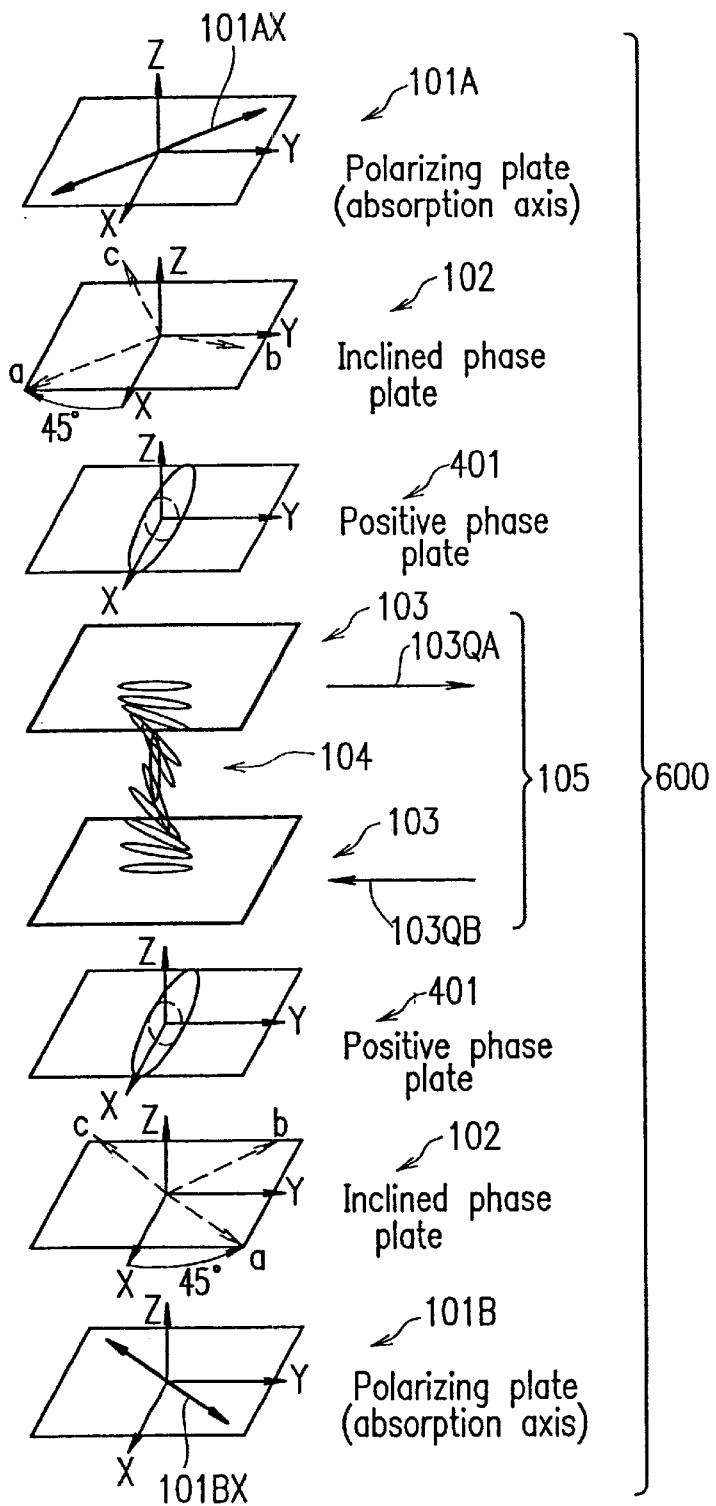
FIG. 22 illustrates a liquid crystal display apparatus according to Embodiment 6 of the present invention.

A liquid crystal display apparatus 600 of this embodiment will be described with reference to FIG. 22. In the present embodiment, the arrangement of the inclined phase plate 102 in which the index ellipsoid is inclined is quite different from that in the other embodiments. Specifically, the orientations of the pair of inclined phase plates 102 as in Embodiment 2 were respectively rotated by 45° so that the inclination directions 102D thereof as being projected onto the surface of one of the light transmissive substrates 103 are parallel or orthogonal (preferably, parallel) to the absorption axes 101AX and 101BX of the polarizers 101A and 101B, respectively.

A phase plate 401 made of a polyester and having a positive refractive index anisotropy was adjusted to have a retardation of 18.6 nm, and was inserted between each of the light transmissive substrates 103 and the adjacent one of the inclined phase plates 102. The retardation is equal to the in-plane phase difference of the inclined phase plate 102 used in, for example, Embodiment 2 (inclination angle: 40°, thickness: 15 μm).

The positive phase plate 401 is arranged so that its slow axis (X axis) is orthogonal to the rubbing direction 103QA, 103QB. Thus, the liquid crystal orientation direction coincides with the Y axis of the positive phase plate 401.

Therefore, the retardation of the liquid crystal molecules 104Q in the vicinity of one of the alignment films 103Q in the presence of an applied voltage can be compensated for by this positive phase plate 401.

In the present embodiment, the properties of the inclined phase plate 102 were varied. More specifically, while maintaining the principal refractive index na=nb=1.500 and nc=1.497, the inclination angle and the thickness were varied as follows. Tables 5–7 below show the upper, left and lower viewing angles, respectively, at which a contrast of 10 is obtained for various thicknesses and inclination angles. As in Embodiment 2, the upper, left, right and lower viewing angles are defined as shown in FIG. 12.

TABLE 5

Upper viewing angle at which
contrast of 10 is obtained

| | Thickness | | | | |
|---|---|---|---|---|---|
| Inclination angle | 20 | 25 | 30 | 40 | 60 |
| 20 | 53 | 57 | 61 | 65 | 32 |
| 22.5 | 54 | 75 | 70 | 63 | 30 |
| 30 | 56 | 60 | >80 | 59 | 25 |
| 40 | 58 | 53 | 53 | 48 | 23 |
| 60 | 47 | 47 | 47 | 48 | 28 |

Units:
Inclination angle (°),
Thickness (μm),
viewing angle (°)

TABLE 6

Left viewing angle at which
contrast of 10 is obtained

| | Thickness | | | | |
|---|---|---|---|---|---|
| Inclination angle | 20 | 25 | 30 | 40 | 60 |
| 20 | 57 | 58 | 60 | 67 | 56 |
| 22.5 | 57 | 61 | 62 | 69 | 62 |
| 30 | 55 | 55 | 67 | 72 | 70 |
| 40 | 53 | 52 | 57 | >80 | >80 |
| 60 | 48 | 50 | 52 | 55 | 55 |

Units:
Inclination angle (°),
Thickness (μm),
viewing angle (°)

TABLE 7

Lower viewing angle at which contrast of 10 is obtained

| Inclination angle | Thickness | | | | |
|---|---|---|---|---|---|
| | 20 | 25 | 30 | 40 | 60 |
| 20 | 47 | 47 | 47 | 47 | 47 |
| 22.5 | 45 | 47 | 45 | 42 | 39 |
| 30 | 44 | 43 | 42 | 39 | 35 |
| 40 | 42 | 42 | 39 | 33 | 24 |
| 60 | 40 | 40 | 35 | 31 | 23 |

Units:
Inclination angle (°),
Thickness (μm),
viewing angle (°)

Figure 23:
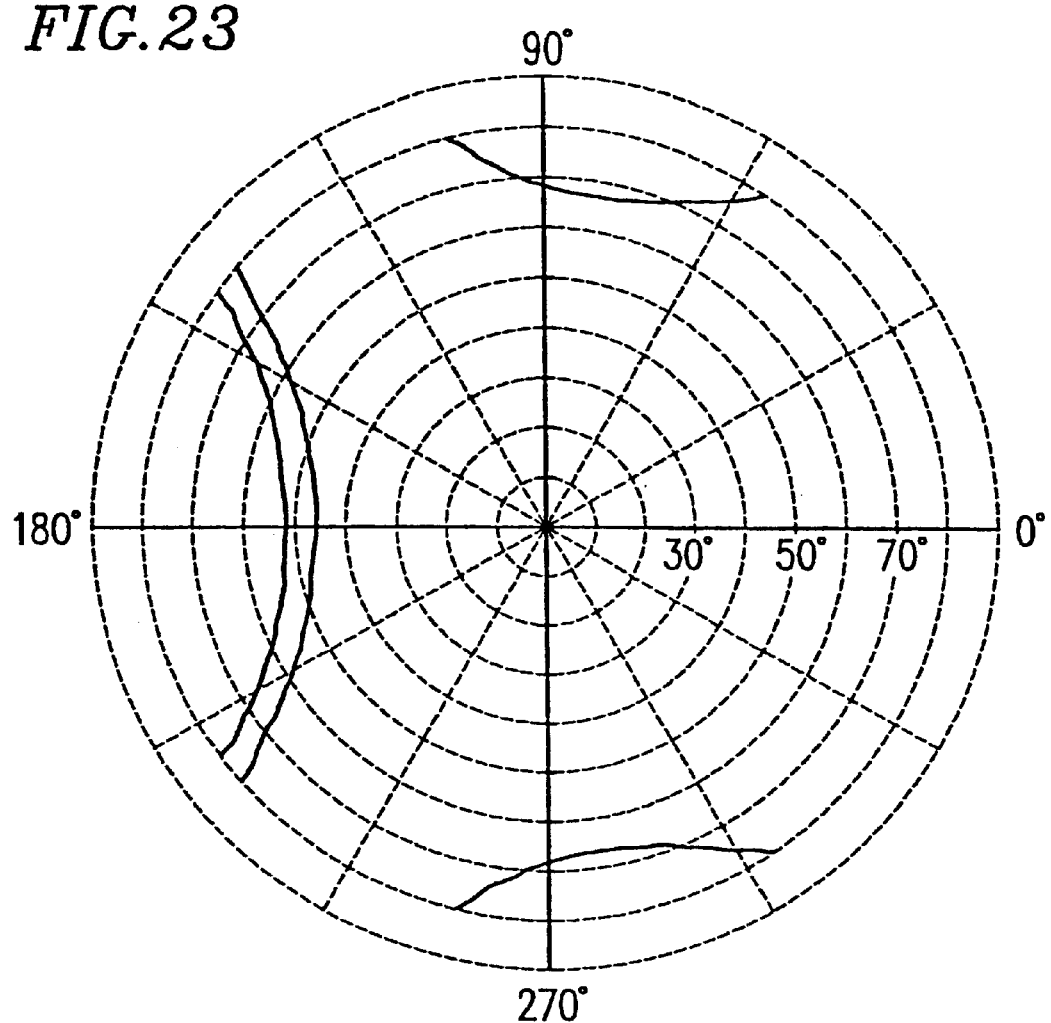
FIG. 23 is an isocontrast diagram of the liquid crystal display apparatus according to Embodiment 6 of the present invention.

A wide viewing angle display was obtained when the inclination angle was about 30° and the thickness was about 30 μm. FIG. 23 shows an isocontrast diagram for such a setting.

From actual image evaluation, it was confirmed that there is provided an effect of increasing the viewing angle when the retardation of the positive phase plate 401 is 1 to 100 nm, preferably 5 to 40 nm.

The present embodiment differs from the embodiments above in terms of how to compensate for the normal-viewing-direction retardation.

When the wavelength dispersion characteristics of the refractive index of the inclined phase plate 102 are significantly different from those of the liquid crystal molecules 104Q, there may occur the coloring phenomenon in the display, thereby deteriorating the display quality.

In Embodiments 1 to 5, the normal-viewing-direction retardation is compensated for by the inclined phase plate 102. If the coloring phenomenon occurs in the arrangements of these embodiments, the arrangement of the present embodiment can be employed. This is because the positive phase plate 401, as compared to the inclined phase plate 102, permits a greater freedom in the selection of the material, whereby it is easier to control the wavelength dispersion characteristics of the refractive index.

In this way, it was possible to easily obtain a liquid crystal display apparatus which has a substantially reduced coloring phenomenon as viewed from the normal viewing direction.

Embodiment 7

Figure 24:
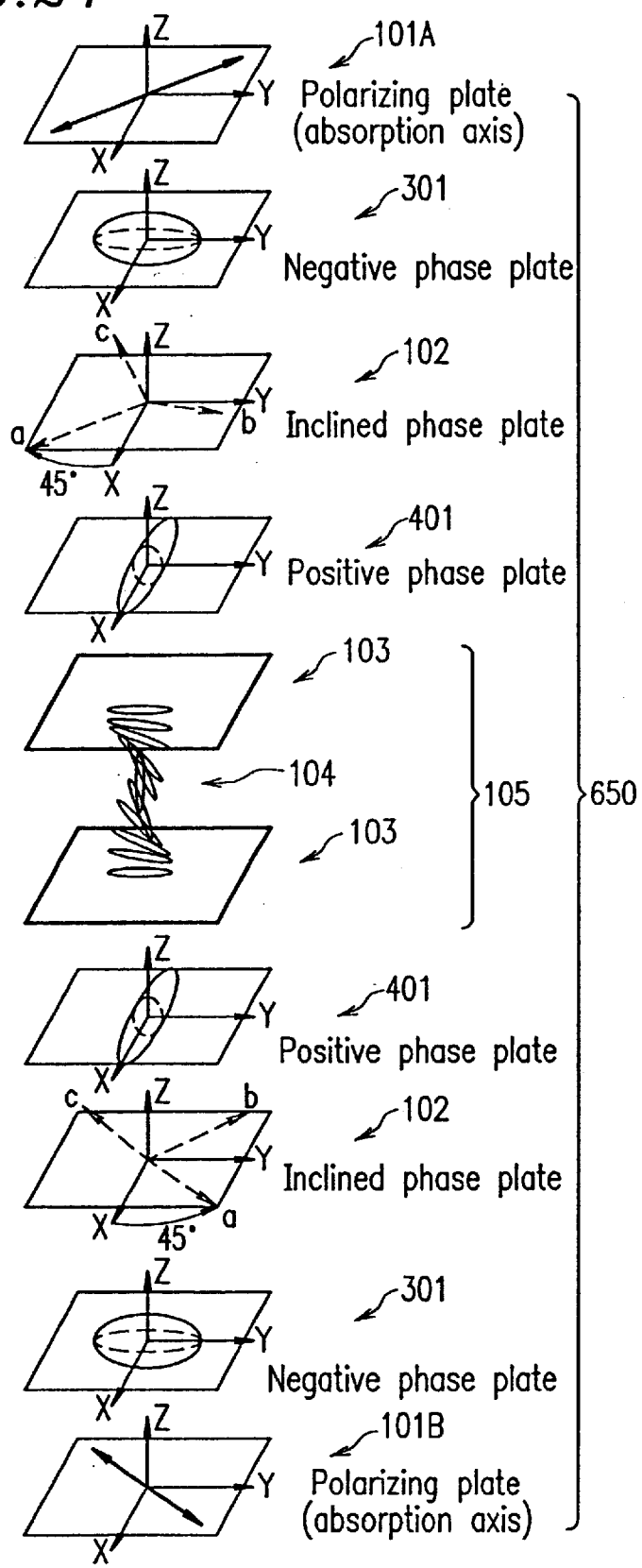
FIG. 24 illustrates a liquid crystal display apparatus according to Embodiment 7 of the present invention.

A liquid crystal display apparatus 650 according to Embodiment 7 of the present invention will be described with reference to FIG. 24. As shown in FIG. 24, the negative phase plate 301 can be inserted between the inclined phase plate 102 and each of the polarizers 101A and 101B. The principle of compensation is the same as described above in Embodiment 3. A further increase in the viewing angle was confirmed when the inclined phase plate 102 had an inclination angle of about 30° and a thickness of about 30 μm.

Table 8 below shows various retardations of the negative phase plate 301 having a negative refractive index anisotropy, and the upper, left-right and lower viewing angles at which a contrast of 10 is obtained. The retardation of the negative phase plate 301 having a negative refractive index anisotropy is given by the following expression: Retardation=(nx−nz)×d, where nx (=ny) is an in-plane refractive index. As in Embodiment 2, the upper, left, right and lower viewing angles are defined as shown in FIG. 12.

TABLE 8

Viewing angle at which contrast of 10 is obtained

| Retardation along thickness direction | 0 | 20 | 30 | 70 |
|---|---|---|---|---|
| Upper viewing angle | >80 | >80 | 70 | 65 |
| Left-right viewing angle | 67 | 75 | 79 | 80 |
| Lower viewing angle | 42 | 44 | 46 | 47 |

Units:
Retardation along thickness direction (nm),
viewing angle (°)
(The retardation of the negative phase plate is given by (nx − nz) × d, where nx = ny)

Figure 25:
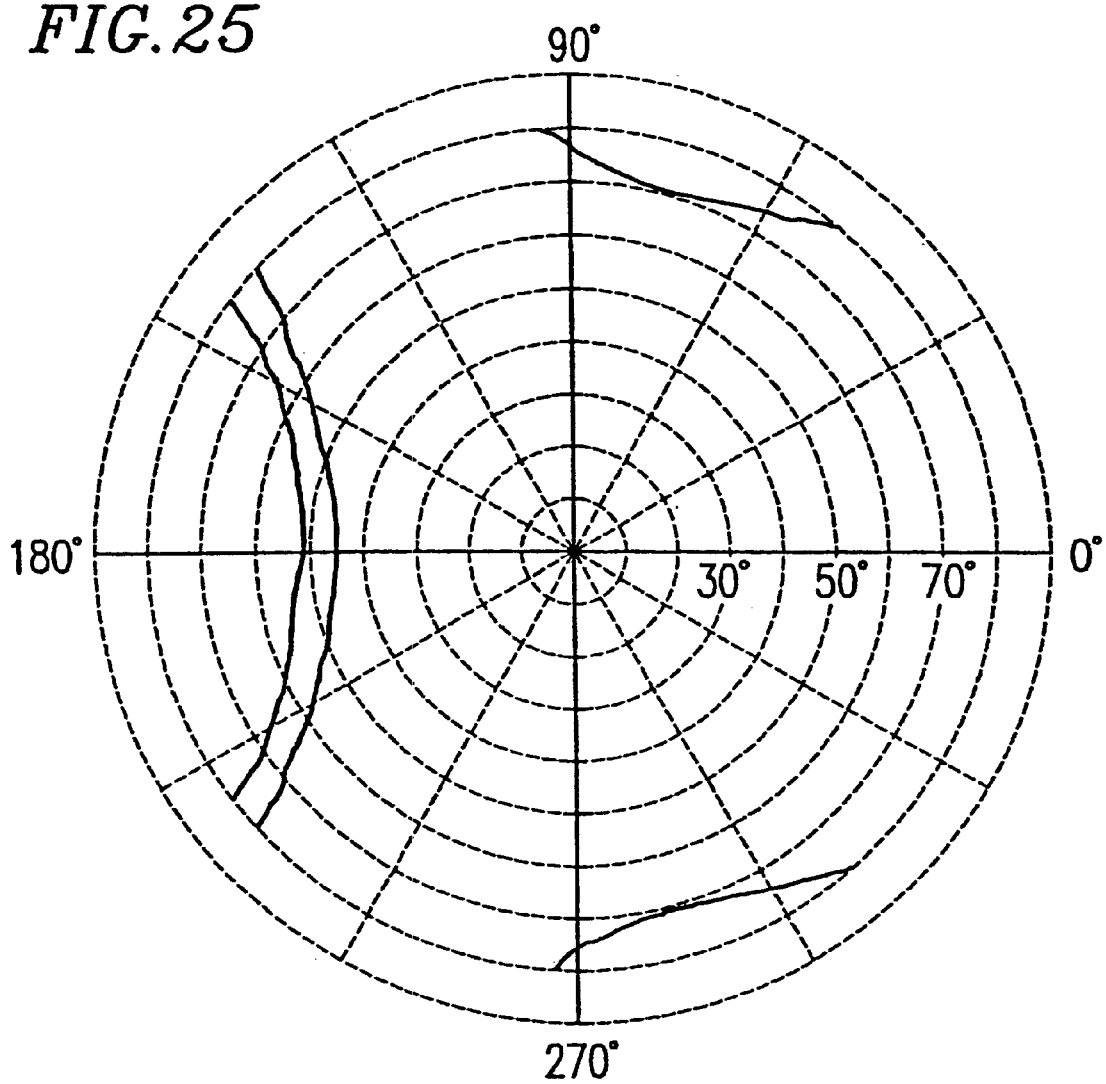
FIG. 25 is another isocontrast diagram of a liquid crystal display apparatus according to Embodiment 7 of the present invention.

Even when the negative phase plate 301 is provided only on one side of the liquid crystal display device, substantially the same viewing angle characteristics as shown above can be obtained by doubling the retardation. FIG. 25 shows an isocontrast diagram for a retardation of 20 nm with one or two negative phase plates 301.

Figure 26:
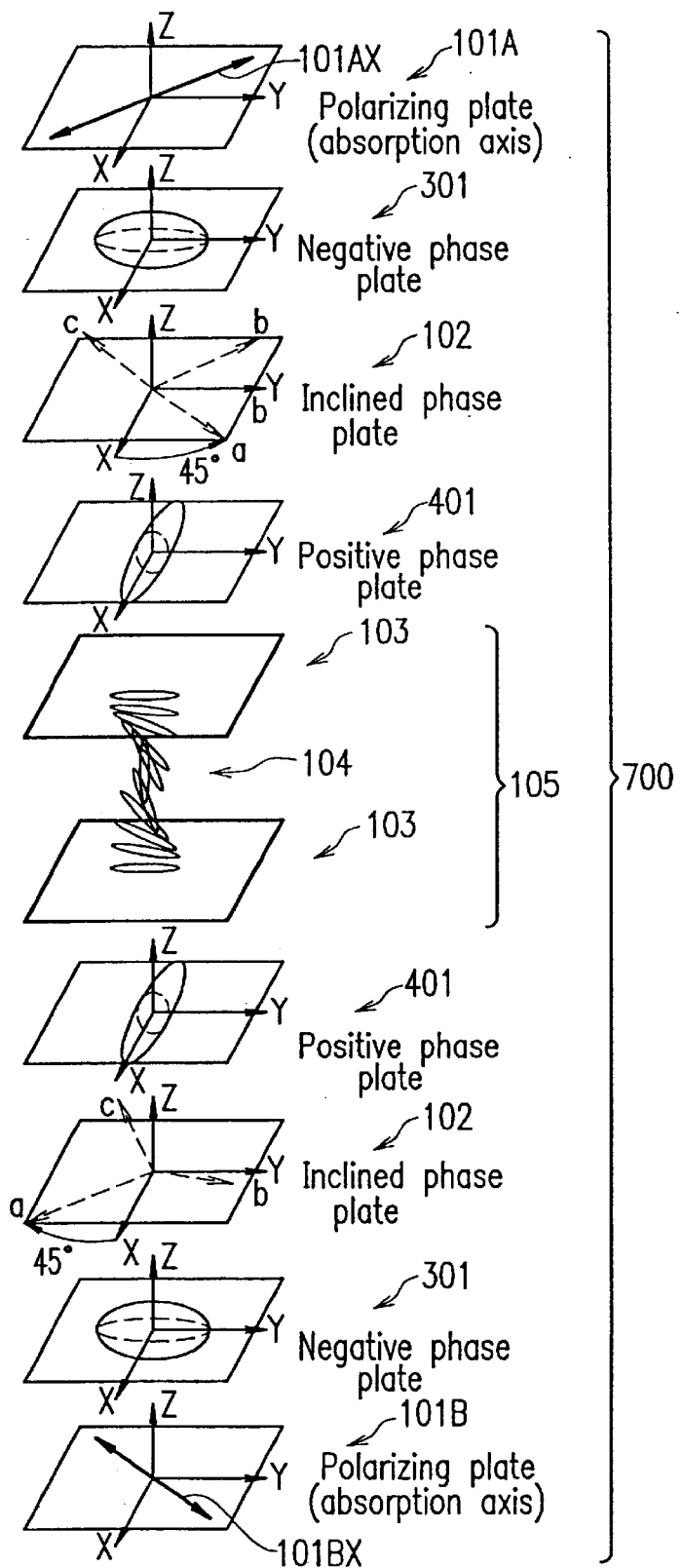
FIG. 26 illustrates another liquid crystal display devise according to Embodiment 7 of the present invention.

Another liquid crystal display apparatus 700 according to Embodiment 7 of the present invention will be described with reference to FIG. 26. The liquid crystal display apparatus 700 of this embodiment is similar to the liquid crystal display apparatus 600 of Embodiment 6 described above with reference to FIG. 22, but the liquid crystal display apparatus 700 includes the negative phase plate 301 having a negative refractive index anisotropy which is additionally provided between the inclined phase plate 102 and each of the polarizers 101A and 101B.

The axis "a" of each of the inclined phase plates 102 is orthogonal or parallel to the absorption axis 101AX or 101BX of the adjacent one of the polarizers 101A and 101B. Where the inclined phase plate 102 is provided on each side of the liquid crystal display device 105, the axis "a" each of the inclined phase plates 102 is orthogonal to the axis "a" of the other one of the inclined phase plates 102.

The nx axis of the positive phase plate 401 means a slow axis. The ny axis means a fast axis. Herein, nx>ny holds. Typically, the drawing direction of a uniaxially-drawn film is the slow axis in many cases (though it depends upon the film material). For the negative phase plate 301, nx=ny>nz holds. The nz axis corresponds to the direction normal to the film. The nx axis and the ny axis exist in the plane of the film.

In Embodiments 1 to 7 above, the liquid crystal layer 104 has a thickness of 4.5 μm and the liquid crystal molecules 104Q have a refractive index anisotropy of Δn=0.06, i.e., a retardation of 270 nm. It has been confirmed that the retardation can suitably be 180 to 500 nm, and preferably 220 to 350 nm as long as the viewing angle is increased and other display qualities, such as a practically sufficient brightness, are maintained.

Each of Embodiments 1 to 7 employs an "antiparallel rubbing cell" (also known as a "homogeneous cell") mode in which the alignment films 103Q are all rubbed in antiparallel directions. This liquid crystal mode, in combination with the inclined phase plate 102, provided an increase in the viewing angle as described above in Embodiments 1 to 7. It was also confirmed that the response time in these embodiments was about one half of that which is typically obtained with the conventional TN mode (30 ms).

It can be understood that the response time was so reduced due to the simplicity of the orientation structure because the homogeneous orientation does not have a twist as in the TN orientation.

When the thickness of the liquid crystal layer is 4.5 µm, the refractive index anisotropy in the TN mode is typically about Δn=0.08, whereas the refractive index anisotropy in the present invention is typically Δn=0.06. Thus, according to the present invention, it is possible to reduce the value of Δn from that of a conventional liquid crystal mode. Generally, if the value of Δn is reduced, the viscosity of the liquid crystal material is reduced, which also has a reducing effect on the response time of the liquid crystal material.

Where a liquid crystal material having a refractive index anisotropy of about Δn=0.08 is used as in the prior art, the thickness of the liquid crystal layer can be reduced from that of the prior art. In such a case, the response speed can be reduced in proportion to the square of the change in the thickness. Thus, by employing a homogeneous orientation, the present invention improves not only the viewing angle characteristics but also the display quality when displaying a motion picture.

It was confirmed that there is provided an effect of increasing the viewing angle when the inclination direction of the inclined phase plate 102 in which the index ellipsoid is inclined is at an angle of −5° to 50° with respect to the absorption axes 101AX and 101BX of the polarizers 101A and 101B. However, it should be understood that it may be necessary to adjust the inclined phase plate 102 or additionally provide the positive phase plate 401 so as to cancel the retardation of the liquid crystal molecules 104Q in a black display according to the principles described above in Embodiments 2 to 6.

In Embodiments 1 to 5, the above-described effect was significantly provided when the inclination direction of the inclined phase plate 102 in which the index ellipsoid 102P is inclined is in the range of −5° to 5°, and preferably 0°, with respect to the orientation direction of the liquid crystal molecules 104Q.

In Embodiments 6 and 7, the above-described effect was provided when the inclination direction of the inclined phase plate 102 in which the index ellipsoid 102P is inclined is in the range of 40° to 50°, and preferably 45°, with respect to the orientation direction of the liquid crystal molecules 104Q.

When an optical element which diffuses transmitted light in the normal and near-normal viewing directions toward the upper and lower directions (i.e., an element having a lens effect only in the first order direction) was provided on the surface of the liquid crystal display apparatus of the present invention, the liquid crystal display apparatus exhibited a very wide viewing angle such that the displayed image is not substantially changed from any viewing angles.

As described in the embodiments above, the liquid crystal display apparatus of the present invention had increased viewing angle characteristics over conventional liquid crystal display apparatuses in the upper, lower, left and right directions. Although the liquid crystal display apparatus of the present invention had substantially symmetrical viewing angle characteristics with respect to the left-right viewing angles, the upper-lower viewing angles were not symmetrical. This can also be seen from the isocontrast diagrams shown above in various embodiments. By providing a lens element as described above, it was possible to obtain viewing angle characteristics which were substantially cylindrically symmetrical, and to realize a liquid crystal display apparatus whose display qualities were comparable to those of CRTs which are currently the mainstream display devices used in TVs.

Embodiment 8

Figure 27:
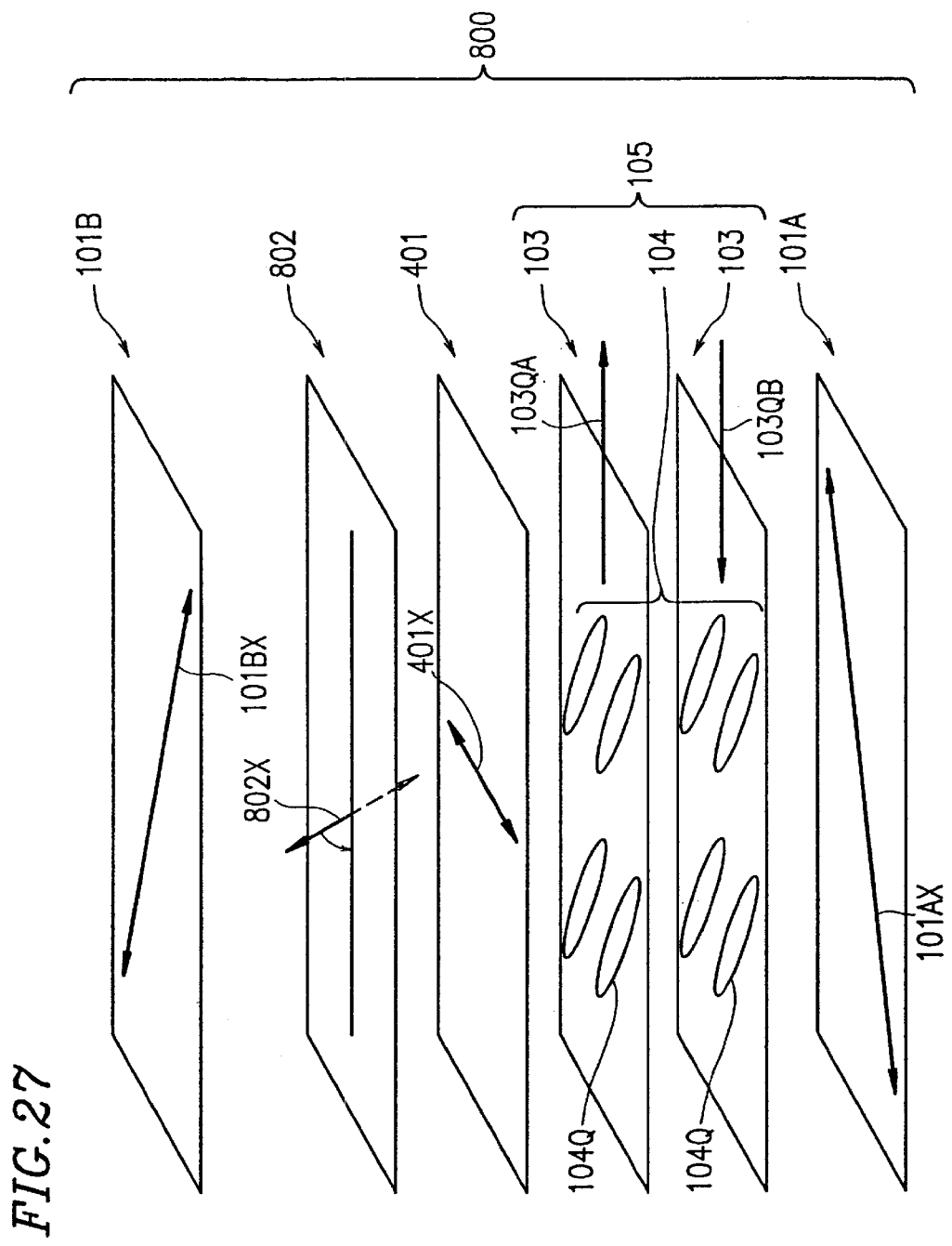
FIG. 27 illustrates a liquid crystal display apparatus according to Embodiment 8 of the present invention

FIG. 27 illustrates a liquid crystal display apparatus 800 according to Embodiment 8 of the present invention. Elements in FIG. 27 having like reference numerals to those shown in Embodiments 1 to 7 will not further be described.

The liquid crystal display apparatus 800 includes the liquid crystal display device 105, the polarizers 101A and 101B, a negative inclined phase plate 802 and a positive phase plate 401. The liquid crystal display device 105 includes the light transmissive substrates 103 and the liquid crystal layer 104. The polarizers 101A and 101B have the absorption axes 101AX and 101BX, respectively. The negative inclined phase plate 802 has the same configuration as that of the inclined phase plate 102 shown in FIG. 1. In the negative inclined phase plate 802, the index ellipsoid is inclined so that the axis "c", which is the direction of the minimum principal refractive index nc, makes the inclination angle θ1 with respect to the direction z normal to the negative inclined phase plate 802, and the negative inclined phase plate 802 has an inclination axis (inclination direction) 802X. The positive phase plate 401 has a slow axis 401X.

The absorption axes 101AX and 101BX are arranged to be orthogonal to each other. The light transmissive substrates 103 are respectively rubbed in antiparallel directions. The liquid crystal molecules 104Q of the liquid crystal layer 104 have a constant tilt direction. The slow axis 401X of the positive phase plate 401 is parallel or orthogonal to the rubbing directions 103QA and 103QB of the liquid crystal layer 104.

As illustrated in FIG. 11, the liquid crystal molecules 104Q rise clockwise from the plane of the glass substrate 103 by the pre-tilt angle 8PC in the absence of the applied voltage. The negative inclined phase plate 802 is arranged so that the inclination axis 802X of the negative inclined phase plate 802 is inclined counterclockwise from the normal direction z in a plane which is perpendicular to the plane of the glass substrate 103 including the rubbing directions 103QA and 103QB.

The inclined phase plate 102 is arranged so that the inclination axis (inclination direction) 802X of the negative inclined phase plate 802 is inclined from the normal direction in a direction opposite to the direction in which the liquid crystal molecules 104Q rise from the plane of the glass substrate 103 in the absence of an applied voltage.

The positive phase plate 401 and the negative inclined phase plate 802 compensate for the retardation of the liquid crystal layer 104 in the presence of a black display voltage. The slow axis 401X of the positive phase plate 401 makes an angle of about 45° with respect to each of the absorption axis 101AX of the polarizer 101A and the absorption axis 101BX of the polarizer 101B. Moreover, the direction of the inclination axis (inclination direction) 802X of the negative inclined phase plate 802 as being projected onto the surface of one of the light transmissive substrates makes an angle of about 45° with respect to each of the absorption axis 101AX of the polarizer 101A and the absorption axis 101BX of the polarizer 101B.

Figure 28:
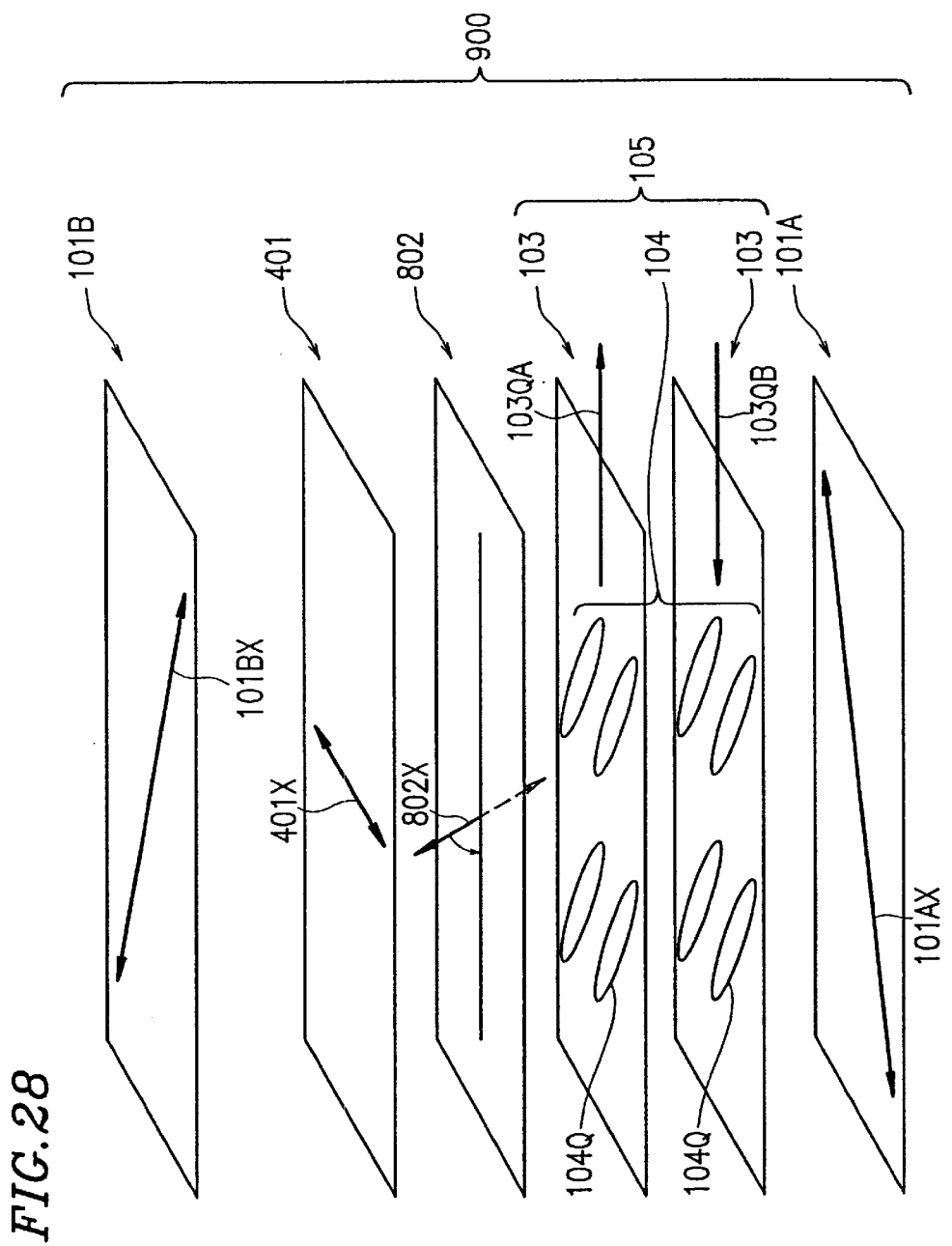
FIG. 28 illustrates another liquid crystal display apparatus according to Embodiment 8 of the present invention.
Figure 29:
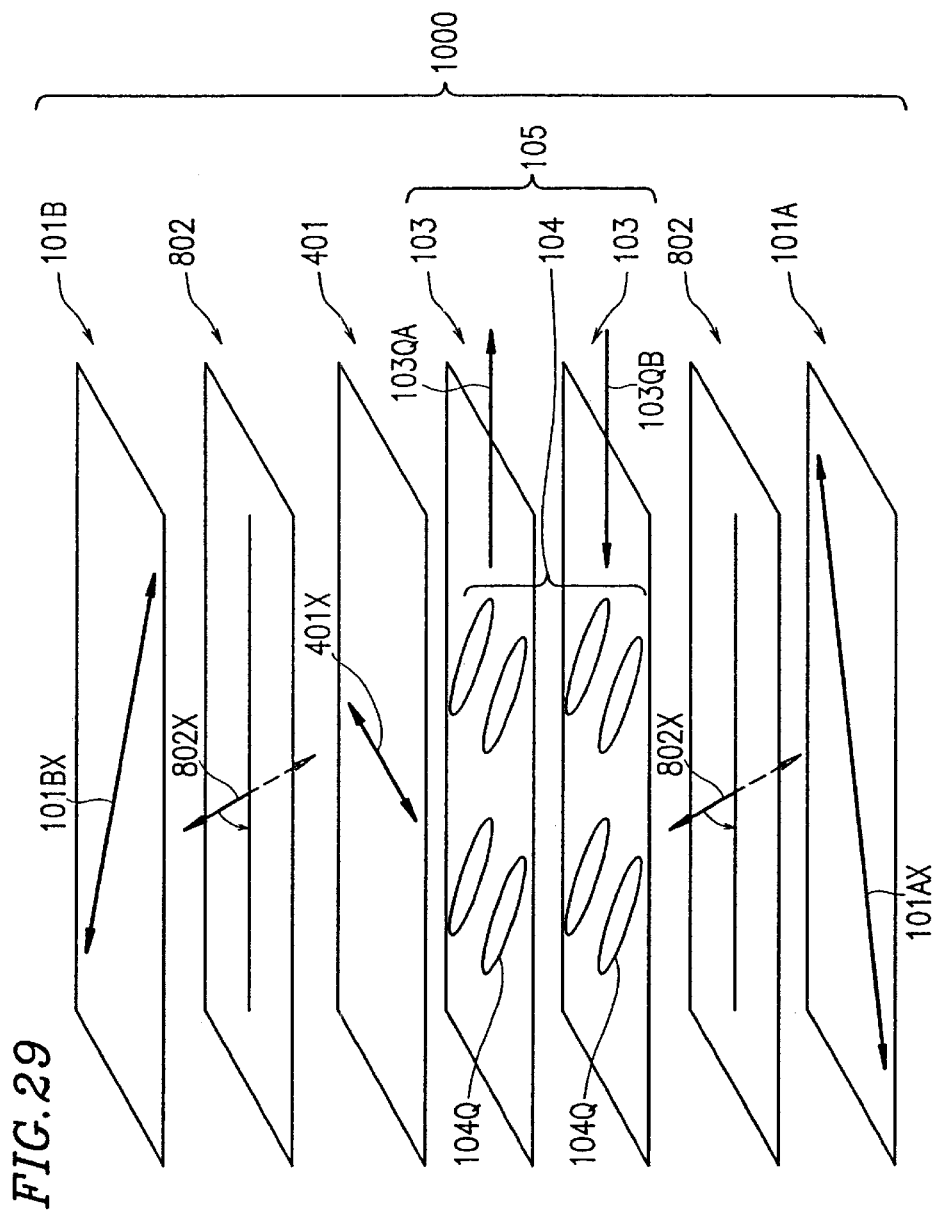
FIG. 29 illustrates still another liquid crystal display apparatus according to Embodiment 8 of the present invention.
Figure 30:
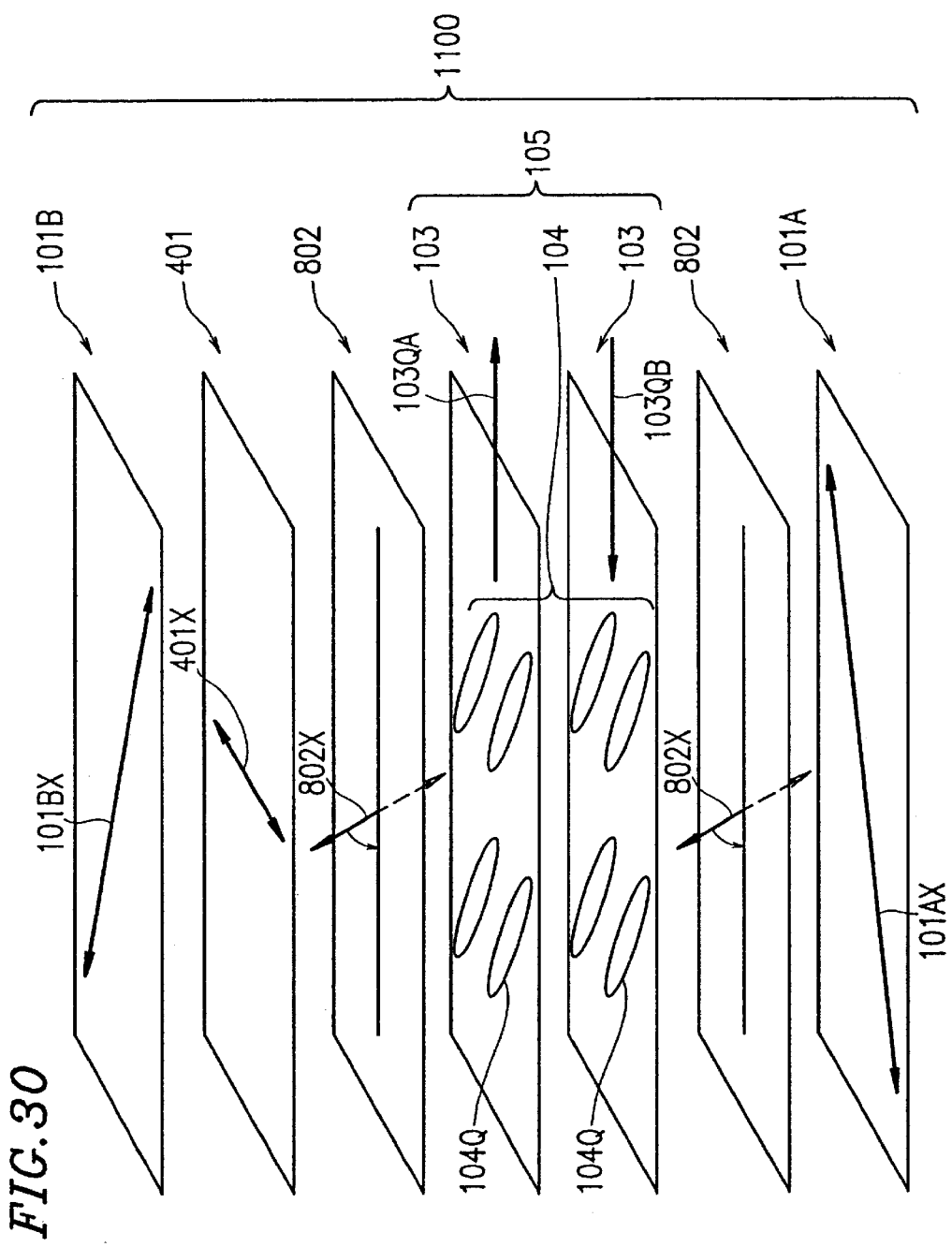
FIG. 30 illustrates still another liquid crystal display apparatus according to Embodiment 8 of the present invention.
Figure 31:
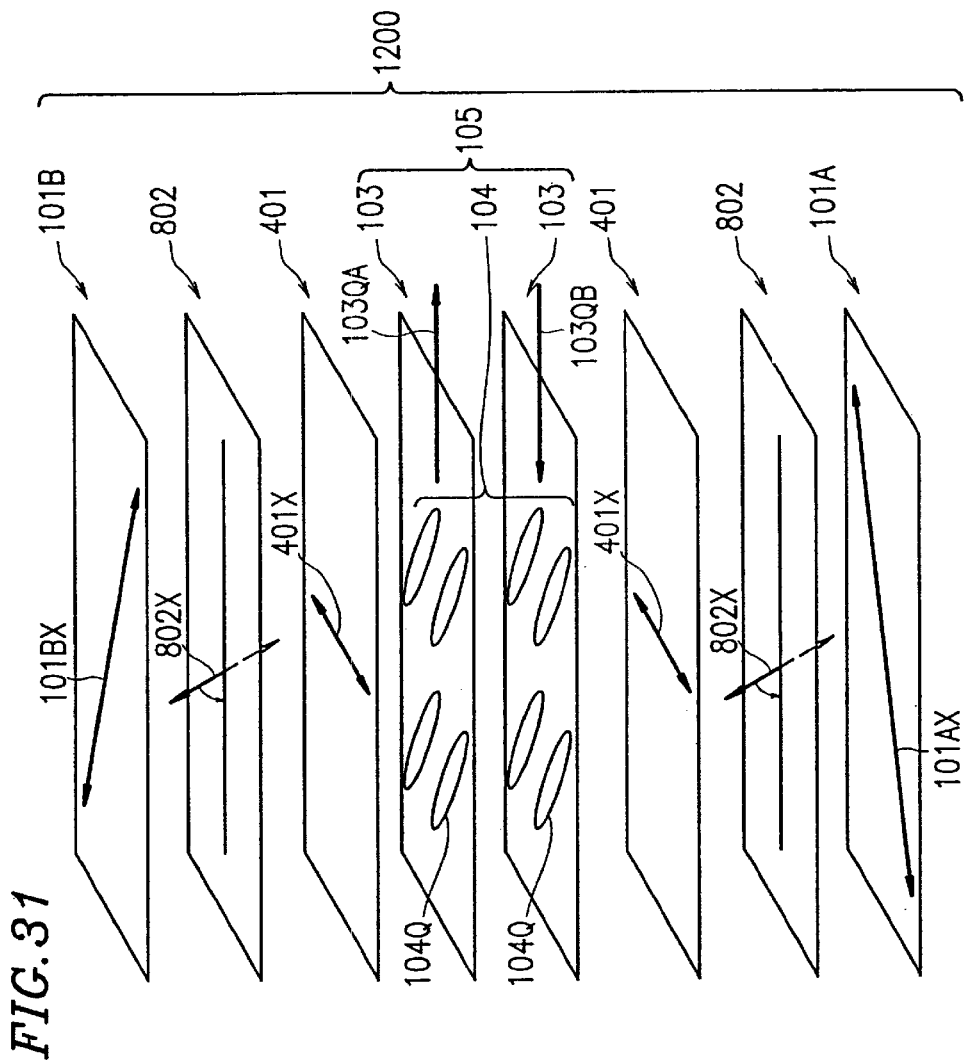
FIG. 31 illustrates still another liquid crystal display apparatus according to Embodiment 8 of the present invention.

FIG. 2B illustrates another liquid crystal display apparatus 900 according to Embodiment 8 of the present invention. Elements in FIG. 28 having like reference numerals to those shown in Embodiments 1 to 7 will not further be described. Referring to FIG. 28, the positive phase plate 401 is provided between the polarizer 101B and the negative inclined phase plate 802.

Each of FIGS. 29 to 32 illustrates still another liquid crystal display apparatus according to Embodiment 8 of the present invention. Each of the liquid crystal display apparatuses illustrated in FIGS. 29 to 32 is a variation to the liquid crystal display apparatus 800 of FIG. 27 with respect to the arrangement of the negative inclined phase plate 802 and the positive phase plate 401. With any of the arrangements of FIGS. 29 to 32, it is possible to obtain a performance comparable to that of the liquid crystal display apparatus shown in FIG. 27. The liquid crystal display apparatus 1300 will be described below with reference to FIG. 32.

A comparative liquid crystal display apparatus similar to that of Embodiment 1 was produced as follows. The liquid crystal display apparatus 100 having a structure as shown in FIG. 5 was first produced by a known method of producing a liquid crystal display apparatus. The inclined phase plate 102 was such that na=nb=1.500, nc=1.497, inclination angle =30°. The thickness of the liquid crystal layer 104 was 32 μm, and the birefringence (Δn) of the liquid crystal molecules was 1.0 . When a voltage of 7 V was applied through the liquid crystal display apparatus 100, a desirable black display was not observed, and the normal-viewing-direction contrast was about 50. A reversal of a near-white gray level was observed in a bright display.

This can be explained as follows. As the inclination angle of the inclined phase plate 102 is reduced, the film in-plane retardation is reduced while the birefringence (Δn) of the liquid crystal molecules is increased, thereby increasing the remaining retardation. As a result, the retardation does not become zero by a desired voltage. The reversal of a near-white gray level occurred because the initial liquid crystal retardation was increased beyond the half wavelength condition.

Figure 32:
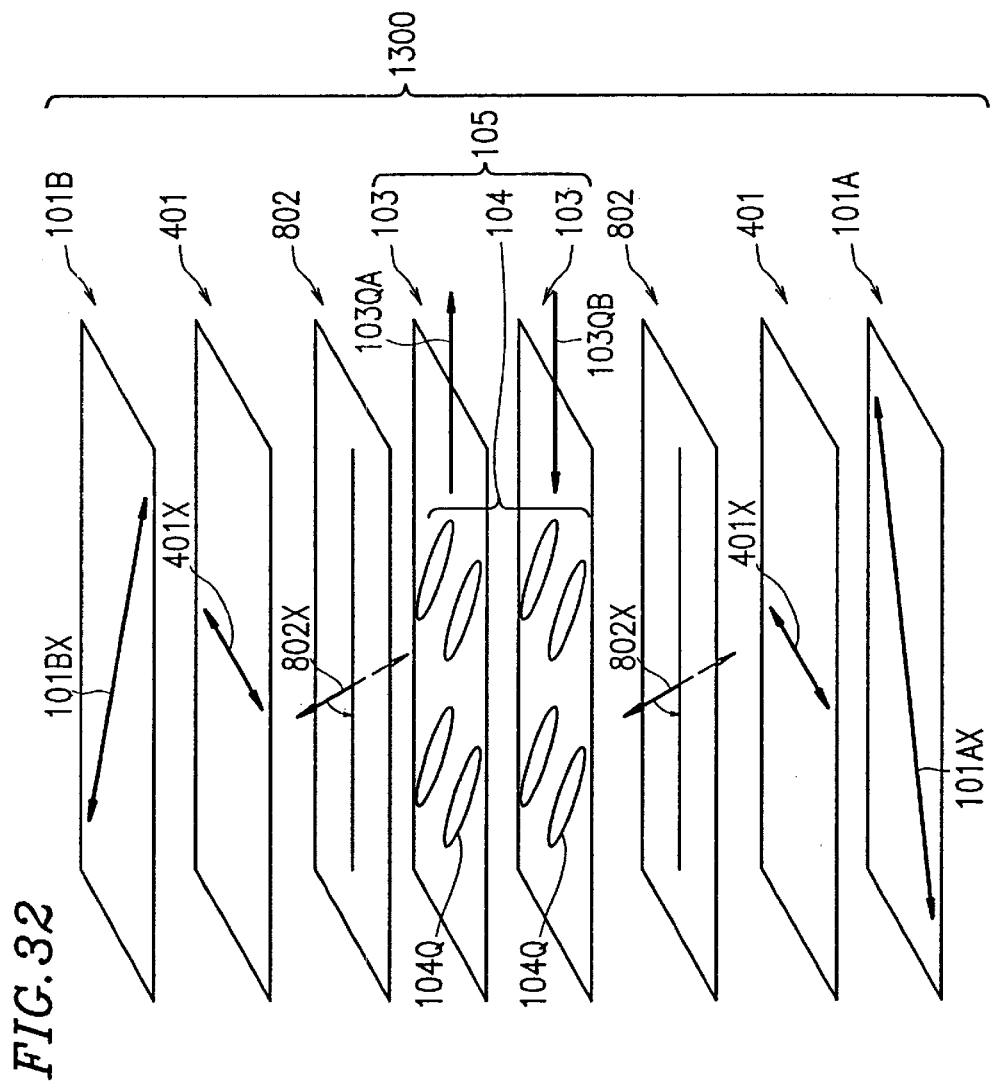
FIG. 32 illustrates still another liquid crystal display apparatus according to Embodiment 8 of the present invention.
Figure 33:
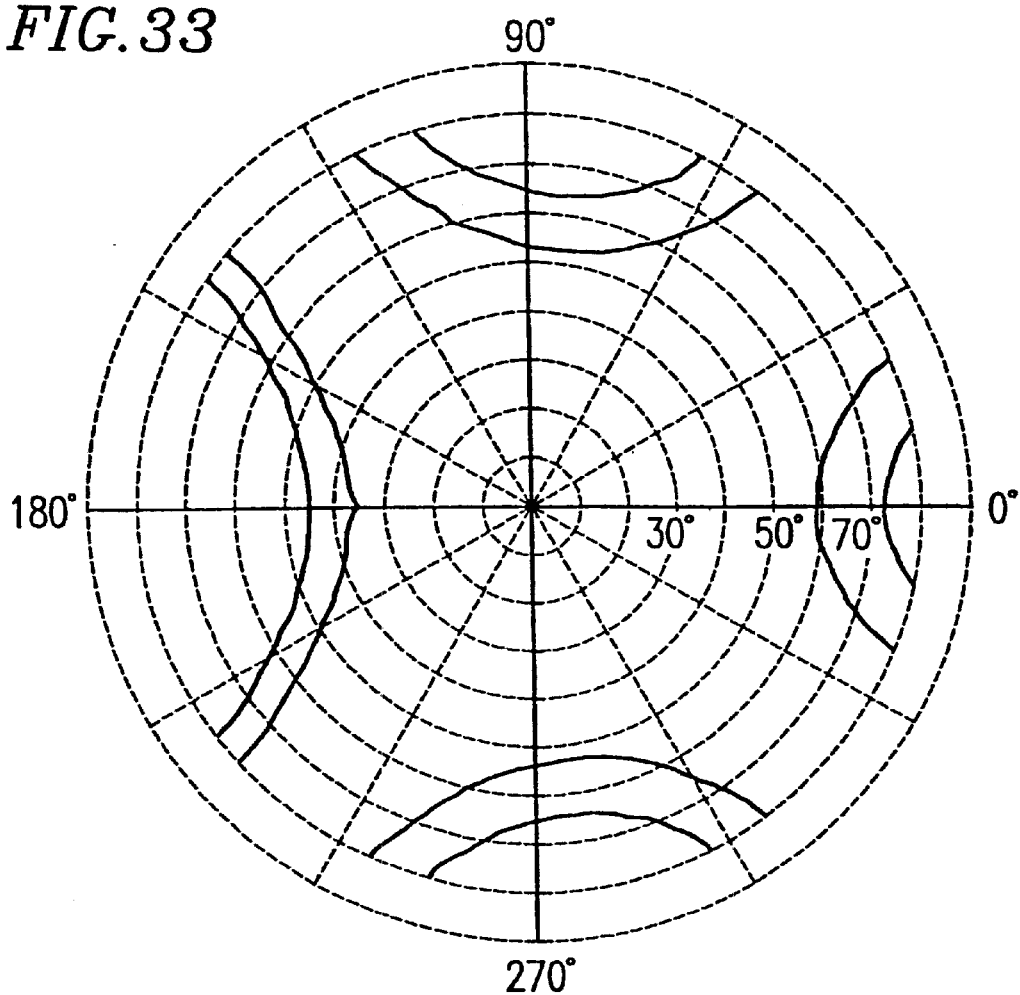
FIG. 33 is an isocontrast diagram of a liquid crystal display apparatus according to Embodiment 8 of the present invention.
Figure 34:
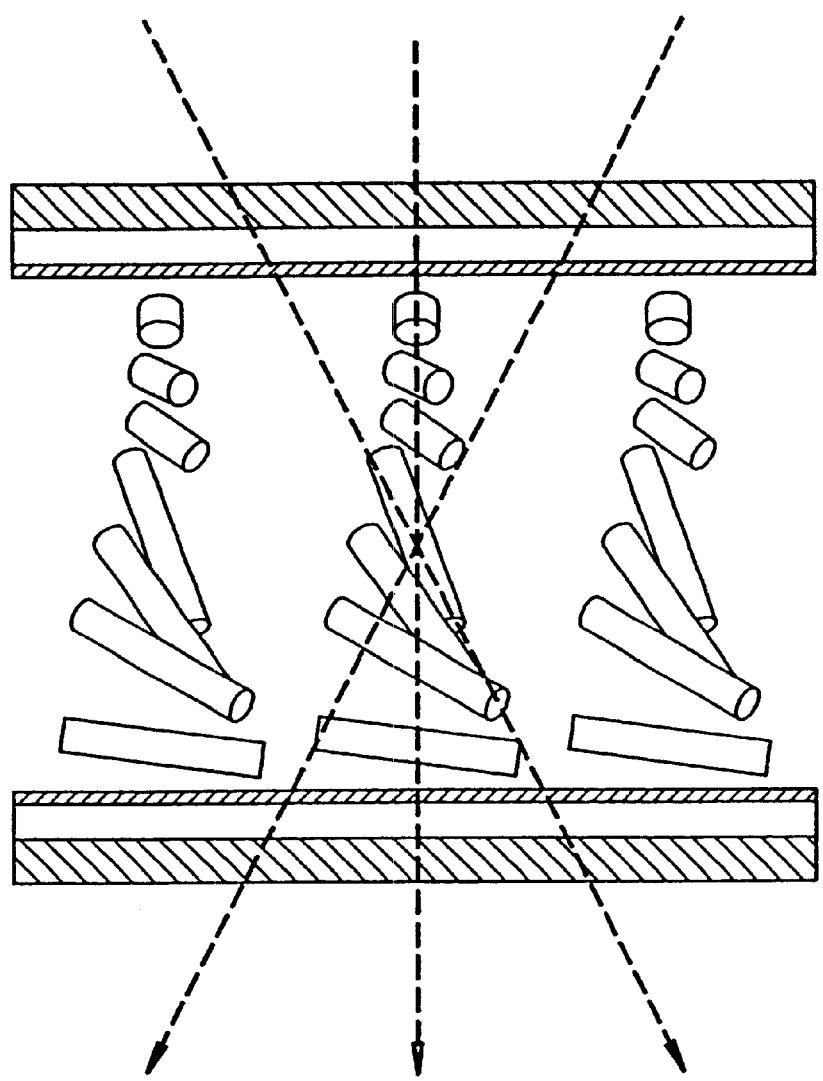
FIG. 34 is a arose-sectional view of a TN liquid crystal devise.
Figure 35:
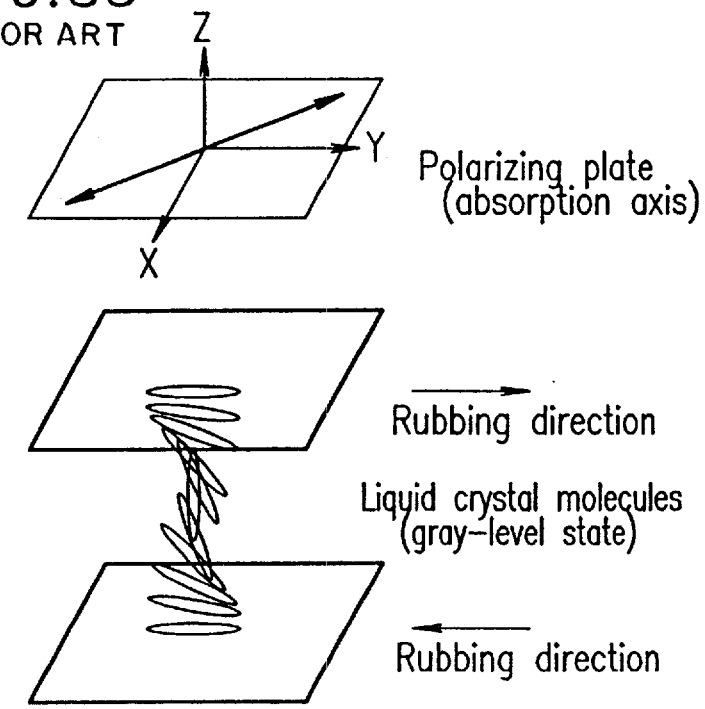
FIG. 35 illustrates a conventional liquid crystal display apparatus.
Figure 36:
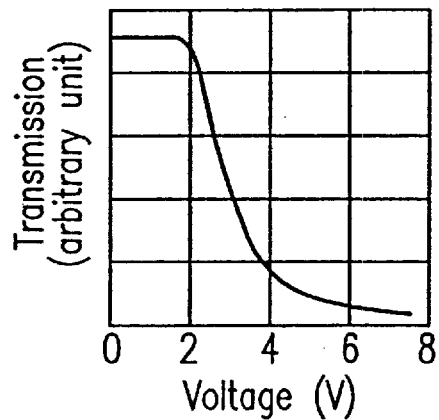
FIG. 36 la a graph illustrating the relationship between the voltage and the transmission of the conventional liquid crystal display apparatus.
Figure 38:
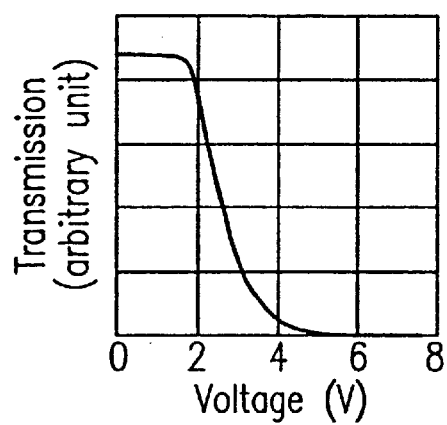
FIG. 38 is a graph illustrating the relationship between the voltage and the transmission of the other conventional liquid crystal display apparatus.
Figure 39:
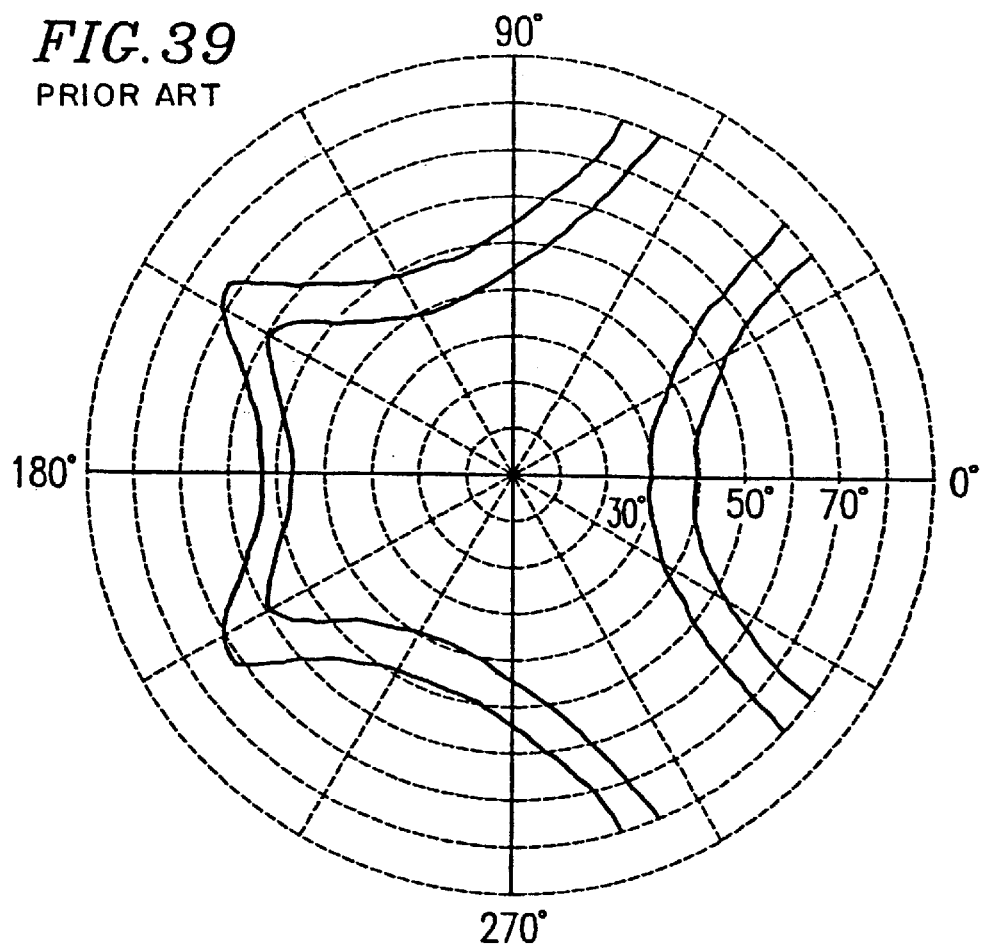
FIG. 39 is an isocontrast diagram of the other conventional liquid crystal display apparatus.
Figure 40:
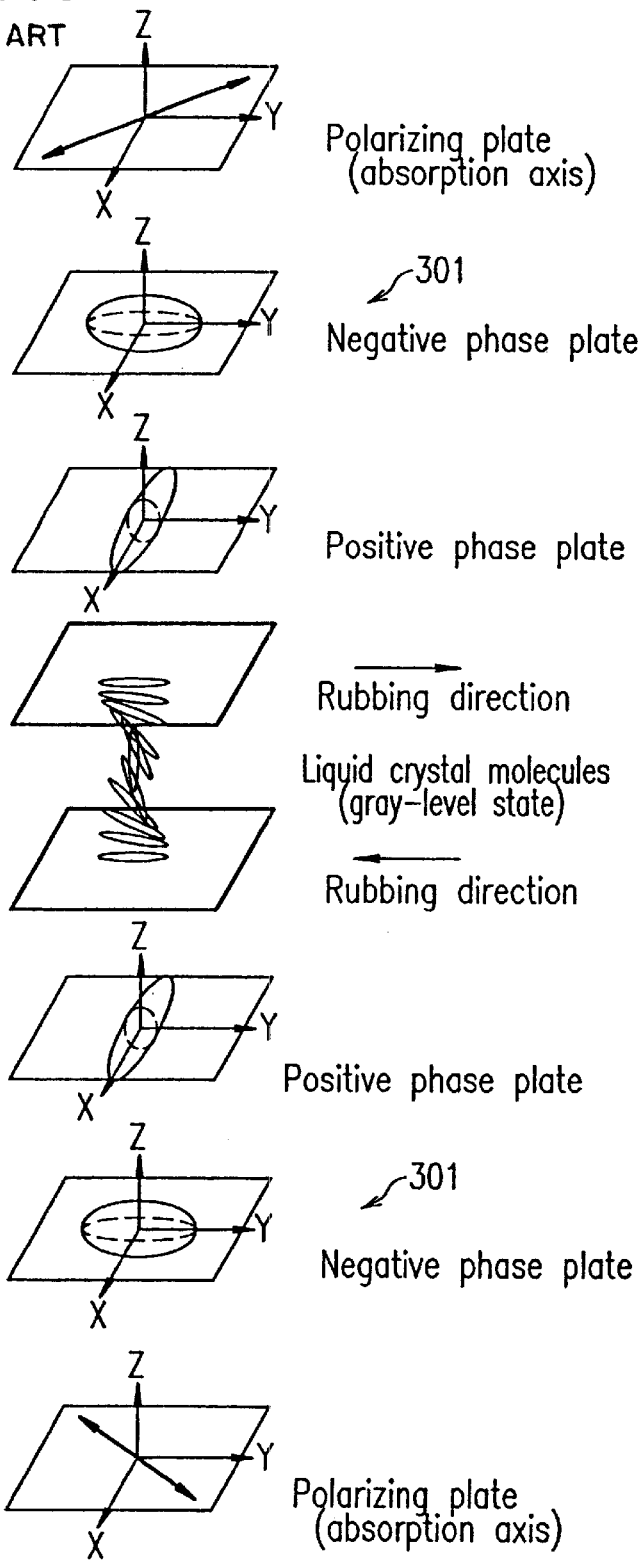
FIG. 40 is a graph illustrating the relationship between the voltage and the transmission of still another conventional liquid crystal display apparatus.
Figure 41:
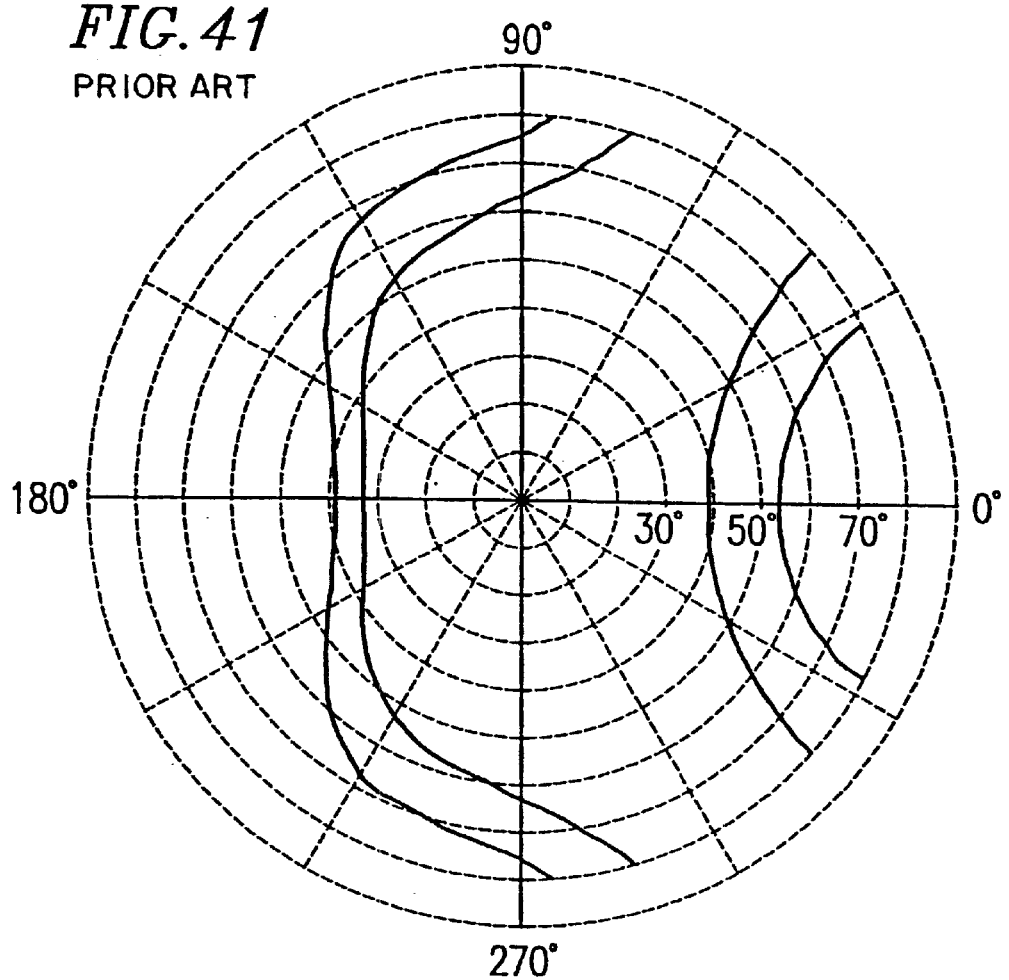
FIG. 41 it an isocontrast diagram of the still another conventional liquid crystal display apparatus.

The liquid crystal display apparatus 1300 having a structure as illustrated in FIG. 32 was produced by adding two positive phase plates 401 having a retardation of 20 nm to the liquid crystal display apparatus having a structure as illustrated in FIG. 5. A voltage-transmission characteristics measurement showed that when the applied voltage was 5.0 V, the transmission was minimized and the contrast was 200. At the same time, the reversal of a near-white gray level was also eliminated. This was because by the two types of films, the retardation of the liquid crystal layer in the absence of an applied voltage was reduced and the total retardation was reduced from 300 nm to about 240 nm. The isocontrast diagrams was as shown in FIG. 33, indicating desirable viewing angle characteristics. The asymmetry in the rubbing directions was also eliminated by the employment of the lens element having unidirectional diffusion characteristics.

As described above, according to the present invention, there is provided a liquid crystal display apparatus including a phase plate having an inclined index ellipsoid and a liquid crystal display device having a homogeneous orientation, wherein the viewing angle dependency is improved and the response speed is reduced. Thus, the present invention provides a liquid crystal display apparatus having an improved viewing angle, an improved display quality and an improved response speed over conventional liquid crystal display apparatuses.

Moreover, according to the present invention, a positive phase plate is employed in combination with a negative inclined phase plate, and the positive phase plate is arranged so that its maximum refractive index axis coincides with or is orthogonal to the rubbing direction of the liquid crystal layer. Thus, it is possible to obtain a liquid crystal display apparatus having a high contrast and a wide viewing angle.

The viewing angle characteristics are substantially the same as those obtained by an optimized negative inclined phase plate. Thus, many different liquid crystal cell gaps can be accommodated with a single type of inclined phase plate.

Moreover, it is possible to adjust the voltage for maximizing the normal-viewing-direction contrast (i.e., the black display voltage), thereby dramatically enhancing the productivity.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A liquid crystal display apparatus, comprising:

a liquid crystal display device, the liquid crystal display device comprising: a pair of light transmissive substrates; a transparent electrode layer and an alignment film which are provided on one surface of each of the light transmissive substrates, the surface facing the other one of the light transmissive substrates; and a liquid crystal layer interposed between the pair of light transmissive substrates, wherein: the liquid crystal layer includes liquid crystal molecules; the liquid crystal molecules on a surface of each of the alignment films are pre-tilted in the same direction and by the same angle as those on a surface of the other one of the alignment films; and the liquid crystal layer has a homogeneous orientation;

a pair of polarizers provided on respective sides of the liquid crystal display device; and at least one inclined phase plate including an index ellipsoid having three principal refractive indices na, nb and nc, wherein:

the three principal refractive indices na, nb and nc of the index ellipsoid satisfy a relationship of na=nb>nc;

each of the principal refractive indices na and nb is a principal refractive index along a direction in a surface of the inclined phase plate, and the principal refractive index nc is a principal refractive index along a direction normal to the surface of the inclined phase plate;

the index ellipsoid is inclined by inclining the direction of the principal refractive index nc and the direction of one of the in-plane principal refractive indices na and nb with respect to each other about an axis extending along the direction of the other one of the in-plane principal refractive indices na and nb;

the inclined phase plate is provided between the liquid crystal display device and at least one of the polarizers; and the inclined phase plate is arranged so that an inclination direction of the index ellipsoid as being projected onto the surface of one of the light transmissive substrates is generally parallel or antiparallel to an orientation direction of the liquid crystal molecules.

2. A liquid crystal display apparatus according to claim 1, wherein:

the liquid crystal display apparatus further comprises at least one negative phase plate including an index ellipsoid having three principal refractive indices nx, ny and nz along an x axis, a y axis and a z axis, respectively;

the three principal refractive indices nx, ny and nz satisfy a relationship of nx=ny>nz;

the x axis and the y axis extend in the surface of the negative phase plate and the z axis extends in a direction normal to the surface of the negative phase plate; and the negative phase plate is provided between the liquid crystal display device and at least one of the polarizes.

3. A liquid crystal display apparatus according to claim 2, wherein:

where the negative phase plate is provided on both sides of the liquid crystal display device, a product (nx−nz)×d of a difference between the principal refractive index nx and the principal refractive index nz and a thickness d of the negative inclined phase plate is set to be in a range from 5 nm to 200 nm; and where the negative inclined phase plate is provided only on one side of the liquid crystal display device, the product (nx−nz)×d is set to be in a range from 10 nm to 400 nm.

4. A liquid crystal display apparatus according to claim 3, wherein:

where the negative phase plate is provided on both sides of the liquid crystal display device, a product (nx−nz)×d is set to be in a range from 35 nm to 105nm; and where the negative inclined phase plate is provided only on one side of the liquid crystal display device, the product (nx−nz)×d is set to be in a range from 70 nm to 210 nm.

5. A liquid crystal display apparatus according to claim 1, wherein:

the liquid crystal display apparatus further comprises at least one positive phase plate including an index ellipsoid having three principal refractive indices nx, ny and nz, the principal refractive indices nx and ny being along an x axis and a y axis, respectively;

the principal refractive indices nx, and ny satisfy a relationship of nx>ny;

the x axis and the y axis extend in the surface of the positive phase plate;

the negative phase plate is provided between the liquid crystal display device and at least one of the polarizers;

each of the polarizers has an absorption axis; and the positive phase plate is arranged so that the y axis substantially coincides with the absorption axis.

6. A liquid crystal display apparatus according to claim 5, wherein:

where the positive phase plate is provided on both sides of the liquid crystal display device, a product (nx−nz)×d of a difference between the principal refractive index nx and the principal refractive index ny and a thickness d of the positive inclined phase plate is set to be in a range from 1 nm to 1.25 nm; and where the negative inclined phase plate is provided only on one side of the liquid crystal display device, the product (nx−ny)×d is set to be in a range from 2 nm to 250 nm.

7. A liquid crystal display apparatus according to claim 6, wherein:

where the positive phase plate is provided on both sides of the liquid crystal display device, a product (nx−nz)×d is set to be in a range from 30 nm to 90 nm; and where the positive inclined phase plate is provided only on one side of the liquid crystal display device, the product (nx−ny)×d is set to be in a range from 60 nm to 180 nm.

8. A liquid crystal display apparatus according to claim 1, wherein:

the liquid crystal display apparatus further comprises at least one negative phase plate including a negative index ellipsoid having three principal refractive indices nx1, ny1 and nz1 along an x1 axis, a y1 axis and a z1 axis, respectively;

the three principal refractive indices nx1, ny1 and nz1 satisfy a relationship of nx1=ny1>nz1;

the x1 axis and the y1 axis extend in the surface of the negative phase plate and the z1 axis extends in a direction normal to the surface of the negative phase plate;

the negative phase plate is provided between the liquid crystal display device and at least one of the polarizers;

the liquid crystal display apparatus further comprises at least one positive phase plate including a positive index ellipsoid having three principal refractive indices nx2, ny2 and nz2 along an x2 axis, a y2 axis and a z2 axis, respectively;

the principal refractive indices nx2 and ny2 satisfy a relationship of nx2>ny2;

the x2 axis and the y2 axis extend in the surface of the positive phase plate;

the positive phase plate is provided between the liquid crystal display device and at least one of the polarizers;

each of the polarizers has an absorption axis; and the positive phase plate is arranged so that the y2 axis substantially coincides with the absorption axis.

9. a liquid crystal display apparatus according to claim 1, wherein the inclined phase plate is arranged so that the inclination direction of the index ellipsoid and a pre-tilt direction of the liquid crystal molecules are substantially opposite to each other.

10. A liquid crystal display apparatus according to claim 1, wherein an inclination angle of the index ellipsoid is equal to or greater than 10° and less than or equal to 80°.

11. A liquid crystal display apparatus according to claim 10, wherein the inclination angle of the index ellipsoid is equal to or greater than 20° and less than or equal to 50°.

12. A liquid crystal display apparatus according to claim 1, wherein:

where the inclined phase plate is provided on both sides of the liquid crystal display device, a product (na−nc)×d of a difference between the principal refractive index na and the principal refractive index nc and thickness d of the inclined phase plate is set to be in a range from 15 nm to 700 nm; and where the inclined phase plate is provided only on one side of the liquid crystal display device, the product (na−nc)×d is set to be in a range from 30 nm to 1500 nm.

13. A liquid crystal display apparatus according to claim 12, wherein:

where the inclined phase plate is provided on both sides of the liquid crystal display device, the product (na−nc)×d is set to be in a range from 33 nm to 159 nm; and where the inclined phase plate is provided only on one side of the liquid crystal display device, the product (na−nc)×d is set to be in a range from 66 nm to 318 nm.

14. A liquid crystal display apparatus according to claim 1, wherein:

each of the polarizers has an absorption axis; and an angle between a direction of the absorption axis and an inclination direction of the index ellipsoid in the inclined phase plate is greater than −5° and less than 50°.

15. A liquid crystal display apparatus according to claim 1, wherein an angle between an orientation direction of the liquid crystal molecules and an inclination direction of the index ellipsoid in the inclined phase plate is greater than −5° and less than 5°.

16. A liquid crystal display apparatus according to claim 1, wherein an angle between an orientation direction of the liquid crystal molecules and an inclination direction of the index ellipsoid in the inclined phase plate 0°.

17. A liquid crystal display apparatus according to claim 1, wherein the inclined phase plate includes a support made of a transparent organic polymer and a discotic liquid crystal material cured on the support in an inclined orientation.

18. A liquid crystal display apparatus according to claim 1, wherein the inclined phase plate includes a support made of a transparent organic polymer and a discotic liquid crystal material cured on the support in an hybrid orientation.

19. A liquid crystal display apparatus according to claim 1, wherein a product of a thickness of the liquid crystal layer and a refractive index anisotropy (Δn) of the liquid crystal layer is in a range from 180 nm to 500 nm.

20. A liquid crystal display apparatus according to claim 19, wherein a product of a thickness of the liquid crystal layer and the refractive index anisotropy (Δn) of the liquid crystal layer is in a range from 220 nm to 350 nm.

21. A liquid crystal display apparatus according to claim 1, further comprising an element for diffusing transmitted light in normal and near-normal viewing directions toward upper and lower directions.

22. A liquid crystal display apparatus according to claim 1, wherein:
the liquid crystal display apparatus further comprises at least one positive phase plate including an index ellipsoid having three principal refractive indices nx, ny and nz, the principal refractive indices nx and ny being along an x axis and a y axis, respectively;
the principal refractive indices nx and ny satisfy a relationship of nx>ny;
the x axis and the y axis exist in a surface of the positive phase plate;
the positive phase plate is provided between the inclined phase plate and the liquid crystal display device;
each of the polarizers has an absorption axis;
the x axis, which is a slow axis of the positive phase plate, is substantially parallel or substantially orthogonal to an inclination direction of the index ellipsoid of the inclined phase plate as being projected onto the surface of one of the light transmissive substrates; and
an angle between the absorption axis of each of the polarizers and the slow axis of the positive phase plate is substantially 45°.

23. A liquid crystal display apparatus according to claim 22, wherein a difference between (1) a sum of an in-plane retardation of the negative inclined phase plate and an in-plane retardation of the positive inclined phase plate and (2) a retardation of the liquid crystal layer when a black display is produced by the liquid crystal display apparatus is within ±10 nm.

24. A liquid crystal display apparatus according to claim 23, wherein the sum of the in-plane retardation of the negative inclined phase plate and the in-plane retardation of the positive inclined phase plate is less than or equal to 100 nm.

25. A liquid crystal display apparatus according to claim 1, wherein:
the liquid crystal display apparatus further comprises a positive phase plate including an index ellipsoid having three principal refractive indices nx, ny and nz, the principal refractive indices nx and ny being along an x axis and a y axis, respectively;
the principal refractive indices nx and ny satisfy a relationship of nx>ny;
the x axis and the y axis exist in a surface of the positive phase plate;
the positive phase plate is provided between the inclined phase plate and at least one of the polarizers;
each of the polarizers has an absorption axis;
the x axis, which is a slow axis of the positive phase plate, is substantially parallel or substantially orthogonal to an inclination direction of the index ellipsoid of the inclined phase plate as being projected onto the surface of one of the light transmissive substrates; and
an angle between the absorption axis of each of the polarizers and the slow axis of the positive phase plate is substantially 45°.

26. A liquid crystal display apparatus, comprising:
a liquid crystal display device, the liquid crystal display device comprising: a pair of light transmissive substrates; a transparent electrode layer and an alignment film which are provided on one surface of each of the light transmissive substrates, the surface facing the other one of the light transmissive substrates; and a liquid crystal layer interposed between the pair of light transmissive substrates, wherein: the liquid crystal layer includes liquid crystal molecule; the liquid crystal molecules on a surface of each of the alignment films are pre-tilted in the same direction and by the same angle as those on a surface of the other one of the alignment films; the liquid crystal layer has a homogeneous orientation;
a pair of polarizers provided on respective sides of the liquid crystal display device; and
at least one inclined phase plate including an index ellipsoid having three principal refractive indices, na, nb and nc, wherein:
the three principal refractive indices na, nb and nc of the index ellipsoid satisfy a relationship of na=nb>nc;
each of the principal refractive indices na and nb is a principal refractive index along a direction in a surface of the inclined phase plate, and the principal refractive index nc is a principal refractive index along a direction normal to the surface of the inclined phase plate;
the index ellipsoid is inclined by inclining the direction of the principal refractive index nc and the direction of one of the in-plane principal refractive indices na and nb with respect to each other about an axis extending along the direction of the other one of the in-plane principal refractive indices na and nb;
the inclined phase plate is provided between the liquid crystal display device and at least one of the polarizers;
the liquid crystal display apparatus further comprises at least one positive phase plate including an index ellipsoid having three principal refractive indices nx, ny and nz, the principal refractive indices nx and ny being along an x axis and a y axis, respectively;
the principal refractive indices nx and ny satisfy a relationship of nx>ny;
the x axis and the y axis extend in the surface of the positive phase plate;
the positive phase plate is provided between the liquid crystal display device and at least one of the polarizers;
each of the polarizers has an absorption axis;
the positive phase plate is arranged so that the y axis substantially coincides with an orientation direction of the liquid crystal molecules; and
the inclined phase plate is arranged so that an inclination direction of the index ellipsoid as being projected onto the surface of one of the light transmissive substrates is generally parallel or antiparallel to an orientation direction of the liquid crystal molecules.

27. A liquid crystal display apparatus according to claims 26, wherein;
   a liquid crystal display apparatus further comprises at least one negative phase plate including a negative index ellipsoid having three principal refractive indices nx1, ny1 and nz1 along an x1 axis, a y1 axis and a z1 axis, respectively;
   the three principal refractive indices nx1, ny1 and nz1 satisfy a relationship of nx1=ny1>nz1;
   the x1 axis and the y1 axis extend in the surface of the negative phase plate and the z1 axis extends in a direction normal to the surface of the negative phase plate; and
   the negative phase plate is provided between the liquid crystal display device and at least one of the polarizers.

28. A liquid crystal display apparatus according to claim 27, wherein:
   where the negative phase plate is provided on both sides of the liquid crystal display device, a product (nx−nz)×d of a difference between the principal refractive index nx and the principal refractive index nz and a thickness d of the negative inclined phase plate is set to be in a range from 1 nm to 100 nm; and
   where the negative inclined phase plate is provided only on one side of the liquid crystal display device, the product (nx−nz)×d is set to be in a range from 2 nm to 200 nm.

29. A liquid crystal display apparatus according to claim 28, wherein:
   where the negative phase plate is provided on both sides of the liquid crystal display device, a product (nx−nz)×d is set to be in a range from 1 nm to 30 nm; and
   where the negative inclined phase plate is provided only on one side of the liquid crystal display device, the product (nx−nz)×d is set to be in a range from 2 nm to 60 nm.

30. A liquid crystal display apparatus according to claim 26, wherein:
   where the inclined phase plate is provided on both sides of the liquid crystal display device, a product (na−nc)×d of a difference between the principal refractive index na and the principal refractive index nc and a thickness d of the inclined phase plate is set to be in a range from 1 nm to 200 nm; and
   where the inclined phase plate is provided only on one side of the liquid crystal display device, the product (na−nc)×d is set to be in a range from 2 nm to 400 nm.

31. A liquid crystal display apparatus according to claim 30, wherein:
   where the inclined phase plate is provided on both sides of the liquid crystal display device, the product (na−nc)×d is set to be in a range from 30 nm to 150 nm; and
   where the inclined phase plate is provided only on one side of the liquid crystal display device, the product (na−nc)×d is set to be in a range from 60 nm to 300 nm.

32. A liquid crystal display apparatus according to claim 26, wherein an angle between an orientation direction of the liquid crystal molecules and an inclination direction of the index ellipsoid in the inclined phase plate is greater than 40° and less than 50°.

33. A liquid crystal display apparatus according to claim 26, wherein an angle between an orientation direction of the liquid crystal molecules and an inclination direction of the index ellipsoid in the inclined phase plate is 45°.

34. A liquid crystal display apparatus according to claim 26, wherein:
   where the positive phase plate is provided on both sides of the liquid crystal display device, a product (nx−ny)×d of a difference between the principal refractive index nx and the principal refractive index ny and a thickness d of the positive inclined phase plate is set to be in a range from 1 nm to 100 nm; and
   where the positive inclined phase plate is provided only on one side of the liquid crystal display device, the product (nx−ny)×d is set to be in a range from 2 nm to 200 nm.

35. A liquid crystal display apparatus according to claim 34, wherein:
   where the positive phase plate is provided on both sides of the liquid crystal display device, a product (nx−ny)×d is set to be in a range from 5 nm to 40 nm; and
   where the positive inclined phase plate is provided only on one side of the liquid crystal display device, the product (nx−ny)×d is set to be in a range from 10 nm to 80 nm.

* * * * *